United States Patent
Bass et al.

(10) Patent No.: US 11,654,990 B2
(45) Date of Patent: May 23, 2023

(54) ELECTRIC BICYCLE

(71) Applicant: Serial 1 Cycle Company, LLC, Hales Corners, WI (US)

(72) Inventors: Benjamin Raymond Bass, Madison, WI (US); Ben M. Lund, Delafield, WI (US); Andrew Schmidt, Delafield, WI (US)

(73) Assignee: SERIAL 1 CYCLE COMPANY, LLC, Hales Corners, WI (US)

( * ) Notice: Subject to any disclaimer, the term of this patent is extended or adjusted under 35 U.S.C. 154(b) by 0 days.

(21) Appl. No.: 17/569,886

(22) Filed: Jan. 6, 2022

(65) Prior Publication Data

US 2022/0126936 A1 Apr. 28, 2022

Related U.S. Application Data

(63) Continuation of application No. 16/928,406, filed on Jul. 14, 2020.

(Continued)

(51) Int. Cl.
*B62H 5/00* (2006.01)
*B62J 6/028* (2020.01)
(Continued)

(52) U.S. Cl.
CPC ............. *B62H 5/003* (2013.01); *B62J 6/015* (2020.02); *B62J 6/028* (2020.02); *B62J 6/045* (2020.02);
(Continued)

(58) Field of Classification Search
CPC . B62H 5/003; B62J 6/015; B62J 6/028; B62J 6/045; B62J 43/13; B62J 43/28;
(Continued)

(56) References Cited

U.S. PATENT DOCUMENTS 5,197,795 A * 3/1993 Mudrovich ............... B62J 6/01
224/426
6,016,882 A 1/2000 Ishikawa
(Continued)

FOREIGN PATENT DOCUMENTS

CA 2462151 A1 7/2005
CH 700148 A2 6/2010
(Continued)

OTHER PUBLICATIONS

Mecholic "Belt Drives—Types, Advantages and Disadvantage" available online @ https://web.archive.org/web/20180129105933/http://www.mecholic.com/2015/11/belt-drive-advantage-and-disadvantage.html; last accessed Mar. 24, 2022; 3 pages (Year: 2018).*

(Continued)

*Primary Examiner* — Hunter B Lonsberry
*Assistant Examiner* — Daniel L Greene
(74) *Attorney, Agent, or Firm* — Foley & Lardner LLP

(57) ABSTRACT

A bicycle includes a frame, a motor, a battery, a key interface, a crank set, and a shell. The frame defines a cavity and an opening providing access to the cavity. The motor is coupled to frame beneath the cavity. The battery extends at least partially into the frame. The battery is configured to power the motor. The key interface is positioned along an exterior of the frame. Turning a key in the key interface releases the battery to facilitate removing the battery from the frame. The crank set is coupled to the motor. The crank set includes crank arms. The shell extends at least partially over the opening.

20 Claims, 36 Drawing Sheets

Related U.S. Application Data

(60) Provisional application No. 62/874,663, filed on Jul. 16, 2019.

(51) Int. Cl.

| | | |
|---|---|---|
| *B62J 43/28* | (2020.01) | |
| *B62J 43/30* | (2020.01) | |
| *B62J 43/13* | (2020.01) | |
| *B62J 6/015* | (2020.01) | |
| *B62J 6/045* | (2020.01) | |
| *B62K 19/34* | (2006.01) | |
| *B62K 19/44* | (2006.01) | |
| *B62M 6/70* | (2010.01) | |
| *B62M 6/90* | (2010.01) | |
| *E05B 67/00* | (2006.01) | |

(52) U.S. Cl.
CPC ............... *B62J 43/13* (2020.02); *B62J 43/28* (2020.02); *B62J 43/30* (2020.02); *B62K 19/34* (2013.01); *B62K 19/44* (2013.01); *B62M 6/70* (2013.01); *B62M 6/90* (2013.01); *E05B 67/006* (2013.01)

(58) Field of Classification Search
CPC .......... B62J 43/30; B62K 19/34; B62K 19/44; B62M 6/70; B62M 6/90; E05B 67/006
See application file for complete search history.

(56) References Cited

U.S. PATENT DOCUMENTS

| | | | |
|---|---|---|---|
| 6,029,990 A | 2/2000 | Busby | |
| 6,095,270 A | 8/2000 | Ishikawa | |
| 6,148,944 A | 11/2000 | Adomi et al. | |
| 6,155,585 A | 12/2000 | Busby | |
| 6,276,479 B1 | 8/2001 | Suzuki et al. | |
| 6,428,192 B1 | 8/2002 | Chen | |
| 6,554,307 B1 | 4/2003 | Ockenden | |
| 7,052,422 B2 | 5/2006 | Skidmore et al. | |
| 7,287,772 B2 | 10/2007 | James | |
| 7,520,361 B2 | 4/2009 | Anzai | |
| D594,787 S | 6/2009 | Dallaire | |
| 7,637,830 B2 | 12/2009 | Greilinger | |
| 7,703,787 B2 | 4/2010 | Kawamura et al. | |
| 7,854,441 B2 | 12/2010 | Scurlock | |
| 7,988,175 B2 | 8/2011 | White | |
| 7,997,775 B2 | 8/2011 | Hurwitz | |
| 8,276,703 B2 | 10/2012 | Mori | |
| 8,371,974 B2 | 2/2013 | Morita | |
| 8,413,947 B2 | 4/2013 | Chiang | |
| 8,424,894 B2 | 4/2013 | Cleveland | |
| 8,740,239 B2 | 6/2014 | Lumpkin | |
| 8,770,808 B1* | 7/2014 | Campbell | B62J 11/00 |
| | | | 362/800 |
| D720,260 S | 12/2014 | Yoshida | |
| 8,899,606 B2 | 12/2014 | Cocalis | |
| 8,960,702 B2* | 2/2015 | Vollmer | B62K 19/34 |
| | | | 280/281.1 |
| D727,214 S | 4/2015 | Yang | |
| 8,998,236 B2 | 4/2015 | Trimble et al. | |
| D730,779 S | 6/2015 | Arbour et al. | |
| D745,836 S | 12/2015 | Poster et al. | |
| 9,415,828 B2 | 8/2016 | Norstad | |
| D774,971 S | 12/2016 | Lambri et al. | |
| D774,972 S | 12/2016 | Lambri et al. | |
| 9,580,141 B2 | 2/2017 | Talavasek et al. | |
| D789,836 S | 6/2017 | Gouin et al. | |
| D801,875 S | 11/2017 | Pfeiffer et al. | |
| D802,487 S | 11/2017 | Petrov | |
| 9,950,602 B2* | 4/2018 | Duan | H01M 50/20 |
| D816,554 S | 5/2018 | Wang et al. | |
| 10,028,356 B2 | 7/2018 | Luk et al. | |
| 10,131,401 B2 | 11/2018 | Nolin et al. | |
| 10,137,954 B2 | 11/2018 | Hendey et al. | |
| 10,179,626 B2* | 1/2019 | Arbour | B62K 19/30 |
| 10,183,591 B2* | 1/2019 | Shieh | B62M 6/90 |
| 10,196,107 B2 | 2/2019 | Hiramaru | |
| D842,765 S | 3/2019 | Deltour | |
| D854,969 S | 7/2019 | Gouin et al. | |
| 10,343,747 B2 | 7/2019 | Cunado Landa et al. | |
| 10,363,992 B2 | 7/2019 | Watarai | |
| 2007/0147057 A1 | 6/2007 | Mohr | |
| 2007/0285934 A1* | 12/2007 | Carillo | B62J 6/26 |
| | | | 362/190 |
| 2008/0002417 A1 | 1/2008 | Mohr | |
| 2008/0192497 A1 | 8/2008 | Chao | |
| 2011/0115193 A1* | 5/2011 | Giroux | B62J 11/19 |
| | | | 280/281.1 |
| 2011/0316251 A1 | 12/2011 | Lumpkin | |
| 2012/0049483 A1* | 3/2012 | Dodman | B62M 6/90 |
| | | | 280/281.1 |
| 2012/0096978 A1 | 4/2012 | Voshell et al. | |
| 2013/0044502 A1* | 2/2013 | Guzik | B62J 6/01 |
| | | | 29/596 |
| 2014/0153270 A1 | 6/2014 | Lai | |
| 2016/0159435 A1* | 6/2016 | Yehuda | B62M 9/00 |
| | | | 180/220 |
| 2016/0244124 A1 | 8/2016 | Hon | |
| 2016/0303961 A1* | 10/2016 | Hendey | B62J 1/08 |
| 2016/0375956 A1* | 12/2016 | Talavasek | B62K 11/04 |
| | | | 180/220 |
| 2017/0267308 A1 | 9/2017 | Geissler | |
| 2018/0050758 A1 | 2/2018 | Pfeiffer | |
| 2018/0065704 A1 | 3/2018 | Choi et al. | |
| 2018/0281896 A1 | 10/2018 | Takeshita et al. | |
| 2019/0009855 A1* | 1/2019 | Munksø | B21C 23/085 |
| 2019/0135369 A1 | 5/2019 | Thoma | |
| 2019/0152258 A1 | 5/2019 | Madhaven | |
| 2019/0165347 A1 | 5/2019 | Trif et al. | |

FOREIGN PATENT DOCUMENTS

| | | |
|---|---|---|
| CN | 1113016 | 12/1995 |
| CN | 2477521 Y | 2/2002 |
| CN | 2608403 Y | 3/2004 |
| CN | 2705380 Y | 6/2005 |
| CN | 2851063 Y | 12/2006 |
| CN | 200977979 Y | 11/2007 |
| CN | 10162603 A | 1/2010 |
| CN | 101659311 | 3/2010 |
| CN | 201545163 U | 8/2010 |
| CN | 201999163 U | 10/2011 |
| CN | 202414025 U | 9/2012 |
| CN | 102295044 B | 5/2013 |
| CN | 103112528 A | 5/2013 |
| CN | 203064129 U | 7/2013 |
| CN | 102420296 B | 11/2013 |
| CN | 203283319 U | 11/2013 |
| CN | 203731107 U | 7/2014 |
| CN | 104097717 A | 10/2014 |
| CN | 204659931 U | 9/2015 |
| CN | 204713348 U | 10/2015 |
| CN | 204937324 U | 1/2016 |
| CN | 205239801 U | 5/2016 |
| CN | 205574134 U | 9/2016 |
| CN | 205601985 U | 9/2016 |
| CN | 205645930 U | 10/2016 |
| CN | 106143781 A | 11/2016 |
| CN | 106143782 A | 11/2016 |
| CN | 205707094 U | 11/2016 |
| CN | 106184591 A | 12/2016 |
| CN | 205837120 U | 12/2016 |
| CN | 205872302 U | 1/2017 |
| CN | 106364617 | 2/2017 |
| CN | 106428322 | 2/2017 |
| CN | 205998028 U | 3/2017 |
| CN | 206125250 U | 4/2017 |
| CN | 1065855789.8 A | 4/2017 |
| CN | 206171691 U | 5/2017 |
| CN | 206171692 U | 5/2017 |
| CN | 206202580 U | 5/2017 |
| CN | 206265234 U | 6/2017 |

(56) References Cited

FOREIGN PATENT DOCUMENTS

| | | |
|---|---|---|
| CN | 206374898 U | 8/2017 |
| CN | 206606291 U | 11/2017 |
| CN | 107672723 A | 2/2018 |
| CN | 207089524 U | 3/2018 |
| CN | 207257848 U | 4/2018 |
| CN | 207670546 U | 7/2018 |
| CN | 108407592 A | 8/2018 |
| CN | 207725548 U | 8/2018 |
| CN | 207773351 U | 8/2018 |
| CN | 108639227 A | 10/2018 |
| CN | 108791602 A | 11/2018 |
| CN | 208069888 U | 11/2018 |
| CN | 109050766 A | 12/2018 |
| CN | 208216908 U | 12/2018 |
| CN | 208306904 U | 1/2019 |
| CN | 208470057 U | 2/2019 |
| CN | 109533127 A | 3/2019 |
| CN | 208715356 U | 4/2019 |
| CN | 208813424 U | 5/2019 |
| DE | 10200568 A1 | 7/2003 |
| DE | 20 2004 006 422 U1 | 6/2004 |
| DE | 10 2007 035 397 A1 | 1/2009 |
| DE | 10 2007 059 571 A1 | 6/2009 |
| DE | 20 2009 007 953 U1 | 10/2009 |
| DE | 10 2009 038 485 A1 | 4/2011 |
| DE | 10 2012 004 171 A1 | 9/2013 |
| DE | 20 2013 008 371 U1 | 11/2013 |
| DE | 10 2012 023 582 A1 | 6/2014 |
| DE | 20 2014 005 639 U1 | 8/2014 |
| DE | 10 2014 218 036 A1 | 3/2015 |
| DE | 10 2015 208 875 A1 | 11/2016 |
| DE | 20 2016 102 118 U1 | 8/2017 |
| DE | 10 2016 003 102 A1 | 9/2017 |
| DE | 10 2016 010 261 A1 | 3/2018 |
| DE | 10 2015 215 305 B4 | 10/2018 |
| DE | 10 2018 106 946 A1 | 10/2018 |
| DE | 20 2018 005 473 U | 1/2019 |
| DE | 20 2018 005 474 U | 1/2019 |
| DE | 20 2018 005 475 U1 | 4/2020 |
| EM | 001468078-0001 | 6/2020 |
| EP | 0 905 014 A2 | 3/1999 |
| EP | 1 184 274 A2 | 3/2002 |
| EP | 1 188 659 A2 | 3/2002 |
| EP | 1 564 128 A2 | 8/2005 |
| EP | 1 868 877 B1 | 12/2007 |
| EP | 2 184 531 A1 | 5/2010 |
| EP | 2 716 534 A1 | 4/2014 |
| EP | 2 738 080 A1 | 6/2014 |
| EP | 2 792 588 A1 | 10/2014 |
| EP | 2 492 182 B1 | 4/2015 |
| EP | 2 955 046 B1 | 12/2015 |
| EP | 2 998 214 A1 | 3/2016 |
| EP | 2 701 948 B1 | 9/2016 |
| EP | 3 085 610 A1 | 10/2016 |
| EP | 3 109 146 A2 | 12/2016 |
| EP | 3 118 096 B1 | 1/2017 |
| EP | 3 225 524 A2 | 10/2017 |
| EP | 2 939 909 B1 | 10/2018 |
| EP | 3 431 379 | 1/2019 |
| EP | 3 010 791 B1 | 2/2019 |
| EP | 3 492 365 A1 | 6/2019 |
| EP | 3 590 813 A1 | 1/2020 |
| FR | 2996518 A1 | 4/2014 |
| FR | 3037035 A1 | 12/2016 |
| FR | 3046401 | 1/2018 |
| GB | 2 439 298 A | 12/2007 |
| GB | 2 469 495 A | 10/2010 |
| GB | 2 561 547 A | 10/2018 |
| JP | 2001-219887 | 8/2001 |
| JP | 2002-274463 | 9/2002 |
| JP | 3386729 B2 | 3/2003 |
| JP | 3403874 B2 | 5/2003 |
| JP | 2003-231493 | 8/2003 |
| JP | 3552620 B2 | 8/2004 |
| JP | 3867836 B2 | 1/2007 |
| JP | 3906591 B2 | 4/2007 |
| JP | 2009-137375 A | 6/2009 |
| JP | 4573448 B2 | 11/2010 |
| JP | 4721577 B2 | 7/2011 |
| JP | 4916591 B1 | 4/2012 |
| JP | 2012-201340 | 10/2012 |
| JP | 5097662 B2 | 12/2012 |
| JP | 2013-049365 A | 3/2013 |
| JP | 2013-252784 A | 12/2013 |
| JP | 5478481 B2 | 4/2014 |
| JP | 2014-213818 A | 11/2014 |
| JP | 5647807 B2 | 1/2015 |
| JP | D1543758 | 1/2016 |
| JP | D1543757 | 2/2016 |
| JP | 5912639 B2 | 4/2016 |
| JP | 6054817 B2 | 12/2016 |
| JP | 2017-043340 A | 3/2017 |
| JP | 1679649 S | 2/2021 |
| NL | 2013352 B1 | 9/2016 |
| TW | 201702110 A | 1/2017 |
| WO | WO-2005/035345 A1 | 4/2005 |
| WO | WO-2009/035261 A2 | 3/2009 |
| WO | WO-2010/128761 A2 | 11/2010 |
| WO | WO-2012/123455 A1 | 9/2012 |
| WO | WO-2013/027152 A2 | 2/2013 |
| WO | WO-2016/065203 A1 | 4/2016 |
| WO | WO-2016/191876 A1 | 12/2016 |
| WO | WO-2016/205974 A1 | 12/2016 |
| WO | WO-2016/207668 A1 | 12/2016 |
| WO | WO-2017/028837 A1 | 2/2017 |
| WO | WO-2017/031069 A1 | 2/2017 |
| WO | WO-2018/010550 A1 | 1/2018 |
| WO | WO-2018/016949 A1 | 1/2018 |
| WO | WO-2018/042269 A1 | 3/2018 |
| WO | WO-2018/130999 A1 | 7/2018 |
| WO | WO-2018/155295 A1 | 8/2018 |
| WO | WO-2020/007496 A1 | 1/2020 |

OTHER PUBLICATIONS

E-Power Shape, E-Power X Vert, Bosch Active Line Plus, Japanese Patent Office, Design Division, Publication Material HC31001459, p. 3.

International Search Report and Written Opinion received for PCT application No. PCT/IB2020/056631, dated Nov. 13, 2020, 25 pages.

Non-Final Office Action issued for U.S. Appl. No. 16/928,406 dated Nov. 18, 2022 (16 pages).

* cited by examiner

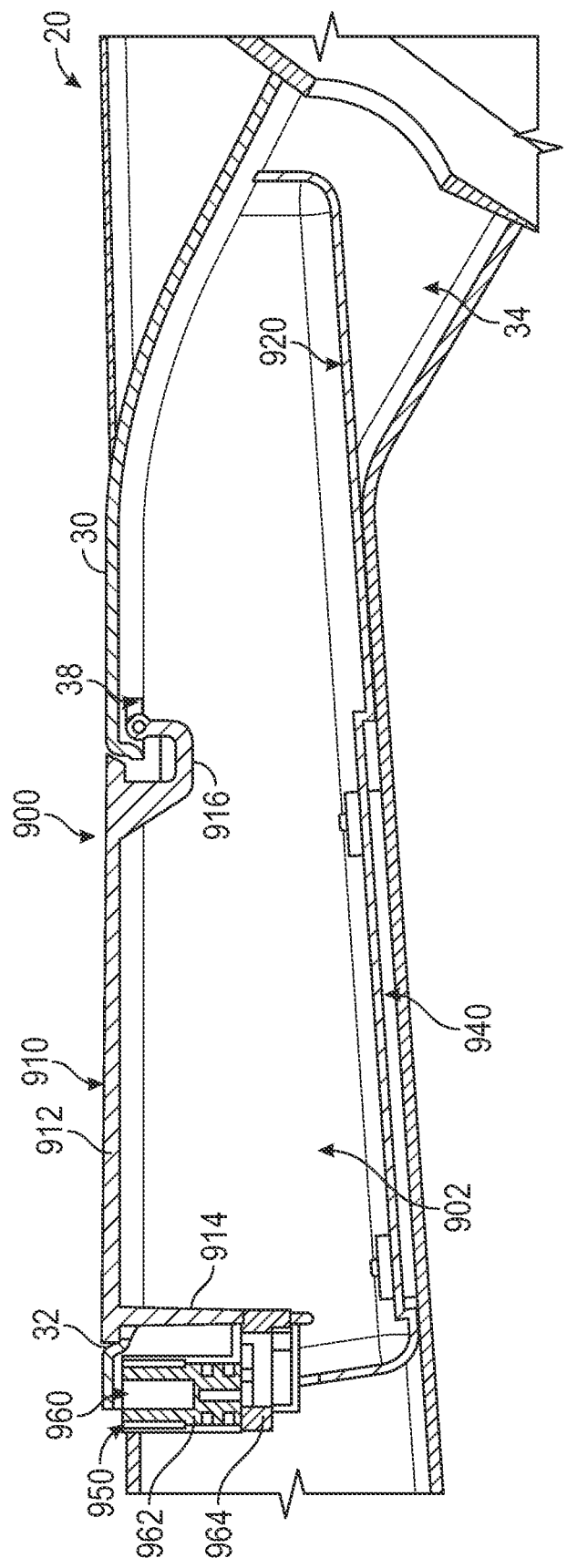

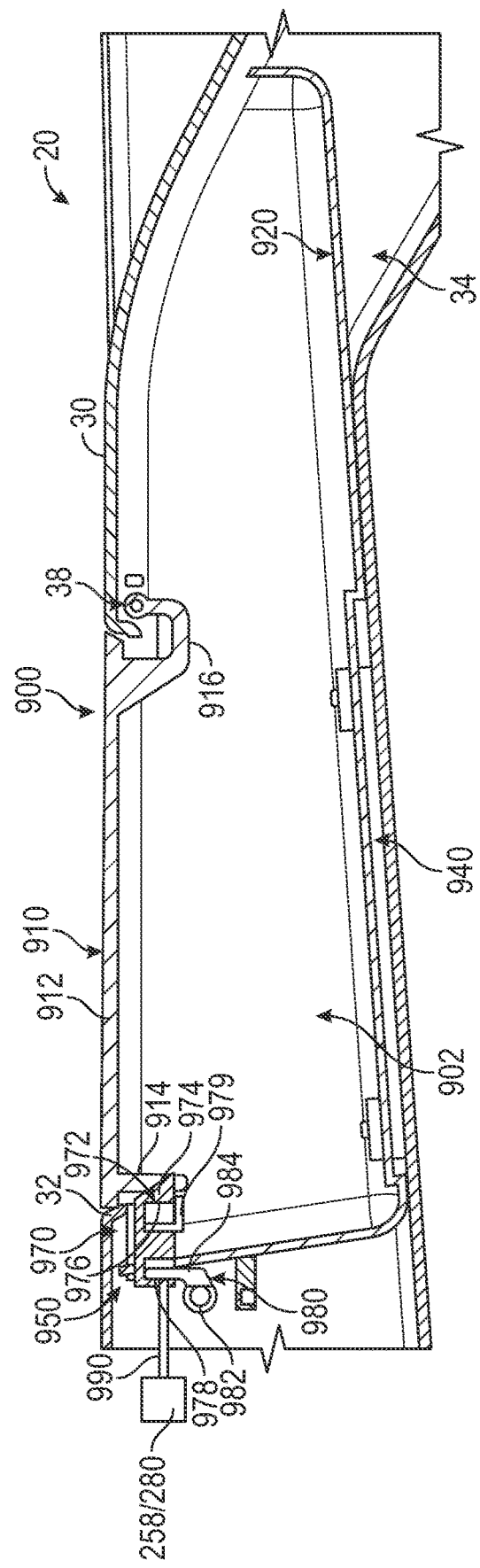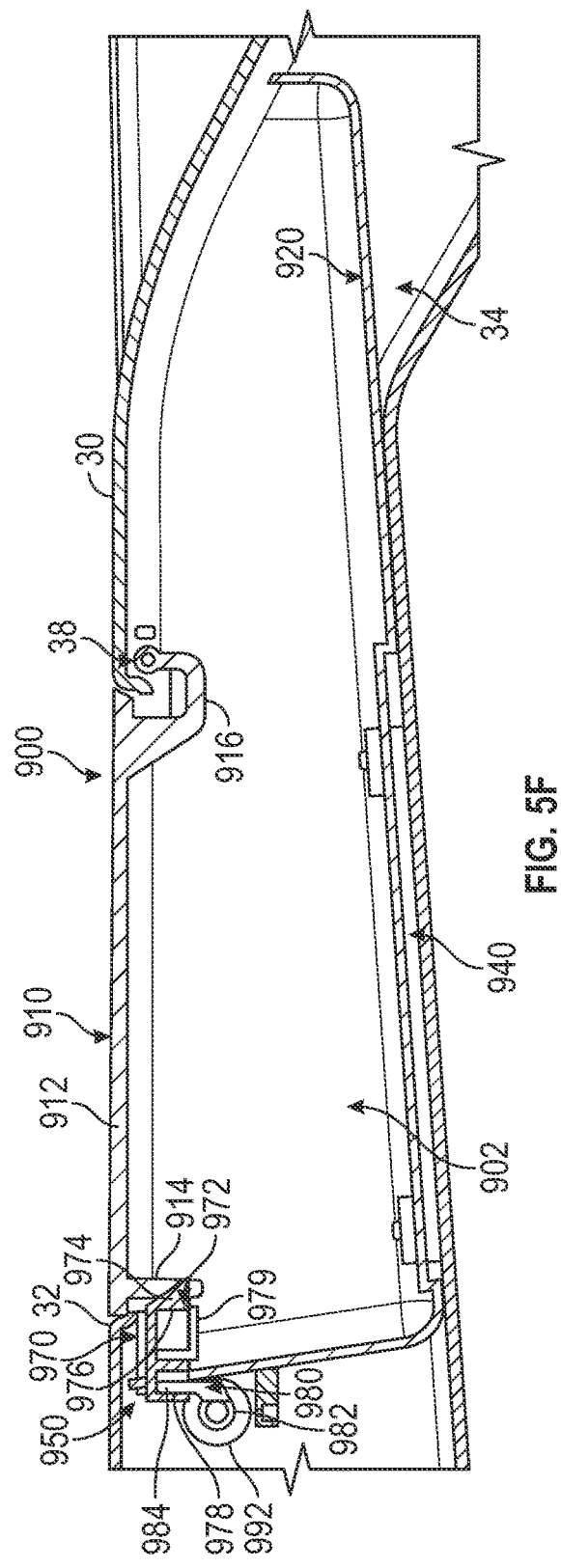

ELECTRIC BICYCLE

CROSS-REFERENCE TO RELATED PATENT APPLICATIONS

This application is a continuation of U.S. patent application Ser. No. 16/928,406, filed Jul. 14, 2020, which claims the benefit of U.S. Provisional Patent Application No. 62/874,663, filed Jul. 16, 2019, both of which are incorporated herein by reference in their entireties.

BACKGROUND

With the advent of suitable battery storage for bicycles, electric bicycles (or "e-bikes") are becoming more mainstream. Such electric bicycles typically include onboard power storage and a motor (e.g., a pedal assist or pedelec that provides a motor-assisted drivetrain to assist an operator with propelling the bicycle; or a throttle operated electric bicycle that propels the bicycle forward without any additional pedaling from the rider).

SUMMARY

One embodiment relate to a bicycle. The bicycle includes a frame, a storage compartment, a battery pack, a pedal assist unit, and a lighting system. The frame includes a head tube, a stem pivotally coupled to the head tube, a down tube coupled to the head tube and defining a compartment opening, a central hub coupled to the down tube opposite the head tube, and a pair of chain stays extending rearward of the central hub. The central hub defines an internal cavity. The down tube and the central hub cooperatively define a battery opening connected to the internal cavity. The pair of chain stays include (i) a right chain stay terminating with a right dropout and (ii) a left chain stay terminating with a left dropout. At least one of (a) the right dropout defines a right recess or (b) the left dropout defines a left recess. The storage compartment includes a door pivotally coupled to the down tube and positioned to selectively enclose the compartment opening, and a receptacle disposed within the interior of the frame and positioned beneath the compartment opening. The battery pack is releasably received by the battery opening and at least partially recessed within the internal cavity of the central hub. The pedal assist unit is disposed within the internal cavity of the central hub and powered by the battery pack. The lighting system is connected to the battery pack with wires extending internally through the frame. The lighting system includes at least one of (i) at least one of (a) a right taillight disposed within the right recess or (b) a left taillight disposed within the left recess, (ii) a conspicuity lamp integrated into the head tube, or (iii) a headlight integrated into to at least one of the stem or the head tube.

Another embodiment relate to a bicycle. The bicycle includes a frame, a door, a battery pack, and a pedal assist unit. The frame includes a head tube, a down tube coupled to the head tube and defining a compartment opening, a central hub coupled to an end of the down tube opposite the head tube, and a pair of chain stays extending rearward of the central hub. The central hub defines an internal cavity. The down tube and the central hub cooperatively define a battery opening connected to the internal cavity. The pair of chain stays include (i) a right chain stay terminating with a right dropout and (ii) a left chain stay terminating with a left dropout. The door is pivotally coupled to the down tube and positioned to selectively enclose the compartment opening. The battery pack is releasably received by the battery opening and at least partially recessed within the internal cavity of the central hub. The pedal assist unit is disposed within the internal cavity of the central hub and powered by the battery pack.

Another embodiment relate to a bicycle. The bicycle includes a frame, a hinge, a door, a locking mechanism, a bracket, and a receptacle. The frame include a plurality of tubular members. One of the plurality of tubular members defines an opening leading to an interior of the frame. The hinge is positioned within the interior of the frame proximate an end of the opening. The door is positioned to selectively enclose the opening. The door includes (i) a u-shaped arm extending from a first end of the door into the interior of the frame and pivotally coupled to the hinge and (ii) a retainer extending from an opposing second end of the door into the interior of the frame. The locking mechanism includes a latch positioned within the interior of the frame. The latch is configured to selectively engage the retainer of the door to lock the door in a closed position. The bracket is positioned beneath the opening and coupled to an interior wall of the one of the plurality of tubular members. The receptacle is disposed within the interior of the frame and releasably coupled to the bracket. The receptacle, the door, and the interior of the frame cooperatively define an interior chamber. The interior chamber is longer than the door such that the interior chamber extends into the interior of the frame beyond the opening.

Another embodiment relates to a bicycle. The bicycle includes a frame, a door, and a tub. The frame includes a plurality of tubular members. One of the tubular members defines an opening leading to an interior of the frame. The door is pivotally coupled to the frame and positioned to selectively enclose the opening. The tub is disposed within the interior of the frame and positioned beneath the opening. The tub, the door, and the interior cooperatively define an interior chamber. The interior chamber is longer than the door such that the interior chamber extends along the interior of the frame beyond the opening.

Another embodiment relates to an electric bicycle. The electric bicycle includes a frame supporting a front wheel and a rear wheel, a battery pack coupled to the frame and configured to supply electricity to a motor operatively coupled to the rear wheel, and taillights positioned rearward on the frame, straddling each side of the rear wheel, and configured to be powered by the battery pack.

Another embodiment relates to a lock for a bicycle. The lock includes a cable and a body member. The cable is stored in and extendable from an inner volume of a tubular member of the bicycle. The cable includes a male locking end. The body member is fixedly coupled with a tubular member of a frame of the bicycle. The body member includes a first bore, a second bore, an interlocking member, and a guide portion. The first bore extends through the body member. The first bore is configured to receive the cable therethrough. The second bore extends at least partially through the body member. The second bore is configured to receive the male locking end of the cable. The interlocking member is configured to selectively transition between a locked position and an unlocked position. The interlocking member is configured to engage the male locking end of the cable in the locked position when the male locking end is inserted into the second bore. The guide portion extends from a rear surface of the body member. The guide portion is configured to direct the cable from the inner volume of the tubular member of the bicycle to the first bore.

Another embodiment relates to a lock for a bicycle. The lock includes a body member, a removable member, and a cable. The body member is fixedly coupled with a tubular member of a frame of the bicycle. The body member includes a cavity having an opening at a first end of the body member, an aperture that extends through a rear wall of the body member at a second end of the body member, and a pin that extends at least partially through the cavity from an inner surface at the second end of the body member. The removable member is configured to be received within the cavity of the body member. The removable member includes an interlocking member configured to selectively engage the pin of the body member, a button configured to disengage the interlocking member from the pin of the body member when depressed, and a keylock configured to drive the interlocking member to engage the pin of the body member when rotated. The cable is stored in and extendable from an inner volume of the tubular member of the bicycle. The cable is fixedly coupled with the removable member and extends through the aperture of the body member. The removable member is configured to selectively couple with the body member within the cavity in a first configuration for transportation and selectively couple with the body member within the cavity in a second configuration for securing the bicycle to an object.

Another embodiment relates to a lock for a bicycle. The lock includes a body member, a removable member, and a cable. The body member is fixedly coupled with a tubular member of a frame of the bicycle. The body member includes a cavity having an opening at a first end of the body member and an aperture that extends through a rear wall of the body member at a second end of the body member. The removable member is configured to be received within the cavity of the body member. The removable member includes a laterally extending track, a slot, a keylock, and a locking member configured to be driven to translate along the laterally extending track by rotation of the keylock. The locking member is selectively translatable between a locked position and an unlocked position. The cable is stored in and extendable from an inner volume of the tubular member of the bicycle. An an end of the cable is fixedly coupled with the removable member and the cable passes through the aperture of the body member. The cable is configured to be received within the slot and selectively coupled with the removable member by selectively translating the locking member into the locked position.

Another embodiment relates to a bicycle. The bicycle includes a frame and a mount. The frame includes a down tube and a chain stay. The mount connects the down tube and the chain stay and configured to receive a pedal assist unit at an underside of the mount and a battery pack at an upper side of the mount. The mount extends from a lower end of the down tube and from a bottom side of the chain stay. The battery pack is removeably coupleable to the mount and comprises a first portion configured to be positioned along the upper side of the mount and a second portion configured to be positioned in line with the down tube. The first portion contiguous with and angularly offset from the second portion.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 5D is a cross-sectional view of the integrated storage compartment of FIGS. 5A-5C, according to an exemplary embodiment.

FIG. 5E is a cross-sectional view of the integrated storage compartment of FIGS. 5A-45C, according to another exemplary embodiment.

FIG. 5F is a cross-sectional view of the integrated storage compartment of FIGS. 5A-5C, according to still another exemplary embodiment.

DETAILED DESCRIPTION

Figure 1A:
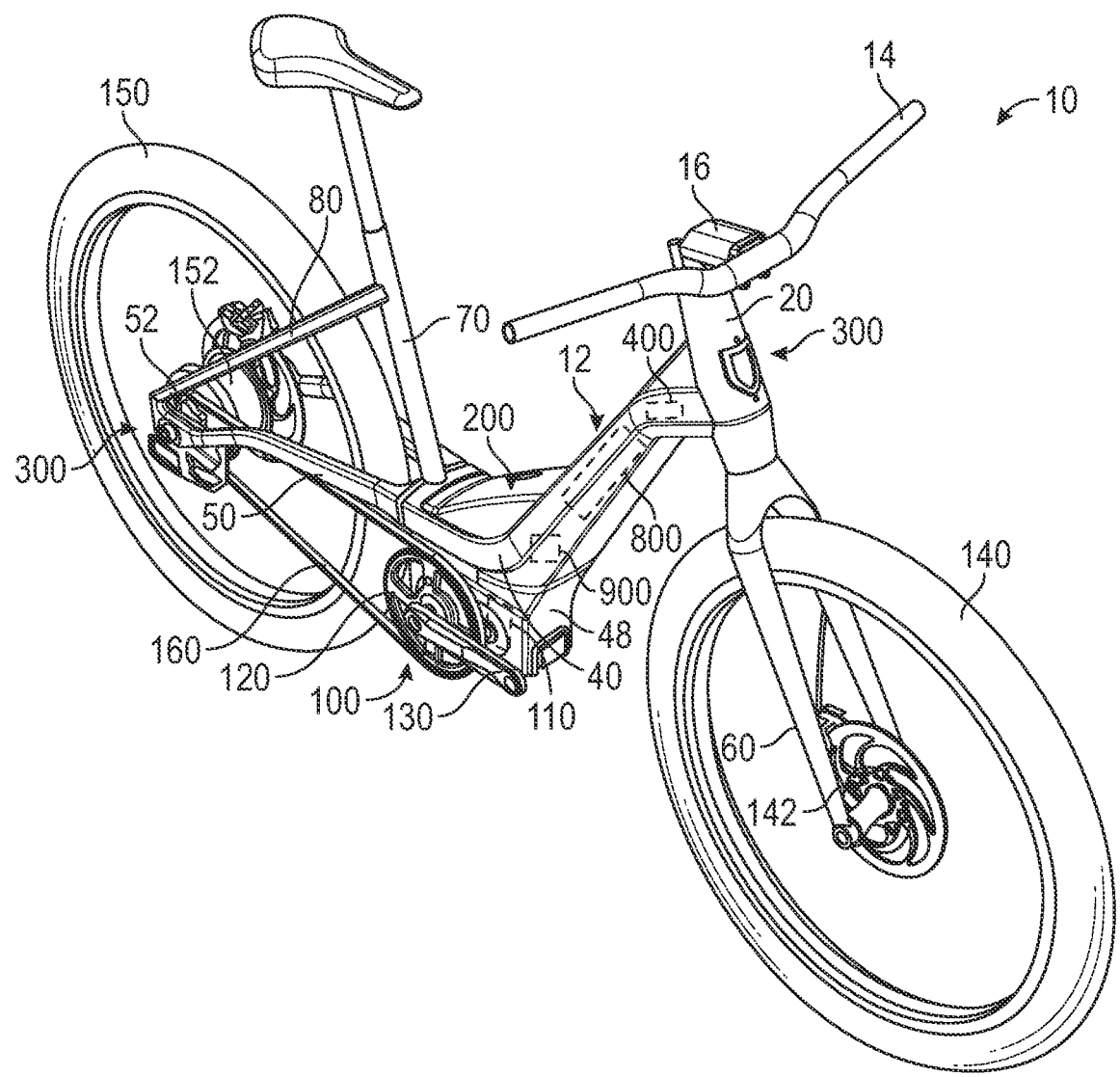
FIG. 1A is a first perspective view of a bicycle, according to an exemplary embodiment.
Figure 1B:
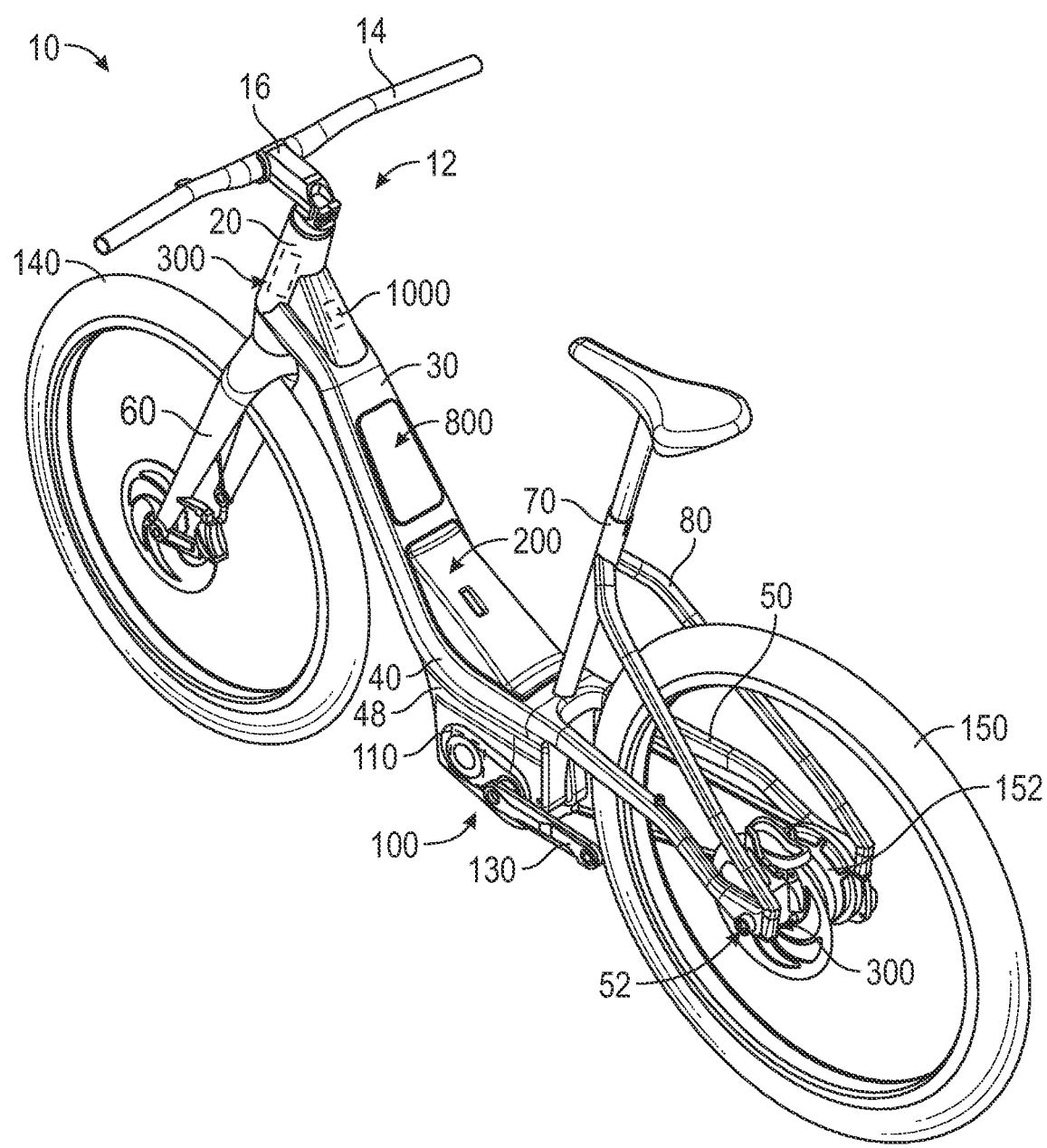
FIG. 1B is a second perspective view of the bicycle of FIG. 1A, according to an exemplary embodiment.
Figure 1C:
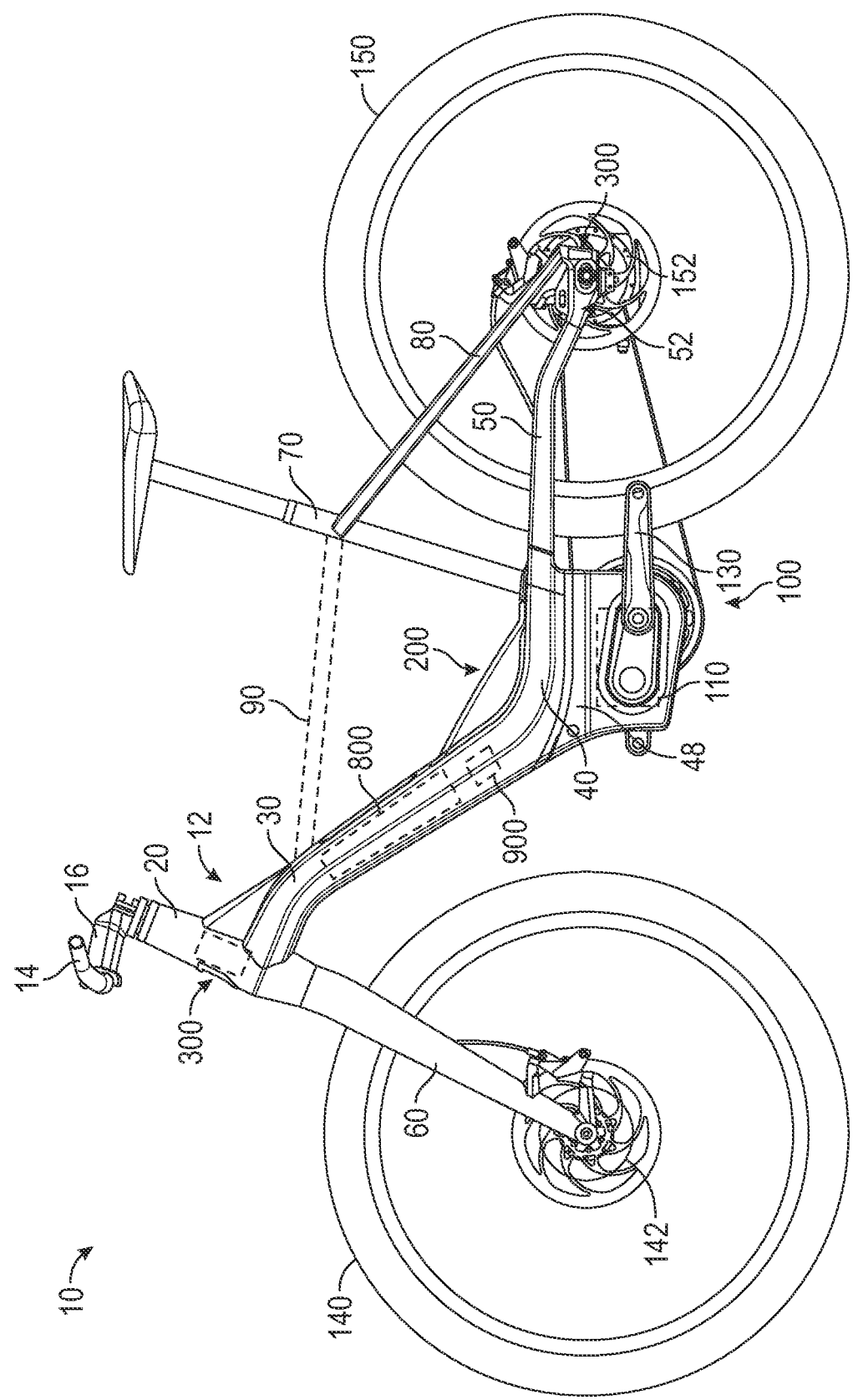
FIG. 1C is a first side view of the bicycle of FIG. 1A, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Bicycle

According to the exemplary embodiment shown in FIGS. 1A-1F, a personal transport vehicle (e.g., an electric bicycle, etc.), shown as bicycle 10, includes (i) a chassis, shown as frame 12; (ii) handlebars, shown as handlebars 14, rotationally or pivotally coupled to the frame 12 via a connector, shown as stem 16; (iii) a drivetrain, shown as drivetrain 100, coupled to the frame 12 and configured to facilitate driving the bicycle 10; (iv) a power supply assembly, shown as battery system 200, coupled to (e.g., integrated into, secured to, etc.) the frame 12 and configured to facilitate powering electrically-operated components of the bicycle 10 (e.g., a drive motor, a headlight, one or more taillights, directional indicators, an electronically-operated glove box, communications circuitry, wireless transmitters, a controller, etc.); (v) a lighting assembly, shown as lighting system 300, having one or more lights variously positioned about (e.g., integrated into, secured to, etc.) the frame 12 (e.g., a headlight, one or more taillights, directional indicators, etc.); (vi) a locking assembly, shown as locking system 400, coupled to (e.g., integrated into, secured to, etc.) the frame 12 and configured to facilitate securing the bicycle 10 to a fixture (e.g., a bicycle rack, a pole, etc.); (vii) a storage area (e.g., a glove box, etc.), shown as storage compartment 900, integrated into the frame 12 and configured to facilitate securely storing items (e.g., valuables, personal items, tools, locks, etc.) within the frame 12; and (viii) a control system, shown as bicycle control system 1000. In some embodiments, the bicycle 10 does not include the battery system 200, the lighting system 300, the locking system 400, the storage compartment 900, and/or the bicycle control system 1000. While shown as a bicycle, in other embodiments, the personal transport vehicle is configured as a tricycle, a scooter, or other recreational or commercial personal transport vehicle.

As shown in FIGS. 1A-1D, the frame 12 includes (i) a first tubular member, shown as head tube 20; (ii) a second tubular member, shown as down tube 30, extending at a downward sloping angle rearward from a lower end of the head tube 20; (iii) a central portion (e.g., main tube, battery and drive assembly body, etc.), shown as central hub 40, extending substantially horizontally rearward from an end of the down tube 30 opposite the head tube 20; (iv) a pair of third tubular members, shown a chain stays 50, extending rearward of the central hub 40 and terminating within a pair of connectors, shown as dropout assemblies 52; (v) a fourth tubular member, shown as front fork 60, extending through and rotatably received by the head tube 20 and coupled to the handlebars 14; (vi) a fifth tubular member, shown as seat tube 70, extending substantially vertically upward from an interface between the central hub 40 and the chain stays 50; (vii) a pair of sixth tubular members, shown as seat stays 80, extending forward at an upward sloping angle from the dropout assemblies 52 to an upper end of the seat tube 70; and, in some embodiments, (viii) a seventh tubular member, shown as top tube 90, extending between the seat tube 70 and an upper end of the head tube 20 and/or an upper end of the down tube 30. In some embodiments, the frame 12 has other configurations with or without certain tubular members, (e.g., does not include the seat stays 80 and/or the top tube 90). The frame 12 may be manufactured from various suitable materials including, but not limited to, steel, aluminum, carbon fiber, and the like, and assembled with a variety of manufacturing techniques (e.g., welding, joining, casting, molding, etc.) as a single/one-piece structure or multiple components.

Figure 1D:
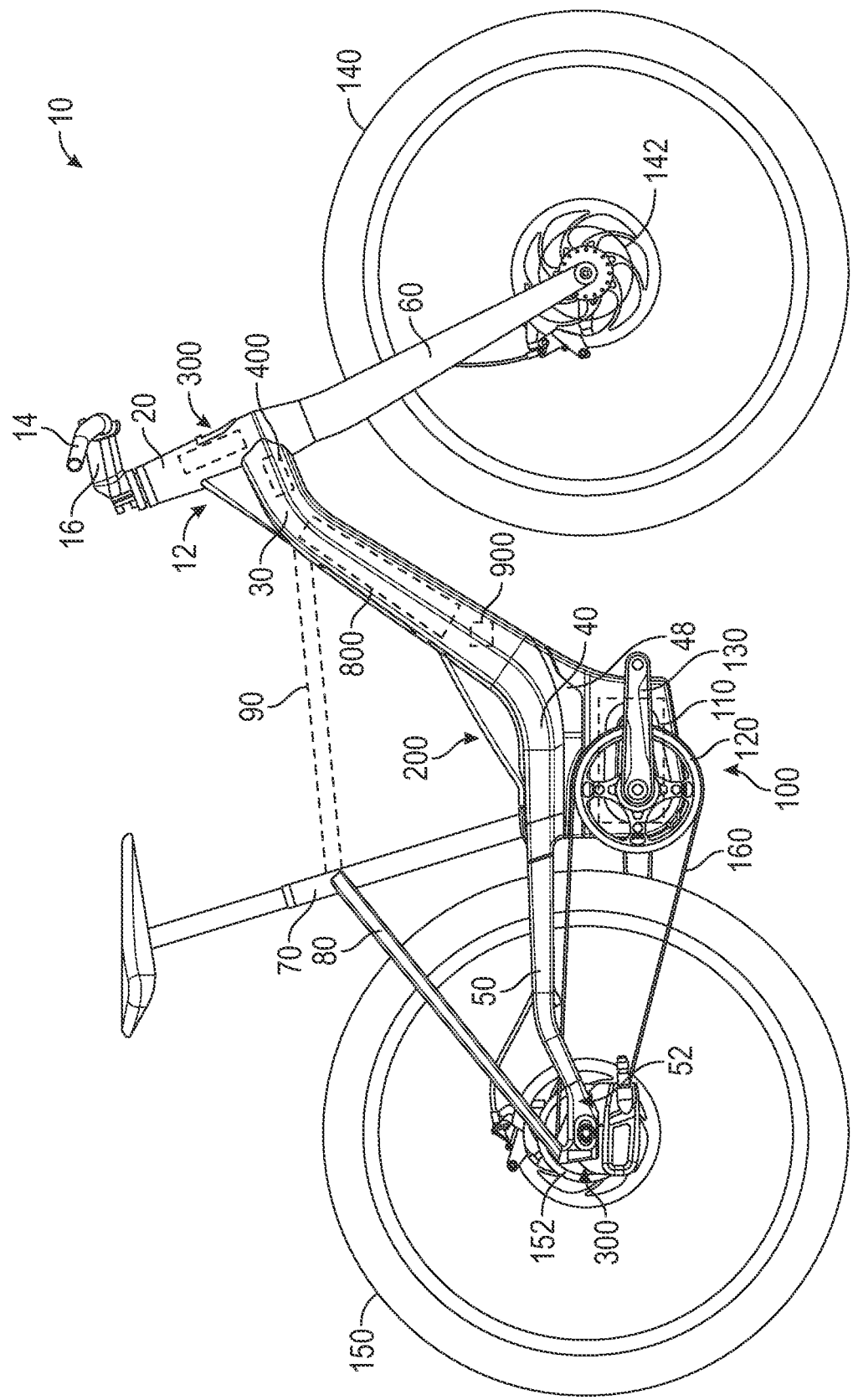
FIG. 1D is a second side view of the bicycle of FIG. 1A, according to an exemplary embodiment.
Figure 1E:
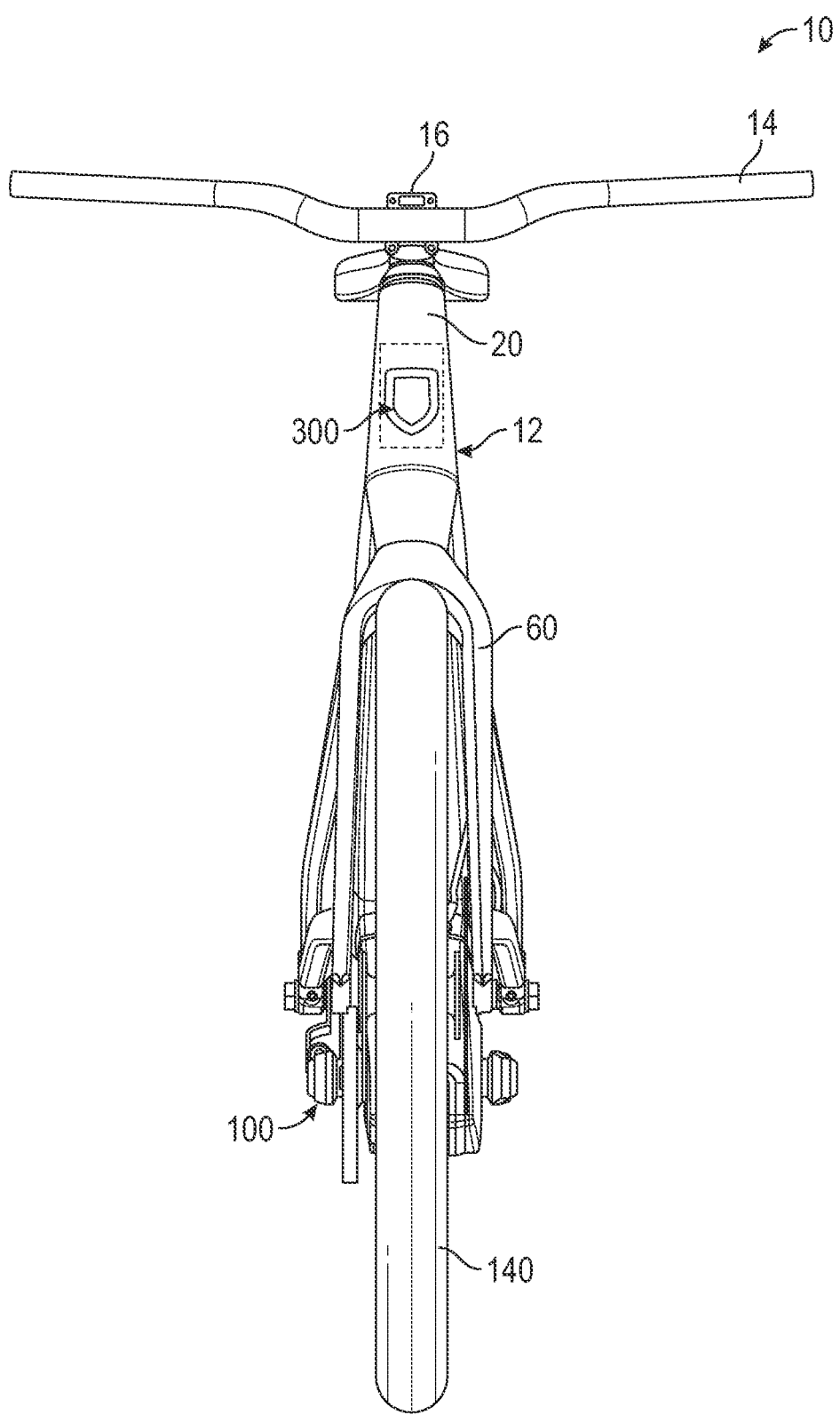
FIG. 1E is a front view of the bicycle of FIG. 1A, according to an exemplary embodiment.
Figure 1F:
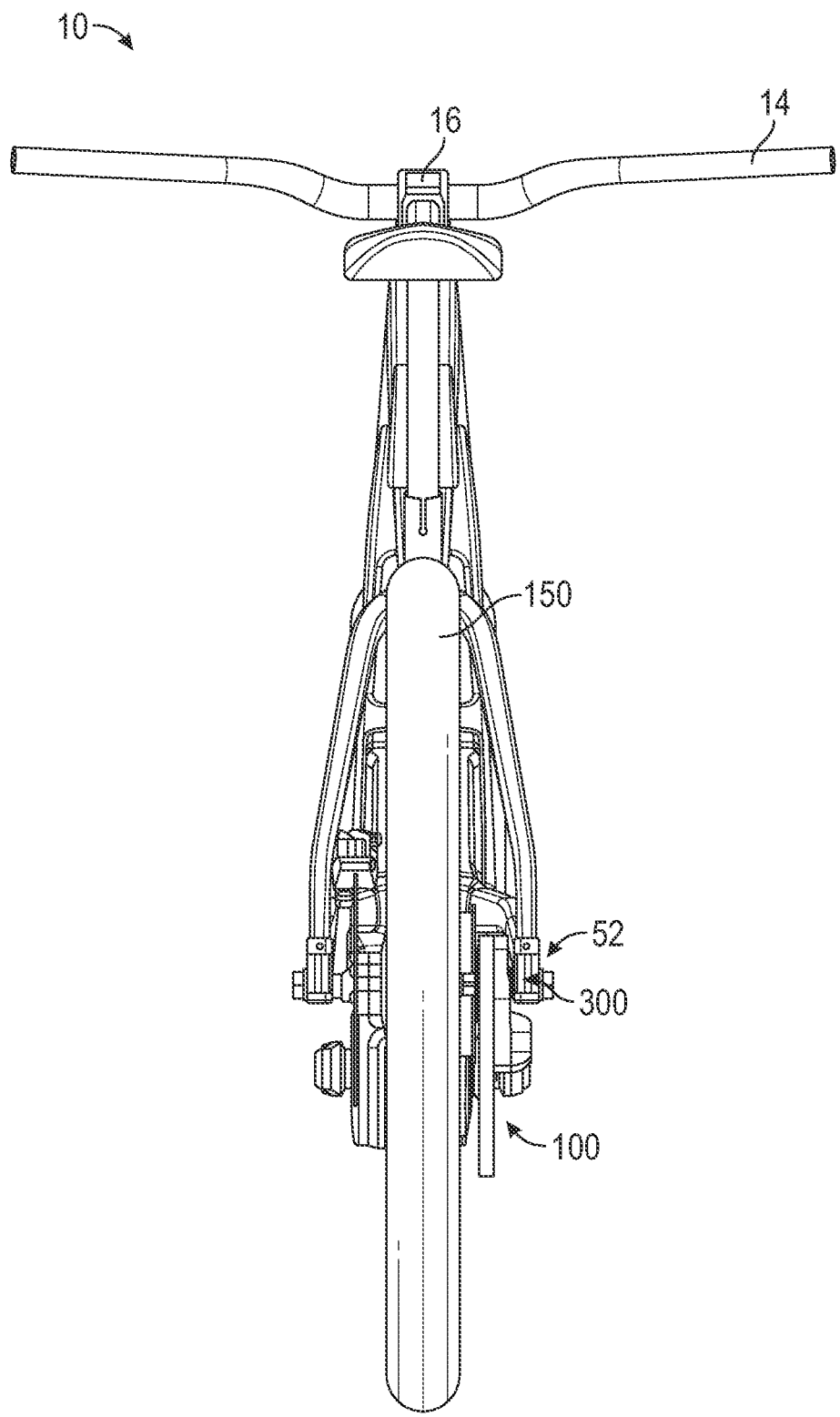
FIG. 1F is a rear view of the bicycle of FIG. 1A, according to an exemplary embodiment.

As shown in FIGS. 1A-1D, the drivetrain 100 includes an electromotive device, shown as drive motor 110, disposed within a main housing, shown as central housing 48, positioned along and/or within a bottom portion of the central hub 40 (e.g., beneath the battery system 200, etc.). According to an exemplary embodiment, the drive motor 110 is powered by the battery system 200. In some embodiments, the drive motor 110 selectively functions as a generator to recharge the battery system 200 (e.g., during downhill events, etc.). As shown in FIGS. 1A and 1D, the drivetrain 100 includes a driver, shown as crankset 120, having drive arms, shown as crankarms 130, extending therefrom to facilitate manually operating the crankset 120. In some embodiments, the crankset 120 is configured as or includes a single sprocket or gear such that the drivetrain 100 has a fixed gear ratio. In some embodiments, the crankset 120 is configured as or includes a plurality of sprockets or gears such that the drivetrain 100 has a variable gear ratio. According to an exemplary embodiment, the drive motor 110 is mechanically coupled to the crankset 120 to facilitate operating the crankset 120 with the drive motor 110. In some embodiments, the drive motor 110 is used to supplement the operation of the crankarms 130 (e.g., a pedal-assist system, etc.). In some embodiments, the crankset 120 is configured to rotate independently of the crankarms 130 when the crankset 120 is being driven by the drive motor 110 (e.g., so that the crankarms 130 can be maintained stationary while the drive motor 110 drives the crankset 120, etc.).

As shown in FIGS. 1A-1F, the drivetrain 100 includes (i) a first tractive element, shown as front wheel 140, having a first hub, shown as front hub 142, rotatably coupled to a bottom end of the front fork 60 and (ii) a rear tractive element, shown as rear wheel 150, having a second hub, shown as rear hub 152, rotatably coupled to the dropout assemblies 52. In some embodiments, the rear hub 152 is configured as or includes a single sprocket or gear such that the drivetrain 100 has a fixed gear ratio. In some embodiments, the rear hub 152 is configured as or includes a plurality of sprockets or gears (e.g., a cassette, etc.) such that the drivetrain 100 has a variable gear ratio. As shown in FIGS. 1A and 1D, the drivetrain 100 includes a driving element (e.g., belt, chain, pulley, etc.), shown as belt 160, extending between the crankset 120 and the rear hub 152 to facilitate mechanically driving the rear wheel 150 through the crankset 120 with the drive motor 110 and/or the crankarms 130.

Battery System

Figure 2A:
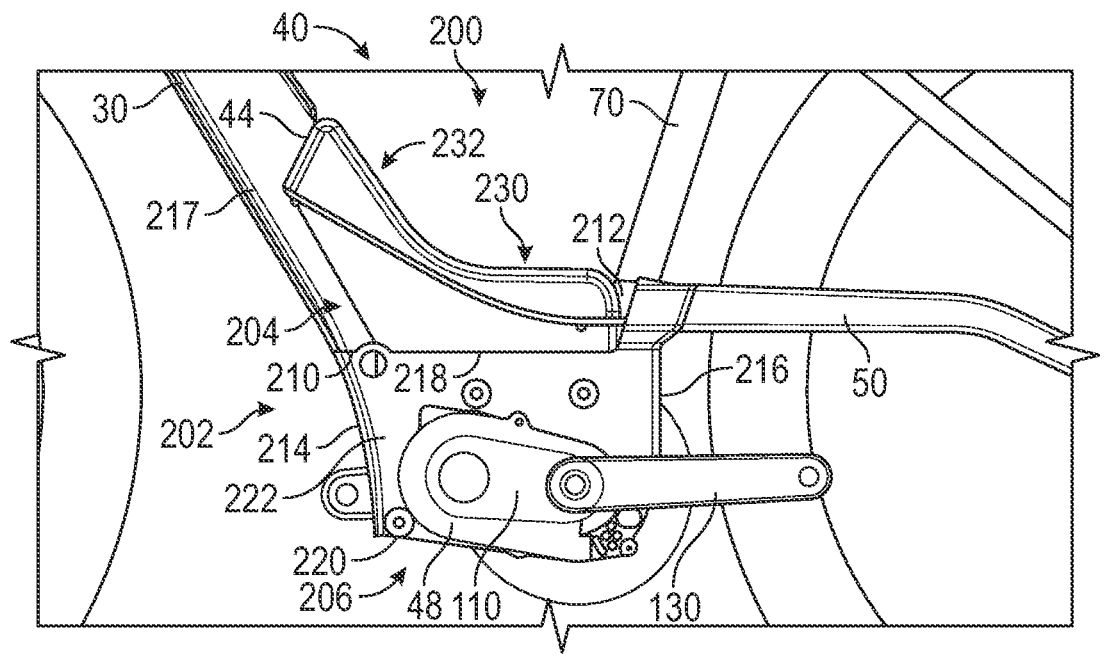
FIG. 2A is side view of a mount, a battery, and a pedal-assist unit of the bicycle of FIGS. 1A-1F, according to an exemplary embodiment.

According to the exemplary embodiments shown in FIGS. 2A-2M, the battery system 200 is shown according to various embodiments. As shown in FIG. 2A, the battery system 200 includes a base, shown as mount 202; an energy storage device, shown as battery pack 204, selectively coupled to the mount 202; and a drive unit, shown as pedal-assist unit 206, coupled to the mount 202. The pedal-assist unit 206 includes the drive motor 110 housed within a housing, shown as central housing 48, of the central hub 40. Components of the drivetrain 100 (e.g., the crankset 120, the crankarms 130, etc.) are coupled to the central housing 48. The central housing 48 may also house a gearbox, a controller, power electronics, one or more sensors (e.g., torque sensors), and/or other electronic components configured to facilitate the pedal-assist unit 206 in providing assistance to a user in pedaling the bicycle 10. For example, the pedal-assist unit 206 may be configured to automatically detect a torque input to the crankarms 130 by a user (e.g., via the feet of a rider of the bicycle) and control the drive motor 110 to provide an assistive torque having a magnitude determined as a function of the amount of torque input by the user. The battery system 200 is located at the central hub 40 of the frame 12.

The mount 202 and the battery pack 204 may provide several advantages over traditional e-bikes. By way of example, the mount 202 may be configured to interface with both the battery pack 204 and the pedal-assist unit 206, thereby providing a unified structure that facilitates efficient connection between the battery pack 204 and the pedal-assist unit 206, reduces the space occupied by the battery pack 204 and the pedal-assist unit 206, and limits the number of connection devices, mounting features, etc. required to secure the battery pack 204 and the pedal-assist unit 206 to the bicycle 10. By way of another example, the mount 202 may be positioned between and below the down tube 30 and the chain stays 50 such that both the battery pack 204 and the pedal-assist unit 206 are positioned in a low and central position on the bicycle 10. The low, central position of the battery pack 204 and the pedal-assist unit 206 provides a low center of mass for the bicycle 10, which may improve handling (e.g., balancing, stability, steering, etc.) of the bicycle 10. Additionally, when the bicycle 10 is ridden across bumps, cracks, potholes, etc., the low-central position of the battery pack 204 and various features of the battery pack 204 and the mount 202 may reduce the risk that the battery pack 204 will be disrupted, disconnected, etc. as a result of jolts, vibrations, etc. of the bicycle 10, as described in greater detail herein.

As shown in FIG. 2A, the mount 202 extends from a bottom end 210 of the down tube 30 to the chain stays 50, where the mount 202 extends from a forward end 212 of the chain stays 50. That is, the mount 202 extends along the length of the central hub 40 of the frame 12. The mount 202 includes a leading surface 214 aligned with the underside 217 of the down tube 30. The leading surface 214 is slightly curved to smoothly transition from an angle aligned with the underside 217 of the down tube 30 to an angle approximately perpendicular to a ground surface (e.g., the road, a trail, etc.) on which the bicycle 10 can be ridden. The leading surface 14 may, for example, have a pointed, tapered, or otherwise aerodynamically-optimized profile that matches a curvature of the down tube 30. As shown in FIG. 2A, the mount 202 includes a trailing surface 216 approximately aligned with the seat tube 70 and the forward end 212 of the chain stays 50. As shown in FIG. 2A, the trailing surface 216 is substantially straight (i.e., from the side view in FIG. 2A) and approximately perpendicular to the ground surface. In other embodiments, the leading surface 214 and/or the trailing surface 216 are otherwise shaped.

As shown in FIG. 2A, the mount 202 includes a top surface 218 that extends from the down tube 30 to the forward end 212 of the chain stays 50, i.e., along the central hub 40 of the frame 12. The top surface 218 is shown as substantially straight and approximately parallel to the ground surface. The top surface 218 is positioned slightly below the forward end 212 of the chain stays 50. The top surface 218 is configured to receive the battery pack 204 such that the battery pack 204 is positioned along the top surface 218 between (i) the chain stays 50 and the seat tube 70 and (ii) the down tube 30. The top surface 218 may include a pair of substantially-parallel side walls, such that the battery pack 204 can be received between the side walls when placed along the top surface 218. In some embodiments, the central hub 40 of the frame 12 defines an internal cavity, shown as center recess 44, formed therein with the top surface 218 forming a floor of the center recess 44. In such embodiments, the center recess 44 is configured to receive the battery via the top side of the central hub 40 of the frame 12 (e.g., via a center opening 42 defined by the down tube 30 and the central hub 40).

As shown in FIG. 2A, the mount 202 includes a lower surface 220. The lower surface 220 is concave and is configured to receive the pedal-assist unit 206. That is, the lower surface 220 is shaped to match an external surface of the pedal-assist unit 206 and to allow the pedal-assist unit 206 to be received by the mount 202 with the pedal-assist unit 206 positioned substantially between the leading surface 214 and the trailing surface 216. As shown in FIG. 2A, the mount 202 includes side surfaces 222 which join the leading surface 214, the trailing surface 216, the top surface 218, and the lower surface 220. The side surfaces 222 are substantially perpendicular to the ground surface on which the bicycle 10 travels and substantially parallel to the direction of movement of the bicycle 10.

Figure 5A:
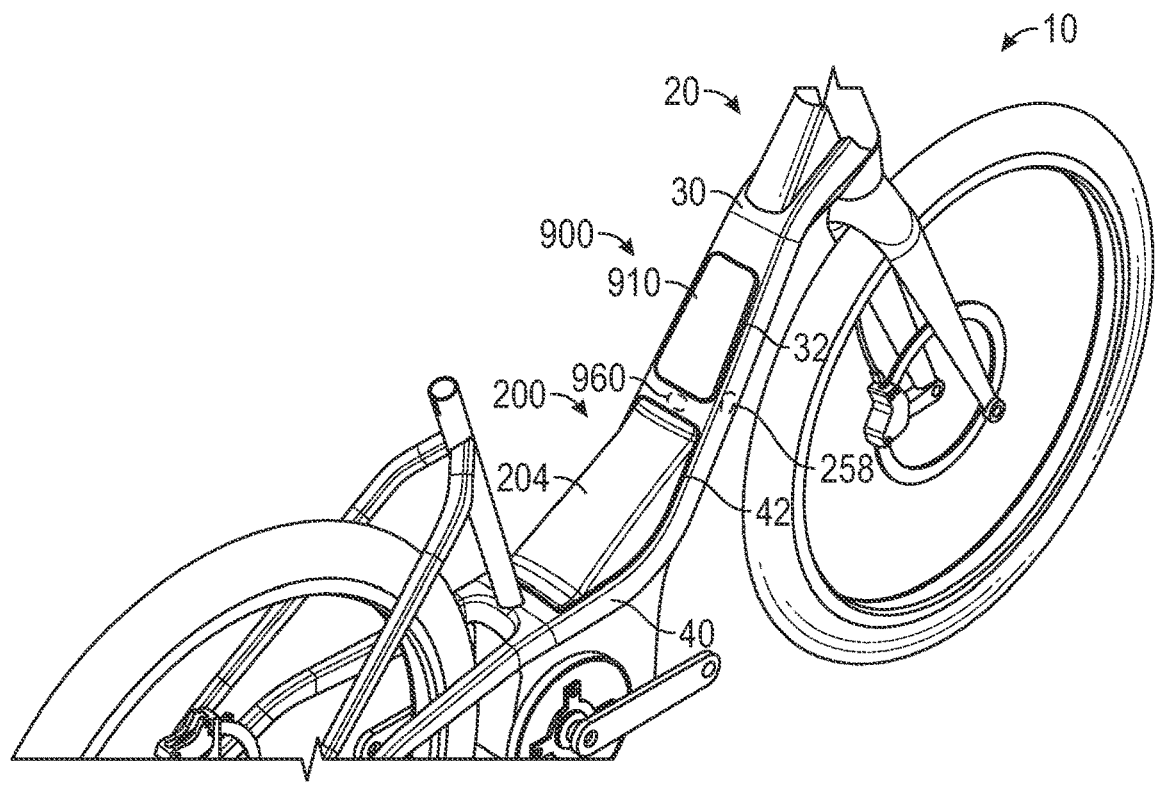
FIG. 5A is a perspective view of the bicycle of FIGS. 1A-1F having an integrated storage compartment in a first orientation, according to an exemplary embodiment.

In some embodiments, the mount 202 is manufactured as a separate piece from the frame 12 (i.e., separate from the down tube 30, the chain stays 50, the seat tube 70), then coupled to the frame 12 (e.g., welded to the frame 12, bolted to the frame 12, bonded, etc.). In other embodiments, for example as shown in FIG. 5A, the mount 202 is manufactured as an integral part of the frame 12 (e.g., in a common mold or cast with the chain stays 50 and down tube 30, etc.). The frame 12 may, therefore, be formed with the central hub 40 of the frame 12 extending continuously from the down tube 30 to the chain stays 50 and seat tube 70, with the mount 202 positioned along and integral with a bottom side of the central hub 40 of the frame 112. The center recess 44 (or channel, passageway, etc.) is formed in the frame 12 such that the battery pack 204 can be inserted into the center recess 44 and brought into contact with the mount 202. In such an embodiment, the top surface 218 of the mount 202 may form a floor of the center recess 44. In such embodiments, without the mount 202, the down tube 30 and the chain stays 50 would not be connected at a lower portion of the bicycle 10 and the bicycle 10 may lack the structural integrity needed for effective use of the bicycle 10. Accordingly, in such embodiments, the mount 202 may be included to provide (i) coupling of the battery pack 204 and the pedal-assist unit 206 to the bicycle 10 and (ii) structural support to improve stiffness of the bicycle 10 and provides sufficient support for the weight of the battery pack 204 and the pedal-assist unit 206.

As shown in FIG. 2A, the battery pack 204 is positioned (i) along the top surface 218 of the mount 202 and (ii) between the chain stays 50 and the down tube 30 (i.e., along the central hub 40). The battery pack 204 includes a first portion 230 and a second portion 232. According to an exemplary embodiment, the first portion 230 and the second portion 232 are contiguous such that the battery pack 204 is formed as a continuous member. The first portion 230 is angularly offset from the second portion 232. The first portion 230 is parallel with the chain stays 50 and the top surface 218 of the mount 202, while the second portion 232 is parallel with the down tube 30. The angular offset of the first portion 230 relative to the second portion 232 allows the first portion 230 to be positioned along the top surface 218 of the mount 202 with the second portion 232 extending from the top surface 218 in a direction aligned with the down tube 30 and towards the head tube 20.

As shown FIG. 2A, the center recess 44 is configured to receive the first portion 230 and the second portion 232 of the battery pack 204. The down tube 30, the central hub 40, the mount 202, and the battery pack 204 are thereby designed such that the battery pack 204 may appear to be a continuous member of the down tube 30 when installed as shown in FIG. 2A, as opposed to an alternative design where a battery may be positioned on an external surface of the down tube 30 and may detract from the elegance of the frame design. The central hub 40, the mount 202, and the battery pack 204 are thereby designed to maximize an internal space of the frame and to allow the battery pack 204 to be positioned in a low position on the bicycle 10.

As shown in FIGS. 2B and 2D-2G, the battery pack 204 is configured as a first battery, shown as first battery pack 250 (i.e., a first embodiment of the battery pack 204). As shown in FIGS. 2C and 2H-2J, the battery pack 204 is configured as a second battery, shown as second battery pack 251 (i.e., a second embodiment of the battery pack 204). According to an exemplary embodiment, the second battery pack 251 is configured to accommodate more battery cells than the first battery pack 250 such that the second battery pack 251 can store more energy than the first battery pack 250 while weighing more and consuming more space than the first battery pack 250.

As shown in FIGS. 2B and 2D-2G, the first battery pack 250 includes a top shell 252, a bottom shell 254, and a body 256. The top shell 252 and the bottom shell 254 substantially encloses the body 256. The bottom shell 254 is configured to interface with the mount 202 and the down tube 30 to allow the first battery pack 250 to be removeably coupled to the bicycle 10. For example, the bottom shell 254 may substantially match a contour of the top surface 218 of the mount 202 and the center recess 44 in the central hub 40. The bottom shell 254 may also include a plate 257 extending therefrom and configured to engage a first locking mechanism, shown as lock 258, integrated into the mount 202 and the frame 12, as described in greater detail herein. In other embodiments, the plate 257 extends from the body 256 and through (e.g., across, out of, etc.) the bottom shell 254.

According to an exemplary embodiment, the body 256 is configured to receive multiple battery cells. For example, the body 256 of the first battery pack 250 may be configured to receive thirty battery cells. In the embodiment shown, the cells are oriented to extend laterally across the bicycle 10. The body 256 may include various conductive pathways (e.g., wiring, etc.) to electrically couple the battery cells to an external contact 260 positioned on the body 256. The external contact 260 extends from the body 256 beyond (e.g., through, across, out of, etc.) the top shell 252 and the bottom shell 254 and provides for communication of electrical current into and out of the battery cells of the first battery pack 250, thereby facilitating charging and discharging of the battery cells. As shown in the examples herein, the external contact 260 is positioned on the battery pack 204 such that the external contact 260 extends towards a rear of the bicycle 10 and a bottom of the battery pack 204 coupled to the bicycle 10. In some embodiments, the body 256 also includes a charge port accessible through the top shell 252 and configured to connect to a charging cable that allows the battery cells to be charged without removing the battery pack 204 from the bicycle.

As shown in FIGS. 2C and 2H-2J, the second battery pack 251 includes the bottom shell 254 and the body 256 that are substantially the same as the bottom shell 254 and the body 256 of the first battery pack 250. However, the second battery pack 251 does not include the top shell 252. Rather, the second battery pack 251 includes a top shell 262, which facilitates providing a larger internal volume within the second battery pack 251 than the top shell 252 provides within the first battery pack 250. Accordingly, more battery cells can be fit within the second battery pack 251 than within the first battery pack 250, thereby providing different amounts of electrical energy storage. For example, the second battery pack 251 may be configured to include forty battery cells. Various numbers of battery cells are possible in various embodiments.

As shown in FIGS. 2C and 2H-2J, the top shell 262 of the second battery pack 251 has a substantially flat upper surface. The upper surface of the top shell 252 of the first battery includes a curvature that tracks the angular profile between the down tube 30 and the chain stays 50 such that the upper surface of the top shell 252 of the first battery pack 250 is aligned with both the down tube 30 and the chain stays 50. By using the space above the body 256 to provide various sizes of batteries, the various sizes of battery pack 204 (e.g., having different numbers and/or sizes of battery cells) may be interchangeably mounted on the bicycle 10 in a uniform fashion, facilitating customization based on maximum power preferences, weight preferences, maximum operational time preferences, other performance-based preferences, aesthetic preferences, etc.

As shown in FIGS. 2D-2J, the body 256 has the external contact 260 and the plate 257 extending from the body 256. The plate 257 extends from an opposite end of the body 256 relative to the external contact 260. The plate 257 and the external contact 260 extend through (e.g., across, out of, etc.) the bottom shell 254 such that the plate 257 and the external contact 260 can engage the mount 202. As shown in FIGS. 2D-2J, a protrusion 270 extends from the battery pack 204 (i.e., the first battery pack 250 or the second battery pack 251) proximate the external contact 260. The protrusion 270 may be formed by a combination of (i) the bottom shell 254 and (ii) the top shell 252 of the top sell 262. The protrusion 270 is configured to engage a receptacle, lip, recess, or other retaining structure of the mount 202 to help secure the battery pack 204 to the mount 202.

Figure 2B:
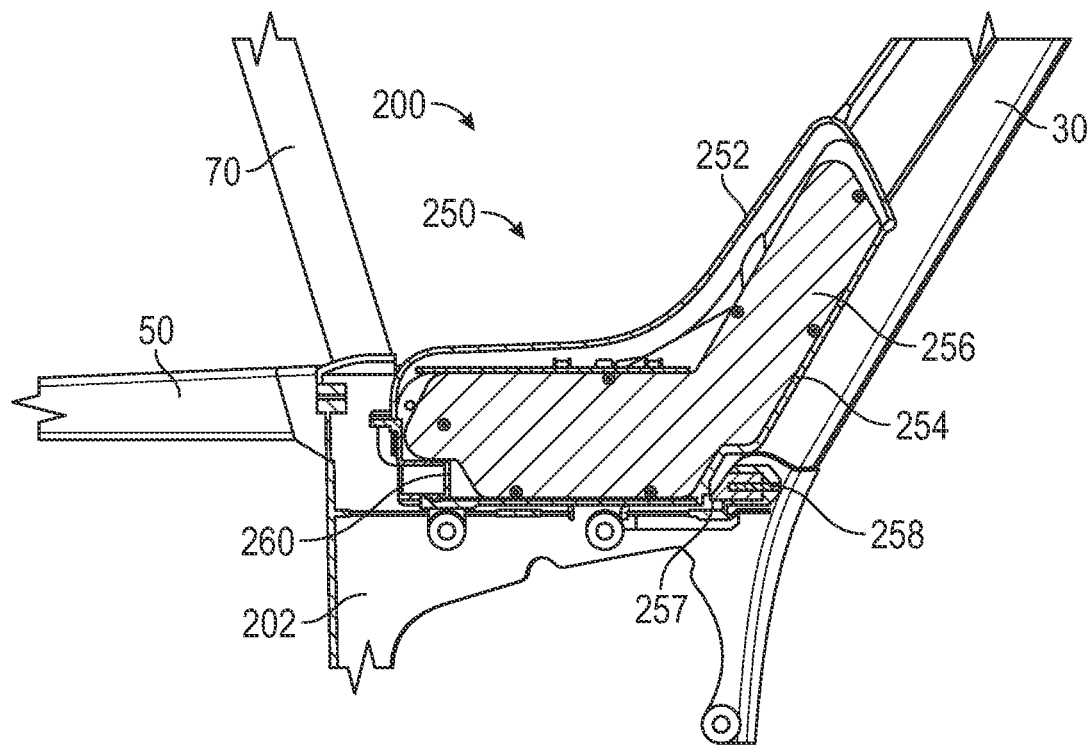
FIG. 2B is a cross-sectional side view of the mount and the battery of FIG. 2A, according to an exemplary embodiment.
Figure 2C:
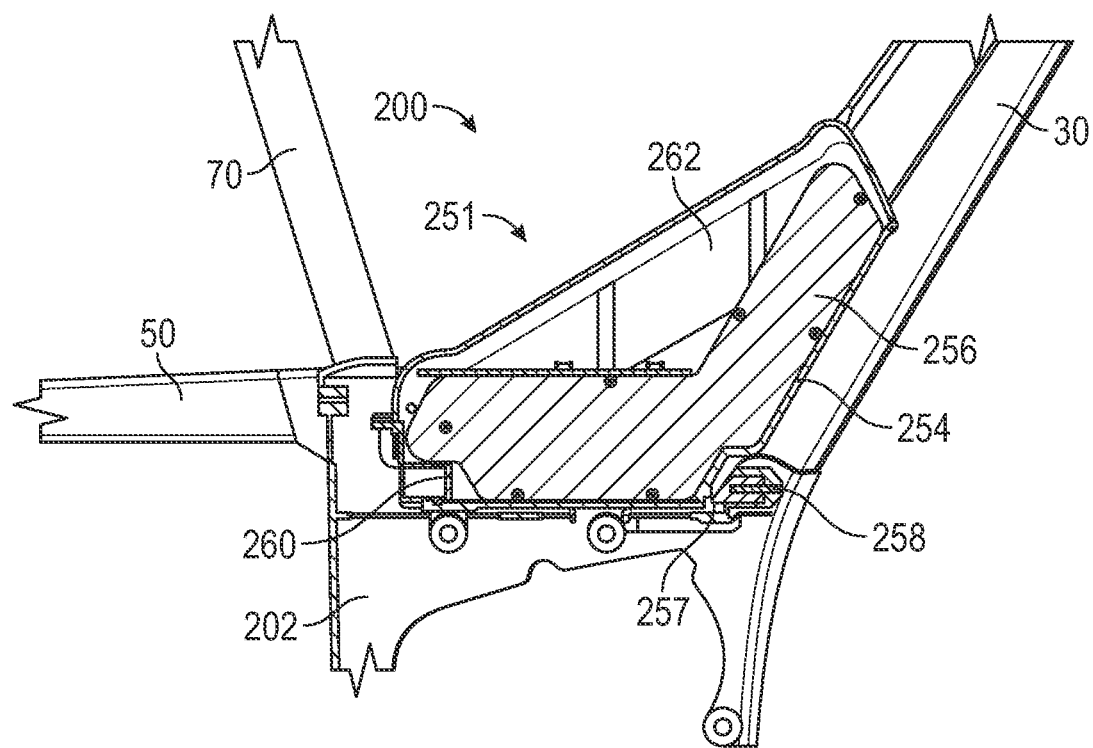
FIG. 2C is a cross-sectional side view of the mount of FIG. 2A with a second battery, according to an exemplary embodiment.
Figure 2D:
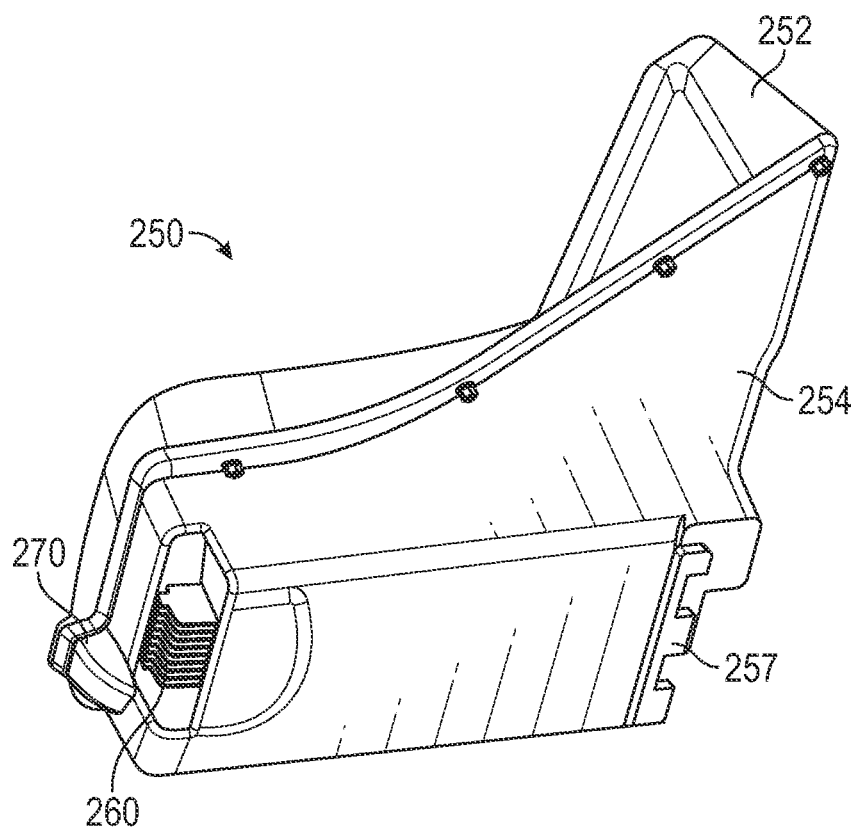
FIG. 2D is a first perspective view of the battery of FIG. 2B, according to an exemplary embodiment.
Figure 2E:
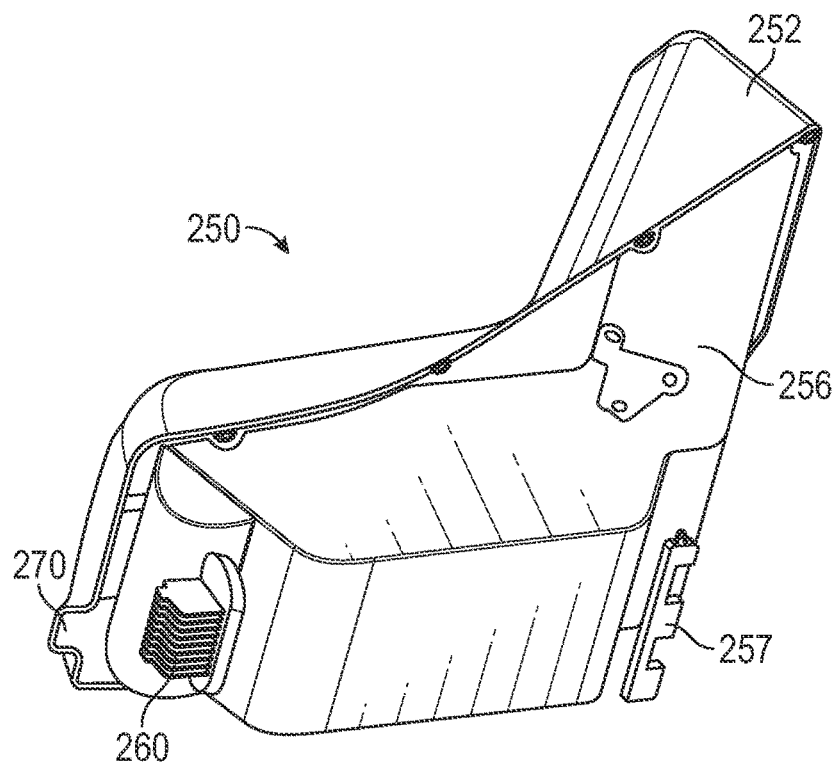
FIG. 2E is a second perspective view of the battery of FIG. 2B, according to an exemplary embodiment.
Figure 2F:
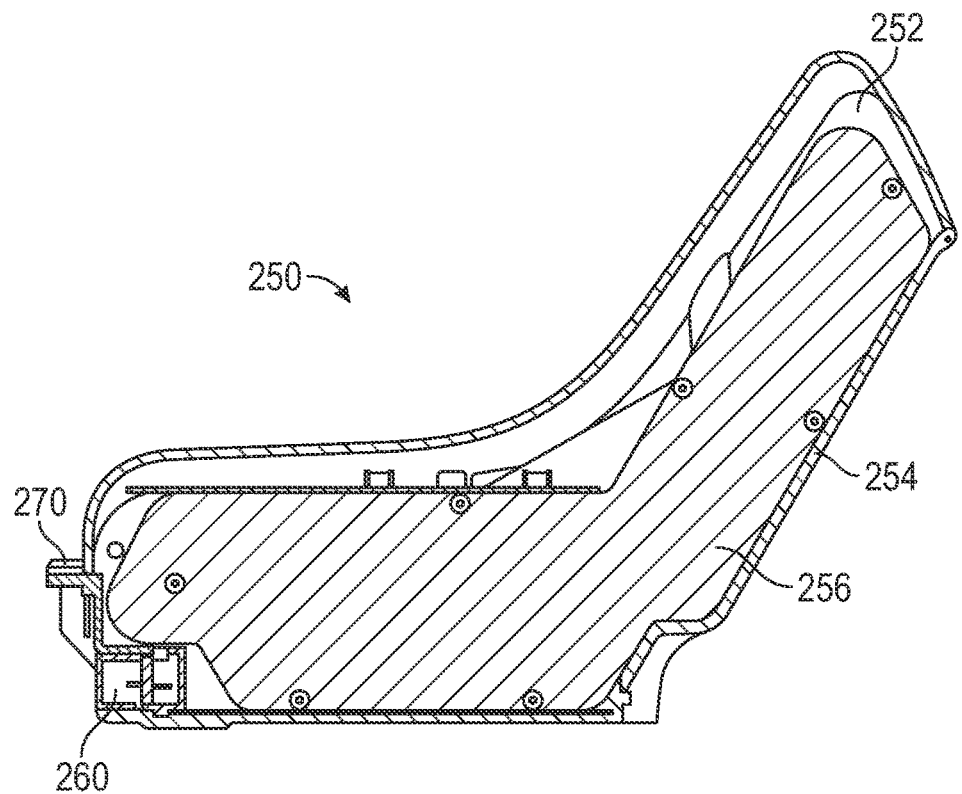
FIG. 2F is a cross-sectional side view of the battery of FIG. 2B, according to an exemplary embodiment.
Figure 2G:
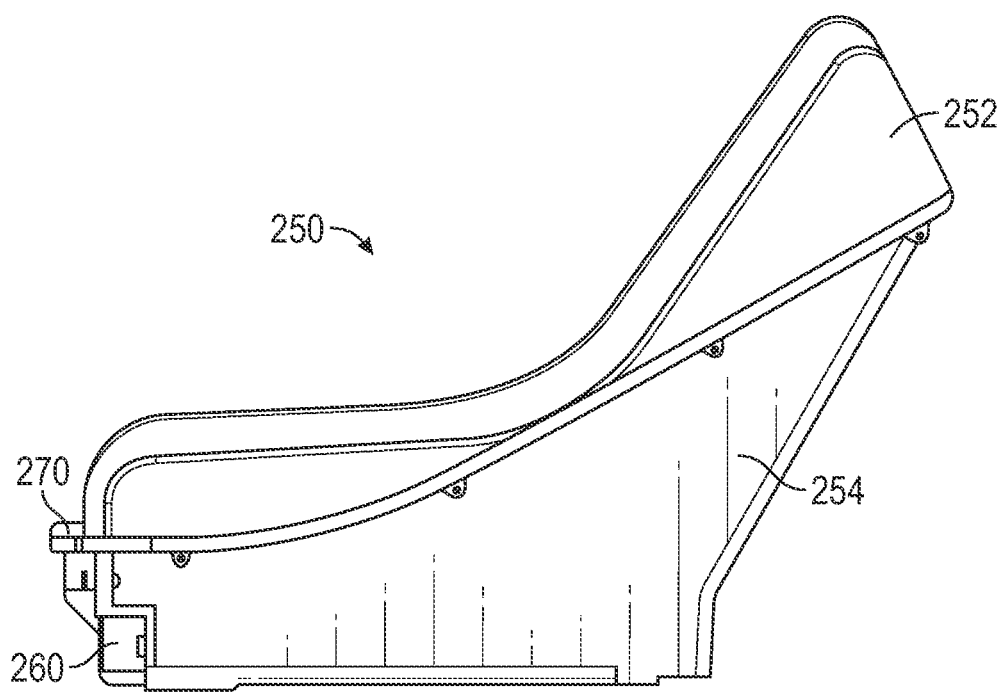
FIG. 2G is a cross-sectional view of the battery of FIG. 2B, according to an exemplary embodiment.
Figure 2H:
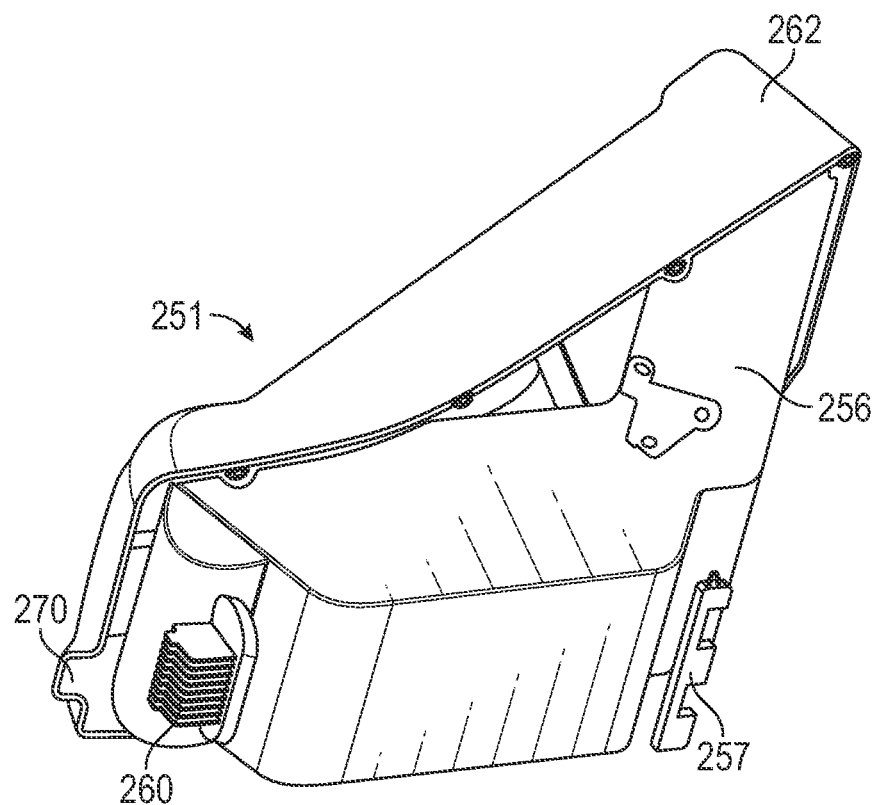
FIG. 2H is a perspective view of the second battery of FIG. 2C, according to an exemplary embodiment.
Figure 2I:
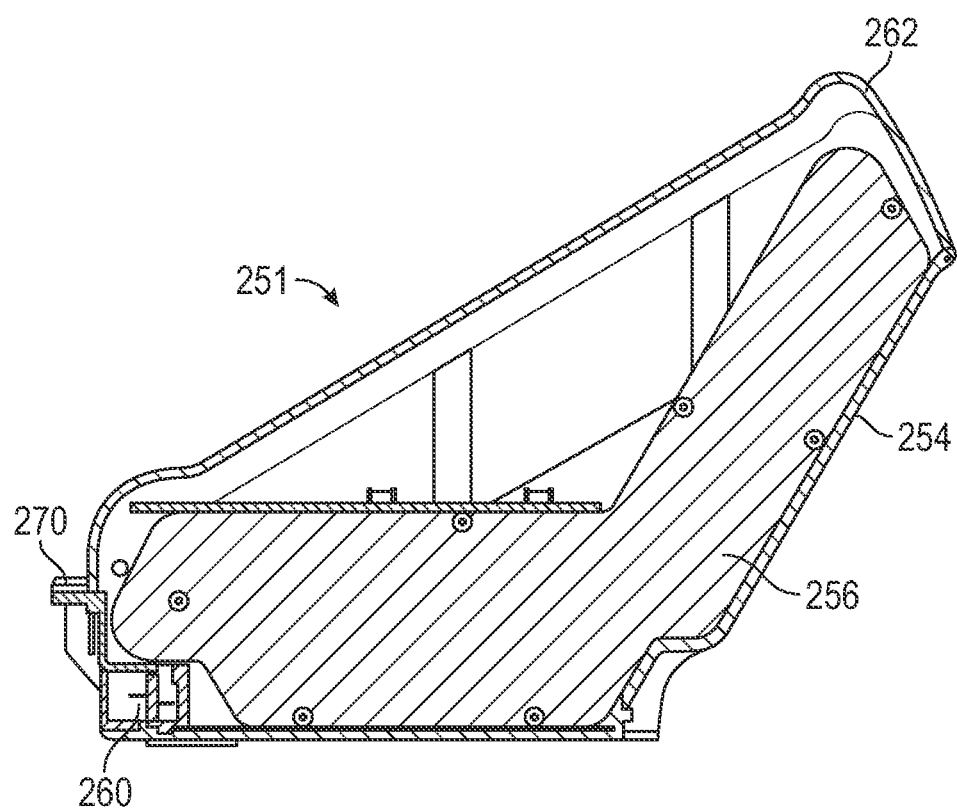
FIG. 2I is a cross-sectional side view of the second battery of FIG. 2C, according to an exemplary embodiment.
Figure 2J:
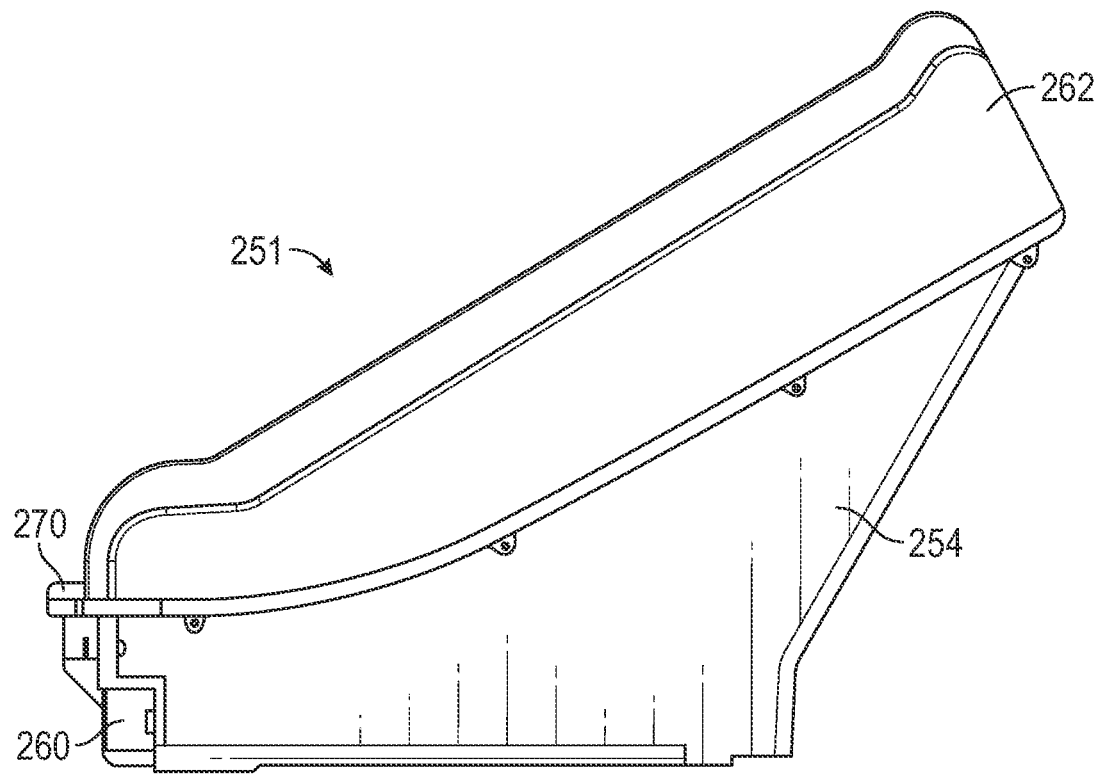
FIG. 2J is a side view of the second battery of FIG. 2C, according to an exemplary embodiment.
Figure 2K:
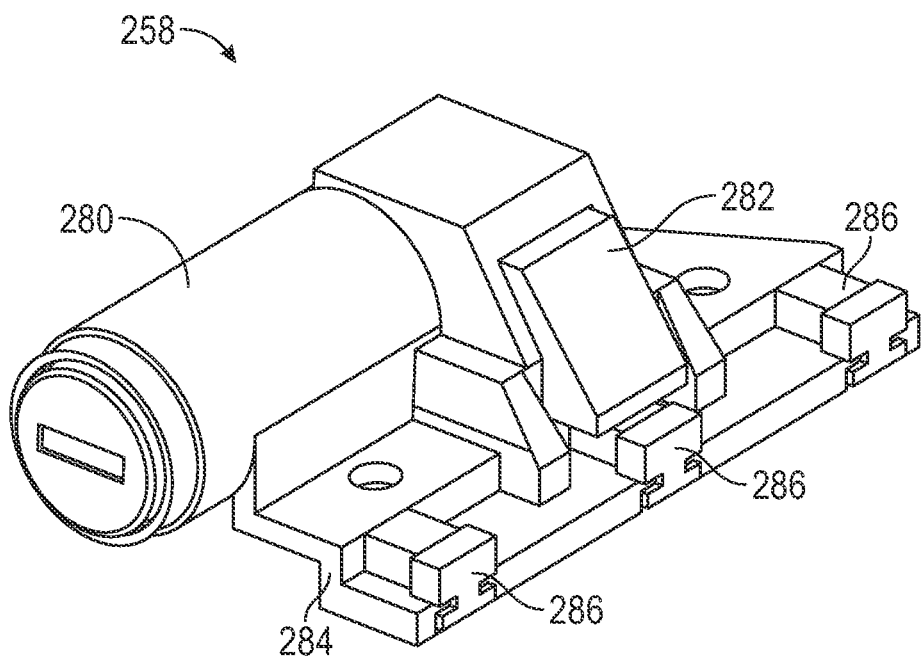
FIG. 2K is a first perspective view of a lock included with the mount of FIG. 2A, according to an exemplary embodiment.
Figure 2L:
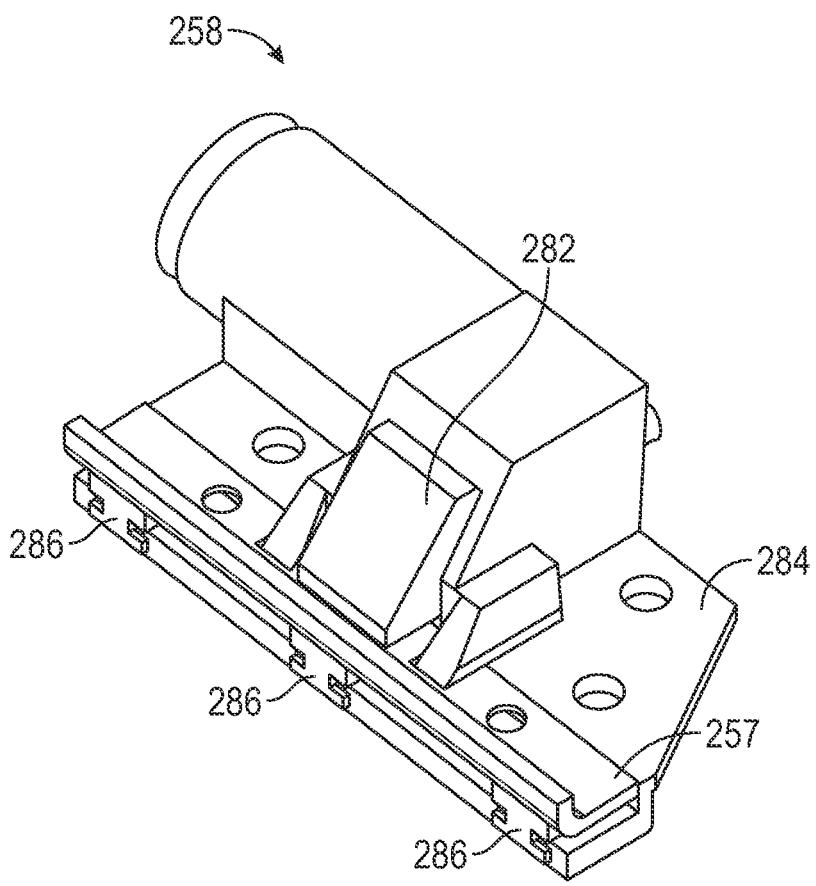
FIG. 2L is a second perspective view of the lock of FIG. 2K, according to an exemplary embodiment.
Figure 2M:
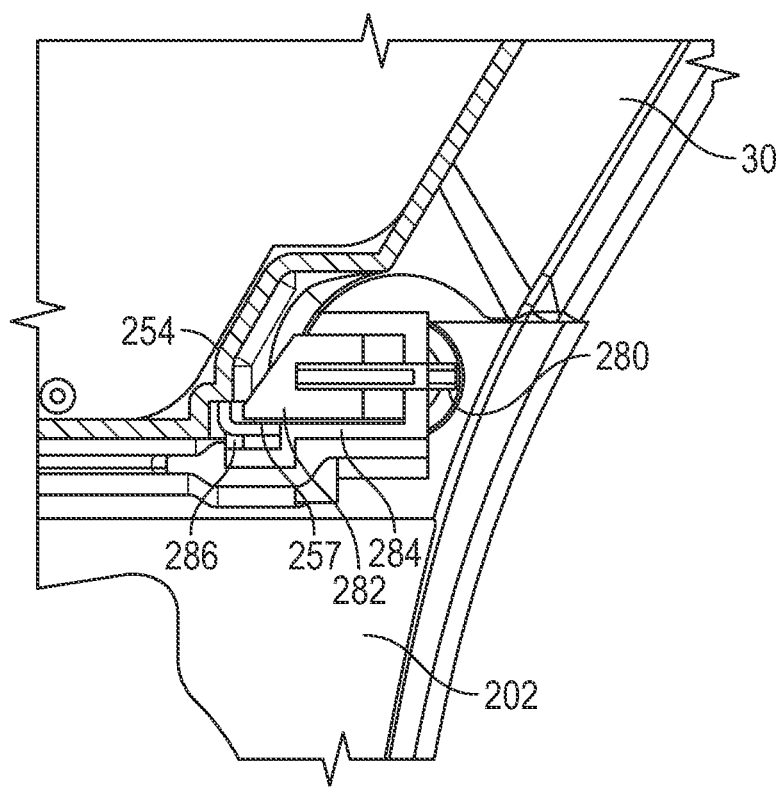
FIG. 2M is a cross-sectional side view of the lock of FIG. 2K, according to an exemplary embodiment.

As shown in FIGS. 2K-2M, the lock 258 includes a lock cylinder 280 connected to a lock bolt 282, and a baseplate 284 coupled to the lock cylinder 280. The lock bolt 282 can selectively slide relative to the baseplate 284. A plurality of pads (e.g., rubber pads, etc.), shown as pads 286, are positioned between the baseplate 284 and the lock bolt 282. The pads 286 are separated from the lock bolt 282 by a space configured to receive the plate 257, which extends from the battery pack 204. The lock cylinder 280 is configured to receive a key, which can be inserted into the lock cylinder 280 and turned to slide the lock bolt 282 relative to the baseplate 284 and the lock cylinder 280. The lock 258 may be configured such that the lock bolt 282 is substantially immobile unless the key is inserted into the lock cylinder 280. Alternatively, the lock 258 may be electrically activated (e.g., via the bicycle control system 1000, etc.).

The lock bolt 282 is moveable between a locked position and an unlocked position by translating in a direction perpendicular to an axis of the lock cylinder 280. In the unlocked position, the lock bolt 282 is retracted towards the lock cylinder 280 and away from the pads 286. When the lock bolt 282 is in the unlocked position, the plate 257 can be moved into or out of contact with the pads 286. Accordingly, when the lock bolt 282 is in the unlocked position, the battery pack 204 can be freely added to or removed from the bicycle 10.

As shown in FIG. 2L, the plate 257 is prevented from moving away from the lock 258 by the lock bolt 282 when the lock bolt 282 is in the locked position and the plate 257 is in contact with the pads 286. The plate 257 may compress the pads 286 when engaged by the lock bolt 282 (with the lock bolt 282 in the locked position), such that a resilient (springing) quality of the pads 286 forces the plate 257 squeezes the plate 257 between the pads 286 and the lock bolt 282. The lock 258 can thereby prevent the battery pack 204 from being removed from the bicycle 10, while also providing a secure connection that substantially prevents shaking, vibration, etc. of the battery pack 204 relative to the bicycle 10. Deviation of the battery pack 204 is thereby prevented, resisting both intentional human manipulation and bumps, jolts, etc. experienced by the bicycle 10 as the bicycle 10 is ridden over uneven surfaces.

As shown in FIGS. 2B, 2C, and 2M, the lock 258 is integrated into the mount 202 such that the lock cylinder 280, the lock bolt 282, the baseplate 284, and the pads 286 are located on or in the mount 202 and the lock 258 is positioned proximate the down tube 30. A keyhole of the lock cylinder 280 is accessible from a lateral side of the mount 202 and is substantially flush with a side surface 222 of the mount 202. The baseplate 284 and the pads 286 are positioned at the top surface 218 of the mount 202 with the lock bolt 282 positioned slightly above the pads 286. The lock 258 is thereby positioned to engage the battery pack 204 when the battery pack 204 is positioned within the center recess 44 of the central hub 40 as shown in FIGS. 2A-2C. As shown in FIG. 2M, the bottom shell 254 and the body 256 may be contoured to accommodate a space occupied by the lock 258. When the battery pack 204 is secured to the bicycle 10, the lock 258 is internal to the bicycle 10, with only the keyhole-end of the lock cylinder 280 exposed and accessible to a user.

According to the exenmplary embodiment shown in FIGS. 2K-2M, the lock 258 is a mechanical device without electronic components. In other embodiments, the lock 258 may be electrically power (e.g., via power from the battery pack 204) and may be controlled via electronic communications, for example via a button or other interface located on the bicycle 10, a key fob, and/or via a mobile device communicable with the lock 258 via wireless communication (e.g., Bluetooth, near-field communication, radio-frequency identification, etc.). Various such modifications are within the scope of the present disclosure.

The battery pack 204, the mount 202, and the pedal-assist unit 206 are thereby securely positioned in a low, central position on the bicycle 10, improving handling and stability of the bicycle 10 by lowering the center of mass of the bicycle 10. The battery pack 204 can be easily removed from the bicycle 10 by an authorized user (i.e., a person with a key to the lock 258), while the lock 258 prevents theft of the battery pack 204. The battery pack 204 may be removed to facilitate charging of the battery pack 204 via the external contact 260, to allow a different battery pack 204 to be used (e.g., to switch from the first battery pack 250 to the second battery pack 251), etc.

Lighting System

As shown in FIGS. 3A-3J, the lighting system 300 includes various light sources, shown as one or more taillights 302, a headlight 304, and a signature light 306, that are each formed within or otherwise mounted to the frame 12 of the bicycle 10. Each of the taillights 302, the headlight 304, and the signature light 306 include lighting elements (e.g., light emitting diodes (LED), organic light emitting diodes (OLED), polymeric light emitting diodes (PLED), incandescent lightbulbs, etc.) that can be selectively activated and controlled to illuminate areas around the bicycle 10 and/or provide indications to surrounding people. Electrical power from the battery pack 204 or from secondary, alternative sources can be used to activate lighting elements within the lighting system 300. When activated, the lighting elements can illuminate the area surrounding the bicycle 10 and provide lighting that can be used by an operator of the bicycle 10 to navigate the bicycle 10 in reduced-light conditions (e.g., dusk, night-time, fog, etc.). Additionally, the lighting elements promote visibility of the bicycle 10, and can alert other motorists or pedestrians that the bicycle 10 is present on the roadway or pathway and/or of the operator's intentions (e.g., turn, slow down, etc.).

With specific reference to FIGS. 3A-3G, the taillights 302 of the lighting system 300 are shown in further detail. The taillights 302 are positioned near the rear end of the bicycle 10, and can be configured to emit light in multiple directions, and particularly behind the bicycle 10. For example, each of the taillights 302 can project light laterally and rearwardly away from the frame 12 simultaneously, which improves the overall visibility of the bicycle 10.

Figure 3A:
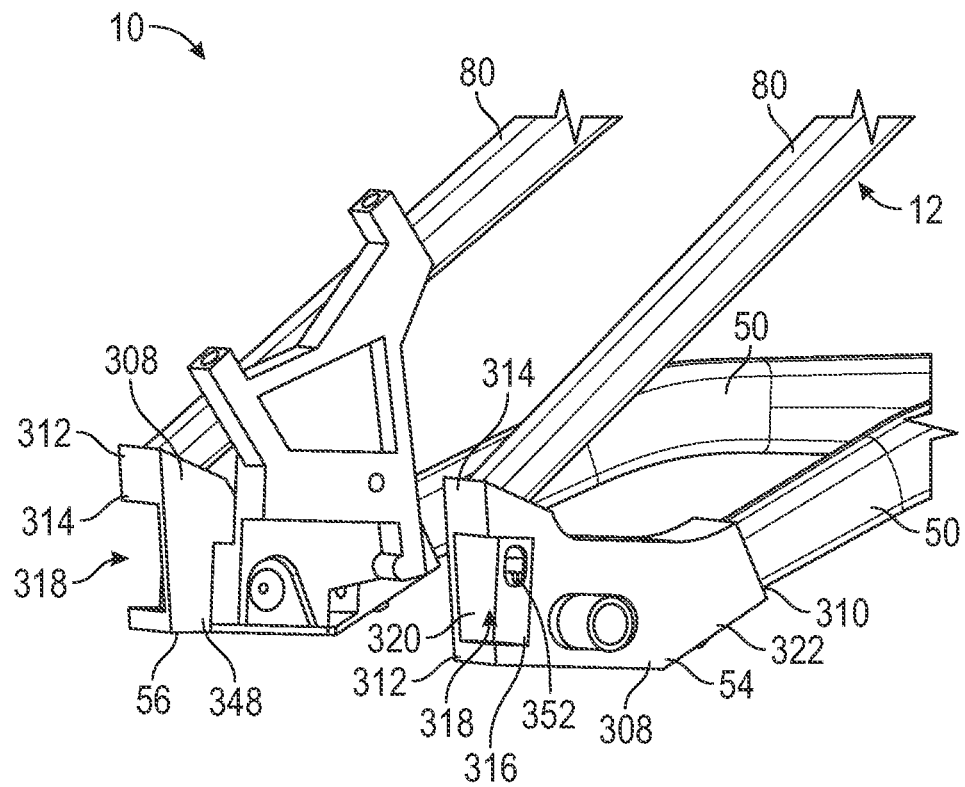
FIG. 3A is a partial rear perspective view of a pair of dropouts coupled to a frame of the bicycle of FIGS. 1A-1F, according to an exemplary embodiment.
Figure 3B:
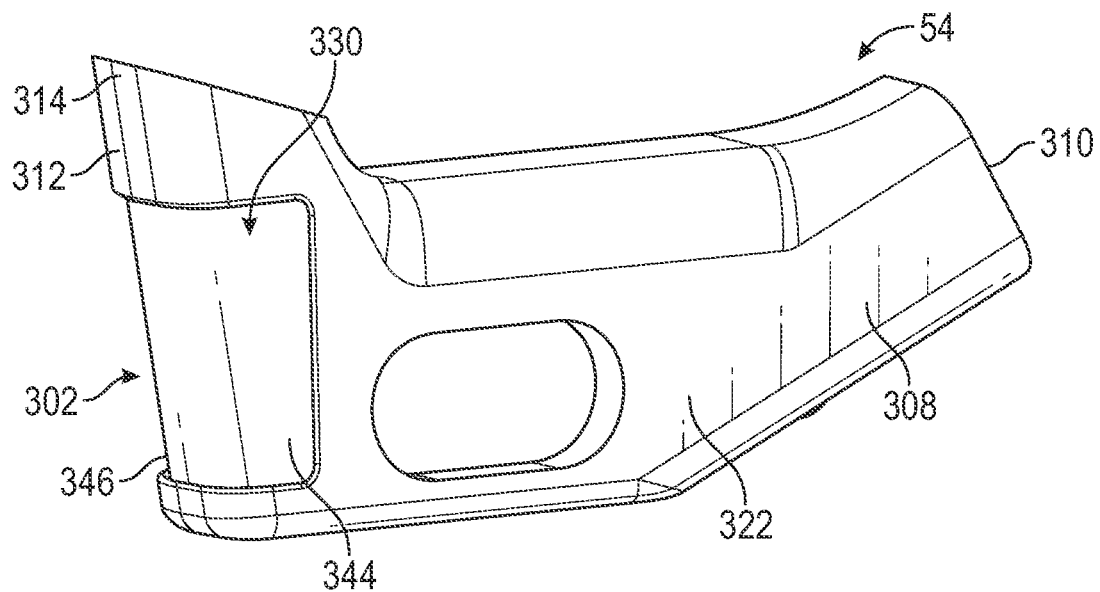
FIG. 3B is a side perspective view of a dropout of the pair of dropouts of FIG. 3A, according to an exemplary embodiment.

To provide illumination as discussed above, the taillights 302 are integrally coupled to dropouts of the dropout assemblies 52, show as right dropout 54 and left dropout 56. The right dropout 54 and the left dropout 56 can be mirror images of one another, and identical taillights 302 can be positioned within each of the right dropout 54 and the left dropout 56. As shown in FIG. 3A, the right dropout 54 and the left dropout 56 straddle the rear wheel 150 and have a generally continuous body 308 that is coupled (e.g., welded or molded) to the frame 12 (i.e., the chain stays 50 and the seat stays 80). A front end 310 of the body 308 is mounted to a rearward portion of the chain stays 50 of the frame 12, while the rear end 312 of the body 308 supports the taillight 302. In other embodiments, taillights (and/or "brake" lights) may be mounted to or integrated into other structural elements of the bicycle (e.g., seat, seat post, the seat stays 80, the seat tube 70, etc.).

As shown in FIG. 3A, the rear end 312 of the body 308 includes a tiered structure having an outer face 314 and a mounting face 316 inwardly offset from the outer face 314. The offset between the mounting face 316 and the outer face 314 defines a cavity 318 that can receive and support one of the taillights 302. The mounting face 316 can be defined by a rectangular shape, and can be at least partially surrounded by walls 320 extending approximately orthogonally (e.g., within 10 degrees) away from the mounting face 316 to the outer face 314 to define a rectangular-shaped cavity 318. In some examples, the mounting face 316 is offset to one side of the outer face 314 so that the walls 320 extend around and surround three sides of the mounting face 316, but leave one side of the mounting face open (e.g., the rear end 312 thereof). As shown in FIGS. 3A-3G, the mounting face 316 is offset toward an outside 322 of the body 308, making the cavity 318 is accessible from both the rear end 312 and the outside 322 of the right dropout 54 and the left dropout 56. The mounting face 316 and the outer face 314 can each be approximately planar surfaces that are spaced apart from one another and extend obliquely relative to one another. For example, the outer face 314 can be angularly offset from the mounting face 316 by an angle of between about 5 degrees and about 45 degrees.

Figure 3C:
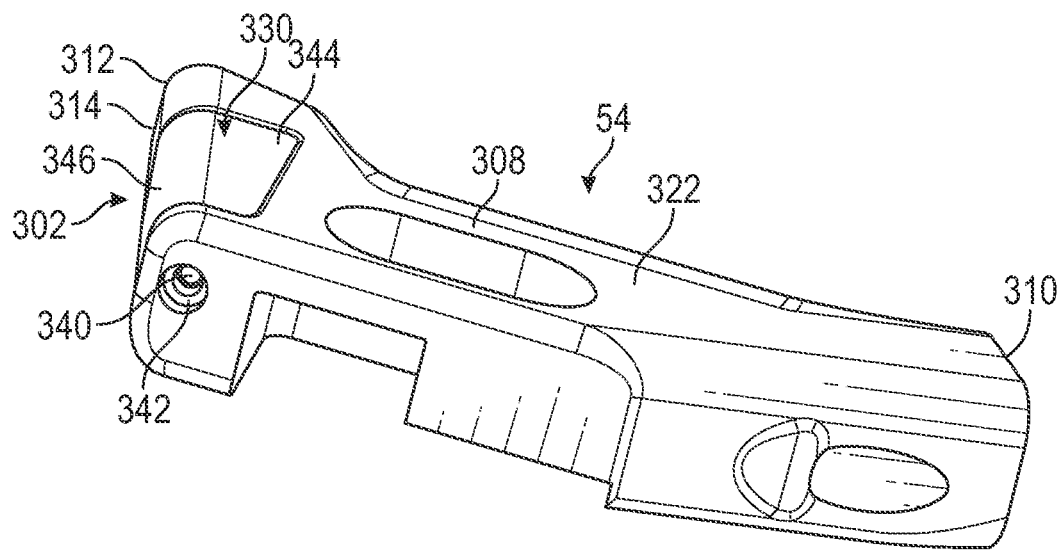
FIG. 3C is a bottom perspective view of the dropout of FIG. 3B, according to an exemplary embodiment.
Figure 3D:
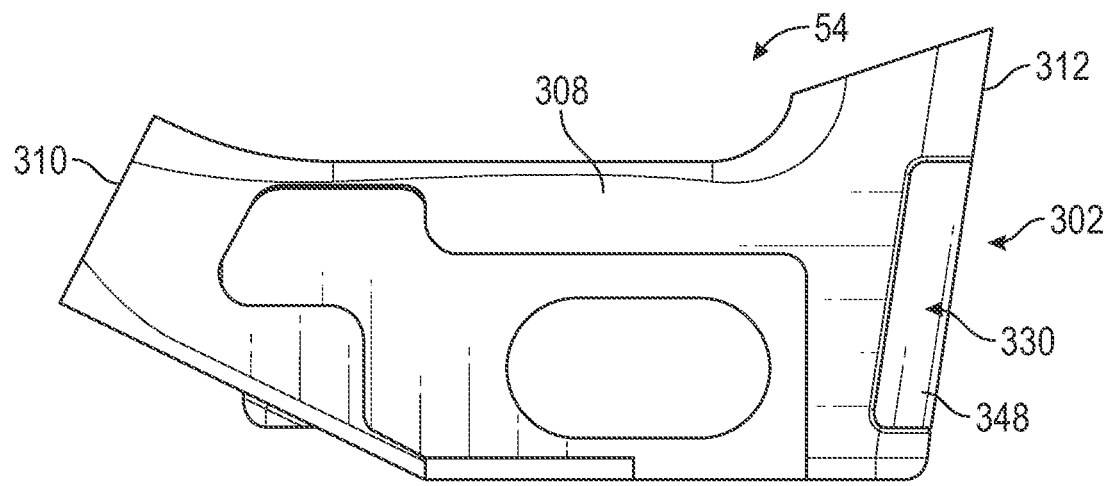
FIG. 3D is a side view of the dropout of FIG. 3B, according to an exemplary embodiment.
Figure 3E:
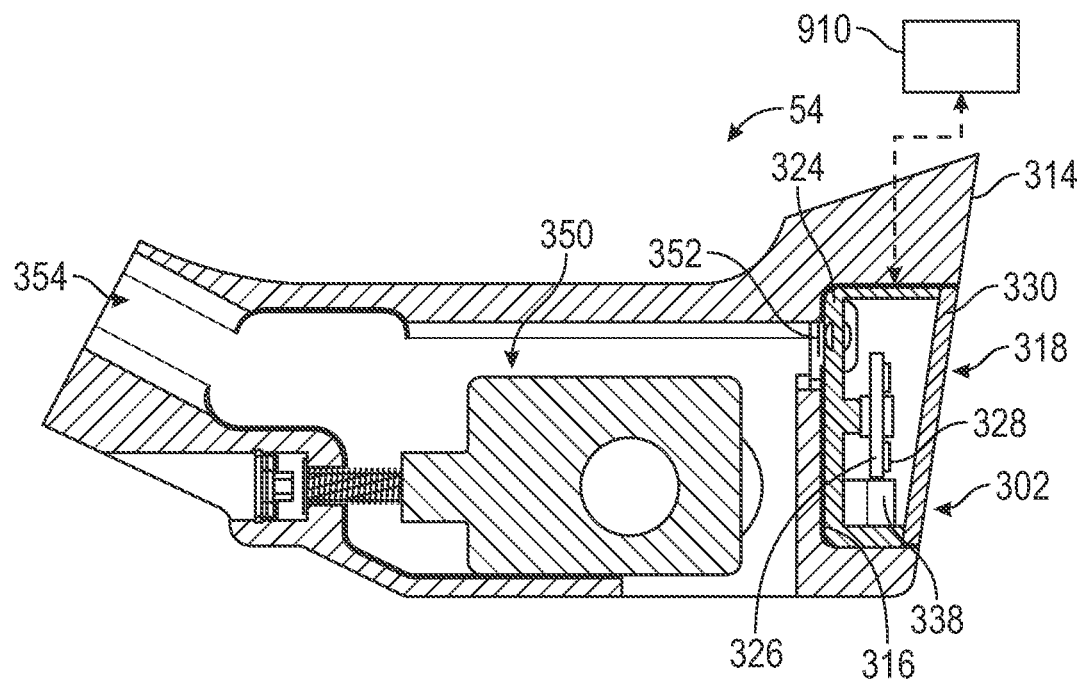
FIG. 3E is a cross-sectional view of the dropout of FIG. 3D, according to an exemplary embodiment.
Figure 3F:
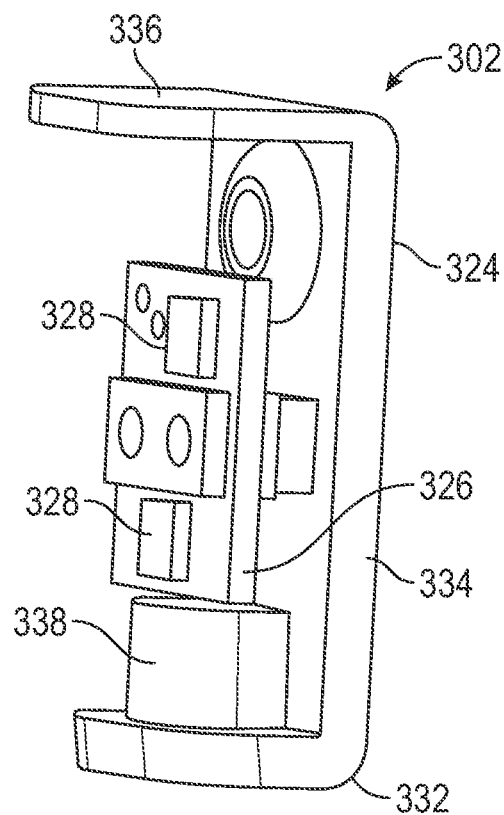
FIG. 3F is a perspective view of a light assembly of the dropout of FIG. 3B, according to an exemplary embodiment.

The taillight 302 is embedded into and secured within the cavity 318. As shown in FIGS. 3E and 3F, the taillight 302 includes a frame 324 that supports a circuit board 326. The circuit board 326 supports one or more lighting elements, shown as LEDs 328, which are selectively illuminated using electrical power provided by the battery pack 204 or an alternative power source. A lens 330 extends around the frame 324 to protect the circuit board and LEDs 328 and distribute light illuminated from the LEDs 328 outward in a more uniform manner. In some embodiments, the lens 330 can be formed of a red polymeric material, like polycarbonate, and acts as a diffuser to the light sources. The frame 324 and the lens 330 can be adhesively coupled to one another, for example, to form an enclosed taillight 302 module.

The frame 324 and the lens 330 of the taillight 302 together define the outer perimeter of the taillight 302, and are sized to fit securely within the cavity 318. In some examples, the frame 324 is formed as a channel having a continuous shape defined by a bottom wall 332, a back wall 334 extending away from (e.g., perpendicular to, etc.) the bottom wall 332, and a top wall 336 extending away from (e.g., perpendicular to, etc.) the back wall 334. The channel is complimentary to the walls 320 and the mounting face 316, and can be received entirely within the cavity 318. A boss 338 can extend from the bottom wall 332, and can be used to help couple the frame 324 and taillight 302, more generally, to the body 308 of the right dropout 54 and the left dropout 56. As shown in FIG. 3C, a threaded hole 340 can be formed through the boss 338 and a through hole 342 formed through a bottom of the body 308 can be aligned with the threaded hole 340 so that a fastener can be passed through the through hole 342 and threaded into the threaded hole 340 to secure the taillight 302 within the cavity 318. When assembled into place, the lens 330 can extend parallel to and approximately coplanar with the rear end 312 of the body 308. In some embodiments, a first portion 344 of the lens 330 extends parallel to the outside 322 of the body 308, a second portion 346 of the lens 330 extends parallel to the outer face 314, and a third portion 348 of the lens 330 extends parallel to an inside 348 of the body 308. When operating, light emitted by the LEDs 328 can be visible through each of the first portion 344, the second portion 346, and the third portion 348, which correspond to three different directions (i.e., right, left, back).

Figure 3G:
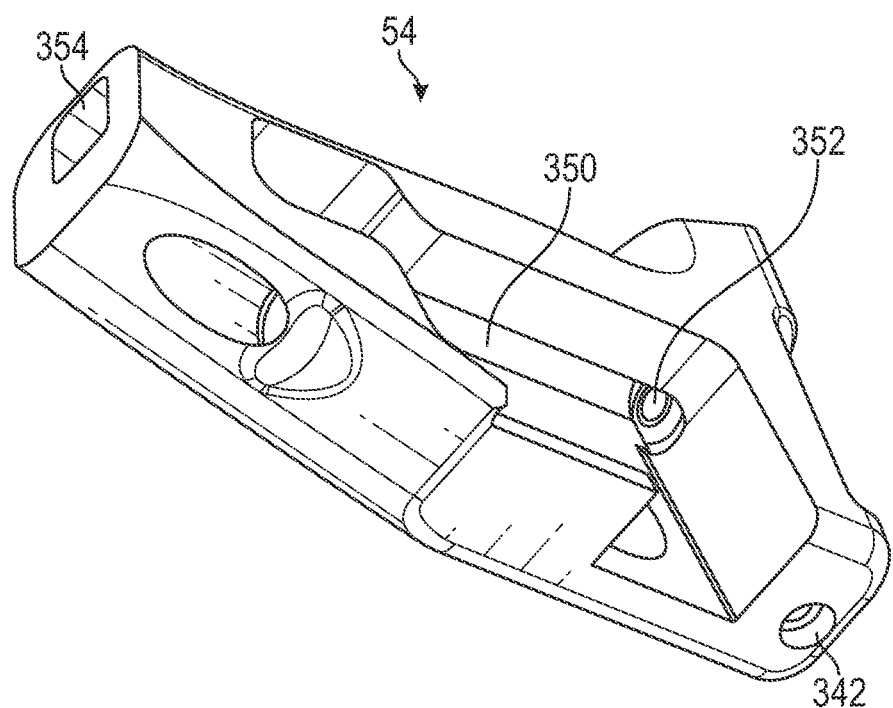
FIG. 3G is another bottom perspective view of the dropout of FIG. 3B depicting a cavity formed through the dropout, according to an exemplary embodiment.

According to an exemplary embodiment, electrical power is supplied from the battery pack 204 through the frame 12 and into taillight 302. As shown in FIGS. 3E and 3G, a wiring passage 350 is formed through the body 308 of the right dropout 54 and the left dropout 56, extending from the front end 310 through to the rear end 312 thereof. The wiring passage 350 is defined by a through hole 352 that extends from the mounting face 316 toward the front end 310 of the body 308. The wiring passage 350 continues forward, through the body 308, and into another through hole 354 formed in and through the front end 310 of the body 308. The wiring passage 350 can receive and protect one or more electrical wires extending away from the circuit board 326 and the LEDs 328 through the body 308 and into the frame 12, where the electrical wires can then be coupled to the battery pack 204 using, for example, a wiring harness, bus, or other terminal-style connection that is electrically coupled to the battery system 200.

Operation of the taillights 302 can be controlled using a central controller (e.g., the bicycle controller 1010 shown in FIG. 6) or a microprocessor formed on the circuit board 326. The bicycle controller 1010 can be used to adjust the intensity, number of lighting elements operating, frequency, pattern, color, or other operational parameters of LEDs 328 within the taillight 302 that may be varied. In some embodiments, the bicycle controller 1010 can adjust the intensity of the light emitted from the LEDs 328 based upon feedback received from other components within the bicycle 10. For example, the bicycle controller 1010 can issue a command to increase the intensity of light emitted from the LEDs 328 when the bicycle controller 1010 receives an indication (e.g., from a sensor) that the front or rear brakes have been actuated or otherwise engaged. Additionally, an ambient light sensor can be coupled to the bicycle 10 to monitor ambient light surrounding the bicycle 10 and send an indication to activate the taillights 302 whenever the amount of ambient light measured by the sensor falls below a threshold value. In some embodiments, the bicycle controller 1010 is in communication with turn signals positioned on the handlebars 14 of the bicycle 10. Upon receiving an input indicating that one of the turn signals has been actuated, the bicycle controller 1010 issues a command to modulate (e.g., pulsate, flash, etc.) the LEDs 328 within the taillight 302 corresponding to the side of the bicycle 10 where the turn signal was selected to produce a blinking effect. For example, actuating the right turn signal could command the taillight 302 positioned within the right dropout 54 to strobe while simultaneously keeping the taillight 302 in the left dropout 56 on the opposite side of the rear wheel 150 at a constant level of illumination or off (if not on). In some embodiments, the taillights 302 each remain illuminated whenever the bicycle 10 is being operated, but may increase in brightness during braking processes.

The bicycle controller 1010 can communicate with the taillights 302 through wired or wireless communication methods. In some embodiments, control wires are passed through the wiring passage 350 in the body 308 to the taillight 302 to communicate commands from the bicycle controller 1010 to the taillight 302. Signals produced by the bicycle controller 1010 can be passed along the control wires to the circuit board 326 and to the LEDs 328 in order to adjust operational parameters of the taillight 302. Alternatively, the circuit board 326 can include a communications unit (e.g., an antenna, a wireless receiver, etc.) that can receive wireless signals from the bicycle controller 1010, one or more sensors, or other suitable inputs that can then be used to operate the LEDs 328.

Figure 3H:
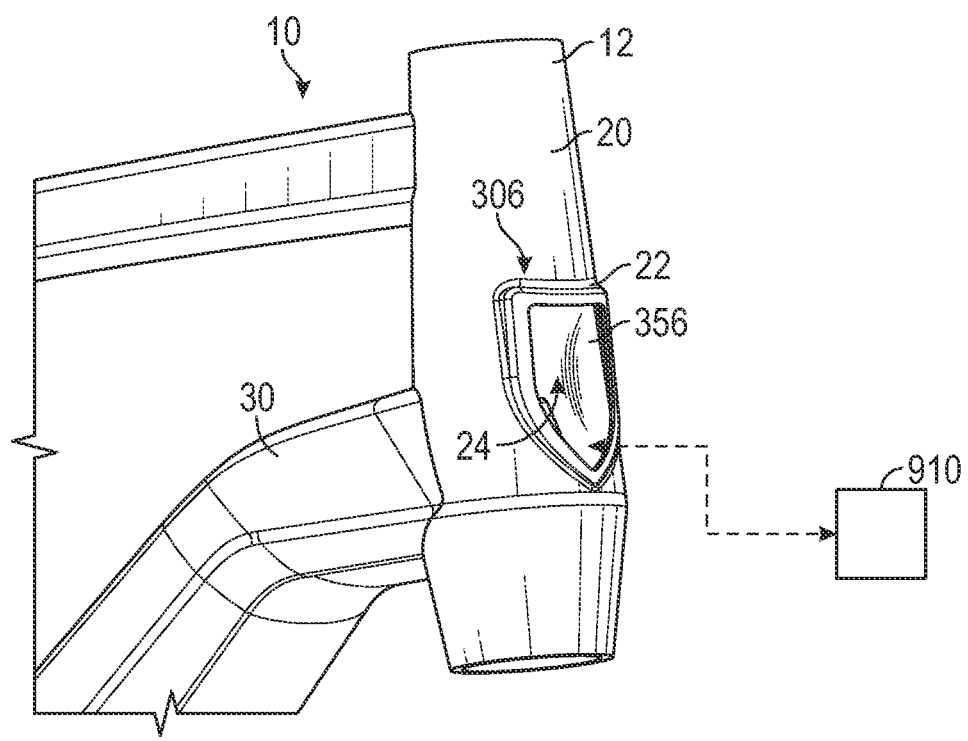
FIG. 3H is partial front perspective view of the bicycle of FIGS. 1A-1F having a front light formed within a frame of the bicycle of FIGS. 1A-1F, according to an exemplary embodiment.
Figure 3I:
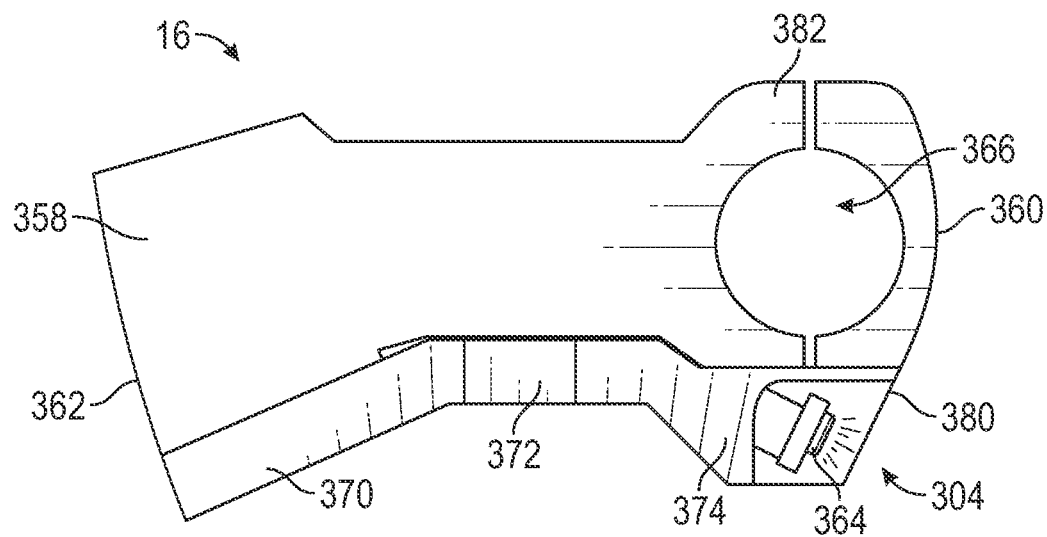
FIG. 3I is a bottom perspective view of a headlight assembly that can be coupled to the bicycle of FIGS. 1A-1F, according to an exemplary embodiment.
Figure 3J:
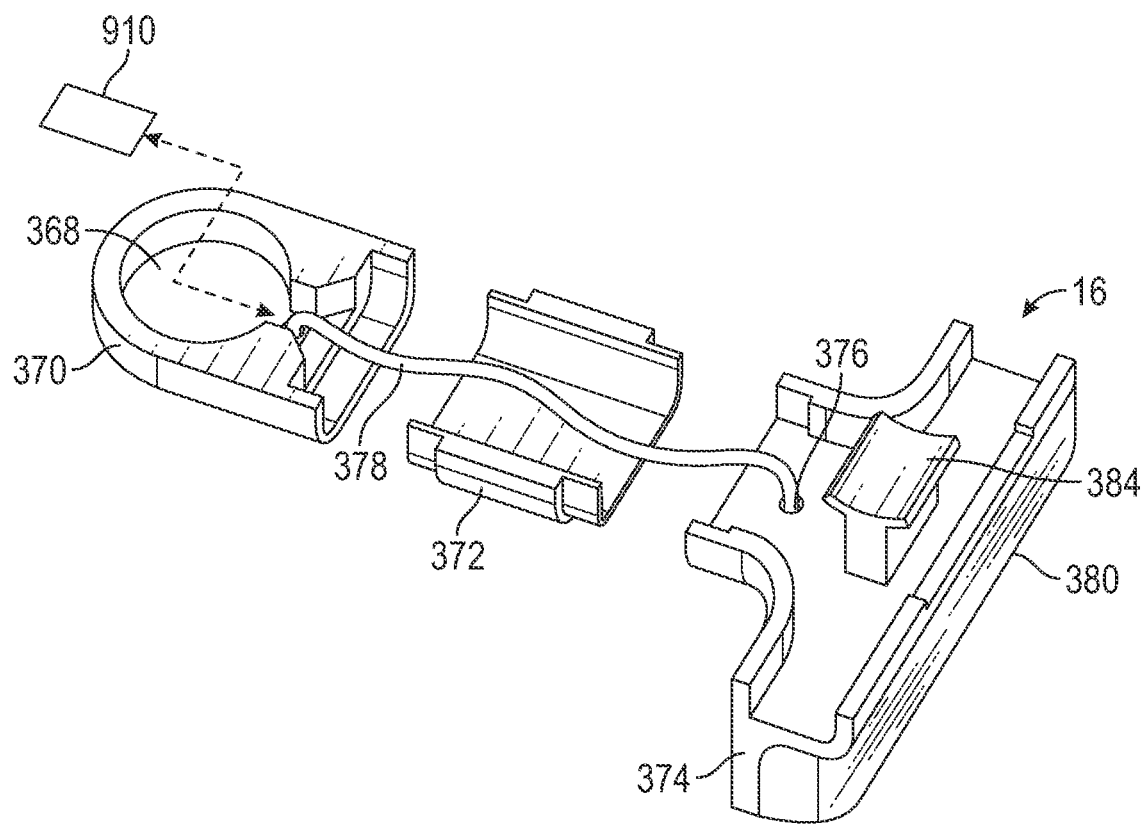
FIG. 3J is an exploded view of the headlight assembly of FIG. 3I, according to an exemplary embodiment

In some embodiments, as shown in FIGS. 3H-3J, the bicycle 10 includes a front light, shown as headlight 304, and/or a conspicuity or "daytime" running lamps, shown as signature light 306, to further improve the visibility of the bicycle 10 and/or the operator's visibility ahead of the bicycle 10. As shown in FIGS. 3H-3J, each of the headlight 304 and the signature light 306 can be integrally formed within the frame 12 near a front end of the bicycle 10, so as to direct light forward, in the direction of travel of the bicycle 10. Each of the headlight 304 and the signature light 306 can be supplied with electrical power from the battery pack 204, using wires that extend through a portion of the frame 12.

As shown in FIG. 3H, the signature light 306 is positioned within and integrally coupled with the head tube 20 of the frame 12. The signature light 306 is configured to fit across and around an opening 22 formed in the head tube 20. The opening 22 in the head tube 20 defines a cavity 24 that extends into the head tube 20 toward the down tube 30, and has a depth sufficient to receive the modular lighting assembly of the signature light 306 and associated wiring used to couple the signature light 306 to the battery pack 204. Like the taillights 302, the signature light 306 can include one or more lighting elements (e.g., LEDs) that are configured to selectively illuminate based upon operational parameters of the bicycle 10 or based upon inputs received from the bicycle controller 1010. In some embodiments, the signature light 306 is configured to provide a low-level illumination that is used to help improve the visibility of the bicycle 10, but which is not intended for use to drive in low or reduced-light conditions. The signature light 306 can be provided with electrical power and can remain operational (e.g., illuminated) whenever the bicycle 10 is in use. Alternatively, the signature light 306 can be selectively activated upon the detection of a low or reduced-light condition, as measured by an ambient light sensor and as instructed by the bicycle controller 1010, or in response to operator activation. As shown in FIG. 3H, the signature light 306 can be covered by a lens 356 provided with a source-identifying shape or pattern. In some embodiments, the lens 356 is configured to extend approximately continuously with an outer surface of the head tube 20. Alternatively, the lens 356 can protrude outward beyond an outer surface of the head tube 20, forming a boss-like structure on the front of the frame 12. In some embodiments, the signature light 306 provides a light-up symbol or logo (e.g., a manufacturer's logo, etc.). In some embodiments, the headlight 304 replaces the signature light 306 and is received within the cavity 24.

The headlight 304 can be used to provide additional illumination in front of the bicycle 10 so that the bicycle 10 can be operated in low or reduced-light conditions. As shown in FIGS. 3I and 3J, the headlight 304 can be formed integrally within the stem 16 of the frame 12. The stem 16 generally includes a body 358 having a front section 360 and a back section 362 and having an LED light 364 formed integrally within the body 358. In some examples, the LED light 364 is angled downwardly and outwardly away from the front section 360 of the body 358 to illuminate area in front of the bicycle 10. The LED light 364 in the headlight 304, like the taillights 302 and the signature light 306, can communicate with the bicycle controller 1010 to selectively activate based upon detected operational parameters (e.g., ambient light sensor detecting a low light condition), manual input (e.g., a button or switch on the handlebars 14 or frame 12 of the bicycle 10), a timer, or other suitable control parameters. In some embodiments, the LED light 364 has multiple illumination settings that can correspond to a high beam and a low beam setting, and can be toggled manually or automatically by buttons, switches, and/or sensors in communication with the bicycle controller 1010.

The body 358 defines and surrounds a channel 366. The channel 366 is configured to receive the handlebars 14 of the bicycle 10, which extend transversely through the body 358 of the stem 16. The stem 16 is configured to rotate in unison with the handlebars 14, and can be received around and mounted to the front fork 60 using another passage 368, which extends approximately perpendicular relative to the channel 366. Because the stem 16 rotates with the handlebars 14, the LED light 364 similarly rotates with the handlebars 14 so that the LED light 364 is always directed in the direction of travel of the bicycle 10.

In some embodiments, the body 358 is an assembly of multiple sections coupled together. For example, the body 358 can be formed of a rear section 370, an adapter section 372, and a front section 374. The rear section 370 can include the passage 368, and can be secured to the front fork 60 of the frame 12. The adapter section 372 can be selectively received within the rear section 370 and the front section 374, and can be used to adjust a length of the body 358. For example, several adapter sections 372 of different lengths can be provided with the same bicycle 10, and are readily interchangeable to adjust the overall length of the body 358. The front section of the body includes the LED light 364, and defines a wiring passage 376 that receives and directs an electrical wire 378 coupled to the LED light 364 toward the adapter section 372 to the rear section 370 and into the frame 12 of the bicycle 10, toward the battery pack 204. The front section 374 of the body 358 also includes and defines the channel 366. The front section 374 can be formed of two sections 380, 382 clamped together using piece 384 formed integrally with the section 380. The section 380 may include a lens or transparent panel disposed around the LED light 364 and through which light is emitted from the LED light 364.

Locking System

Figure 4A:
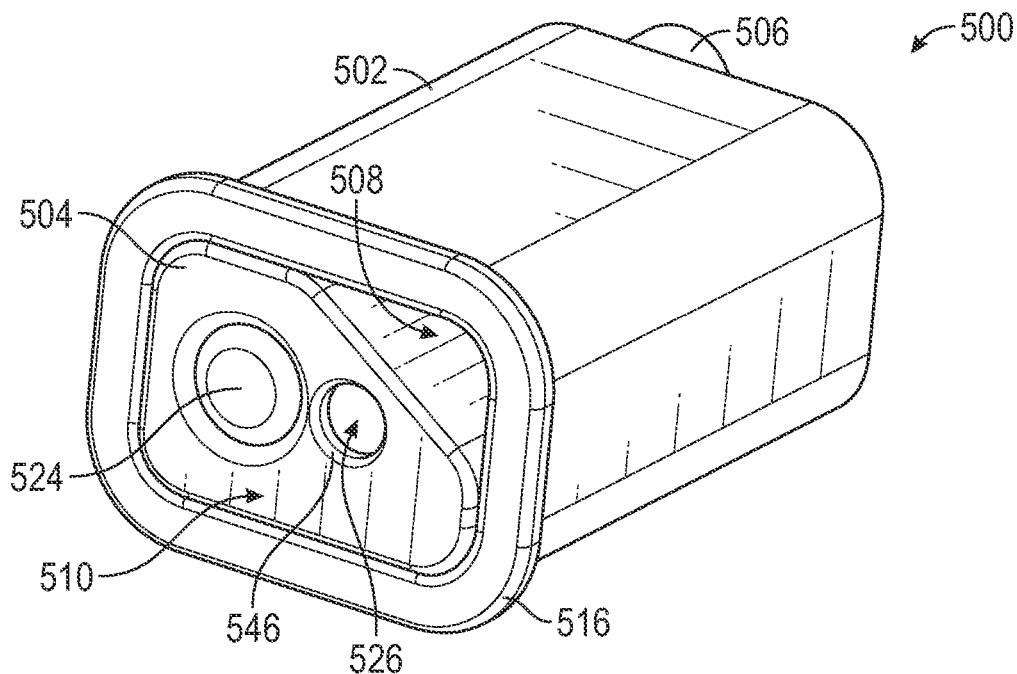
FIG. 4A is a front perspective view of a lock for the bicycle of FIGS. 1A-1F in a storage configuration, according to an exemplary embodiment.
Figure 4B:
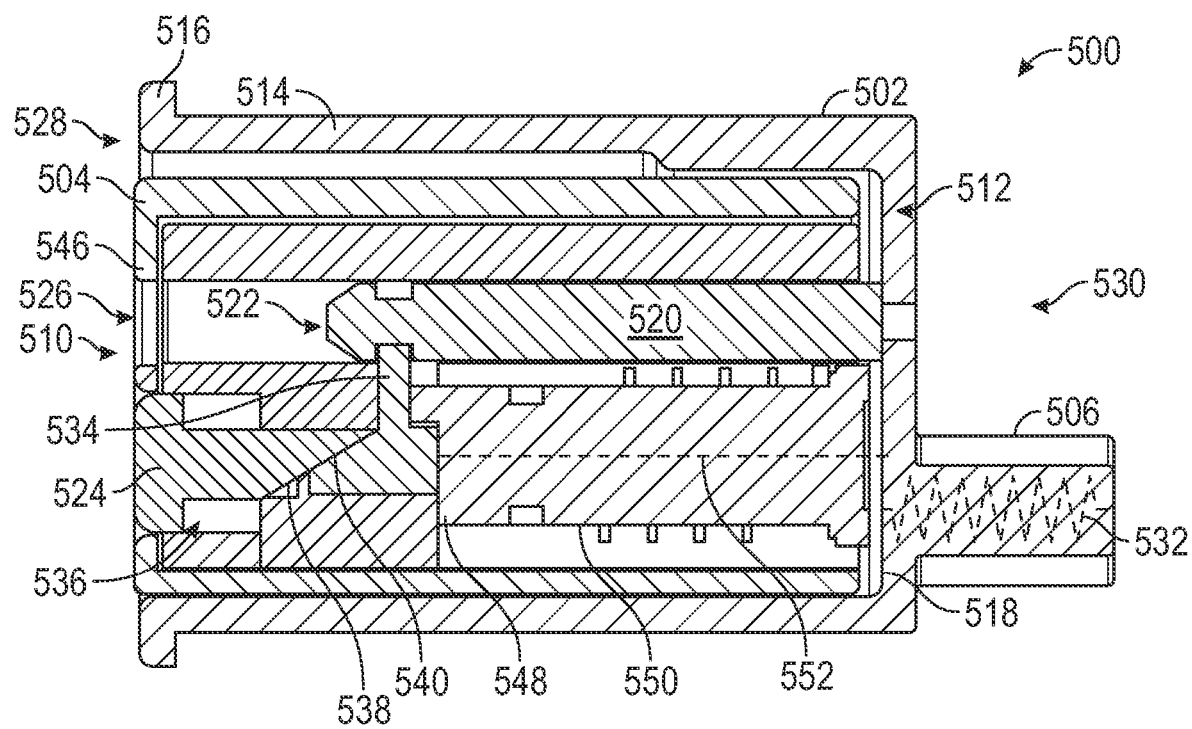
FIG. 4B is a side cross-sectional view of the lock of FIG. 4A in the storage configuration, according to an exemplary embodiment.
Figure 4C:
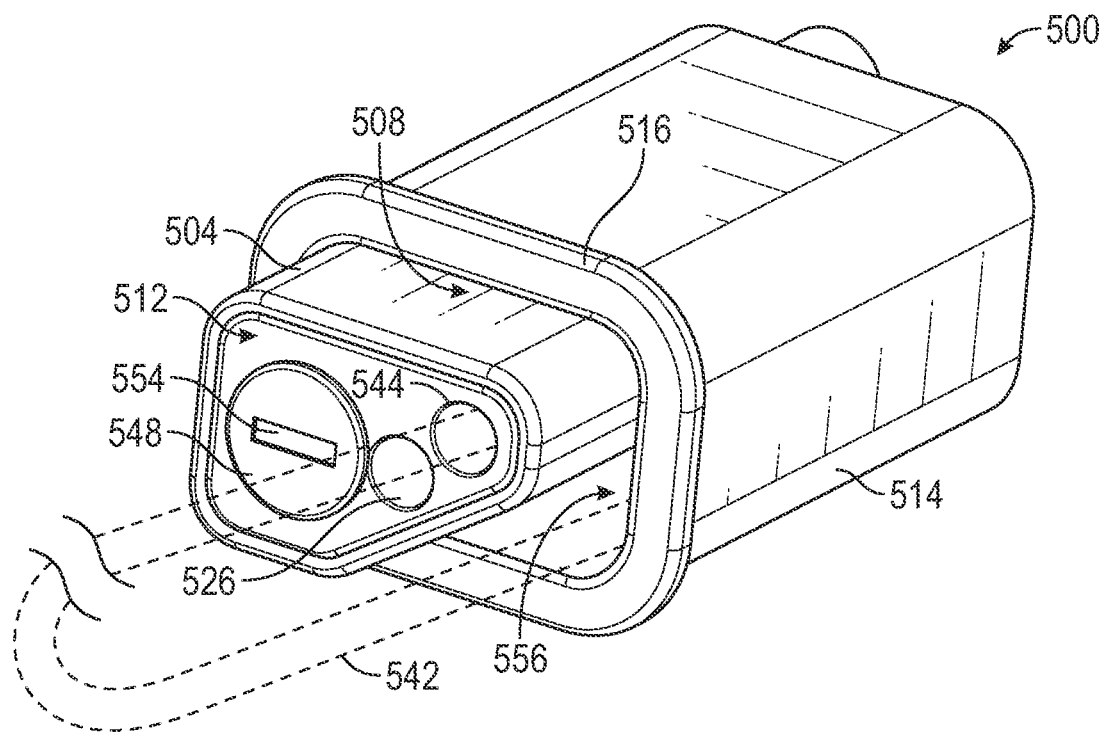
FIG. 4C is a front perspective view of the lock of FIG. 4A in a locked configuration, according to an exemplary embodiment.
Figure 4D:
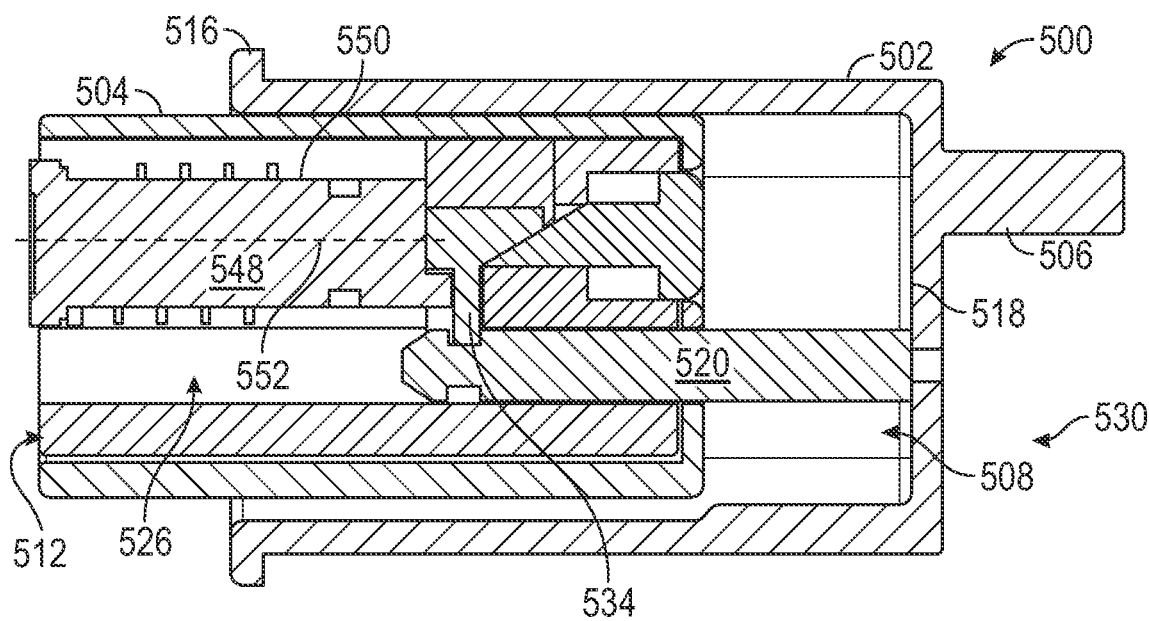
FIG. 4D is a side cross-sectional view of the lock of FIG. 4A in the locked configuration, according to an exemplary embodiment.
Figure 4E:
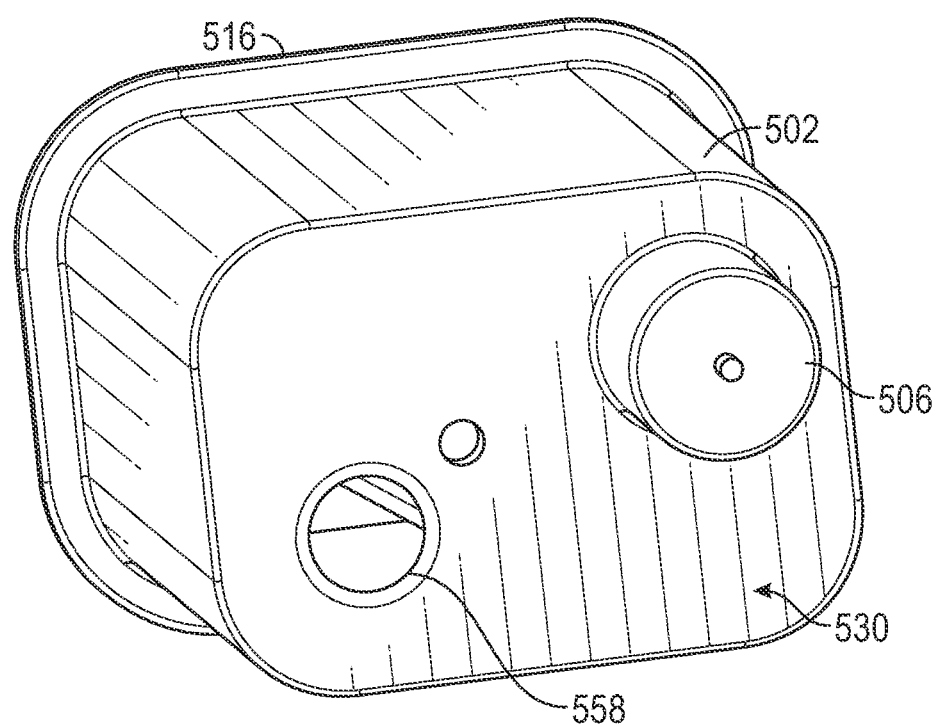
FIG. 4E is a rear perspective view of the lock of FIG. 4A, according to an exemplary embodiment.
Figure 4F:
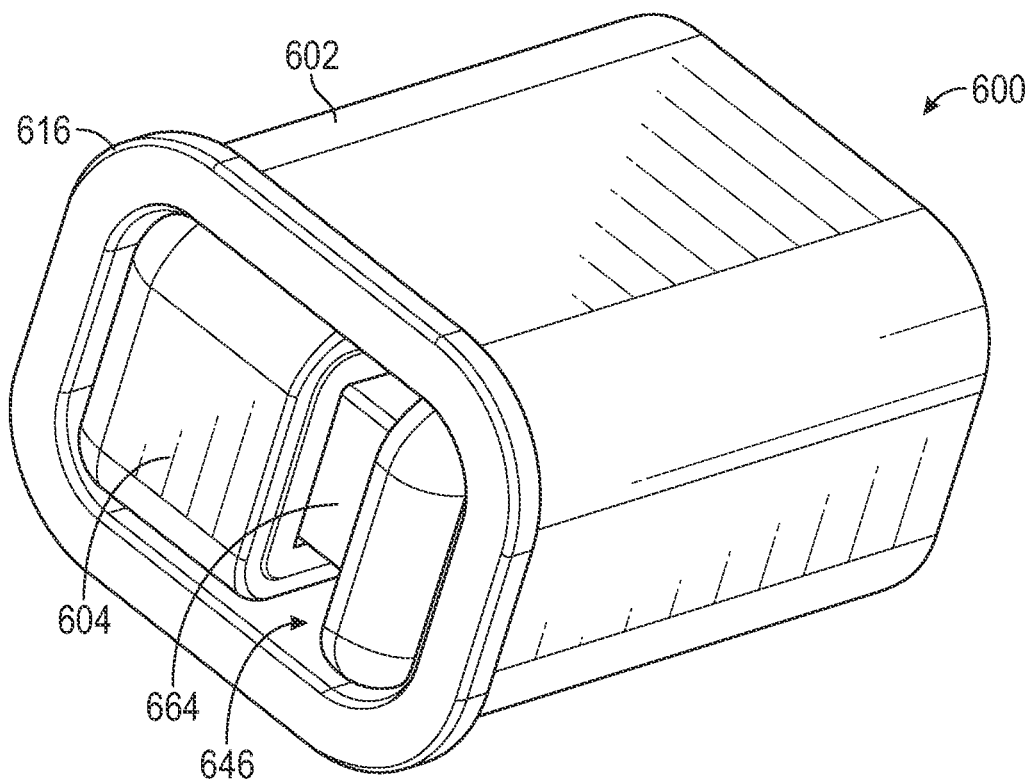
FIG. 4F is a front perspective view of a lock for the bicycle of FIGS. 1A-1F, according to another exemplary embodiment.
Figure 4G:
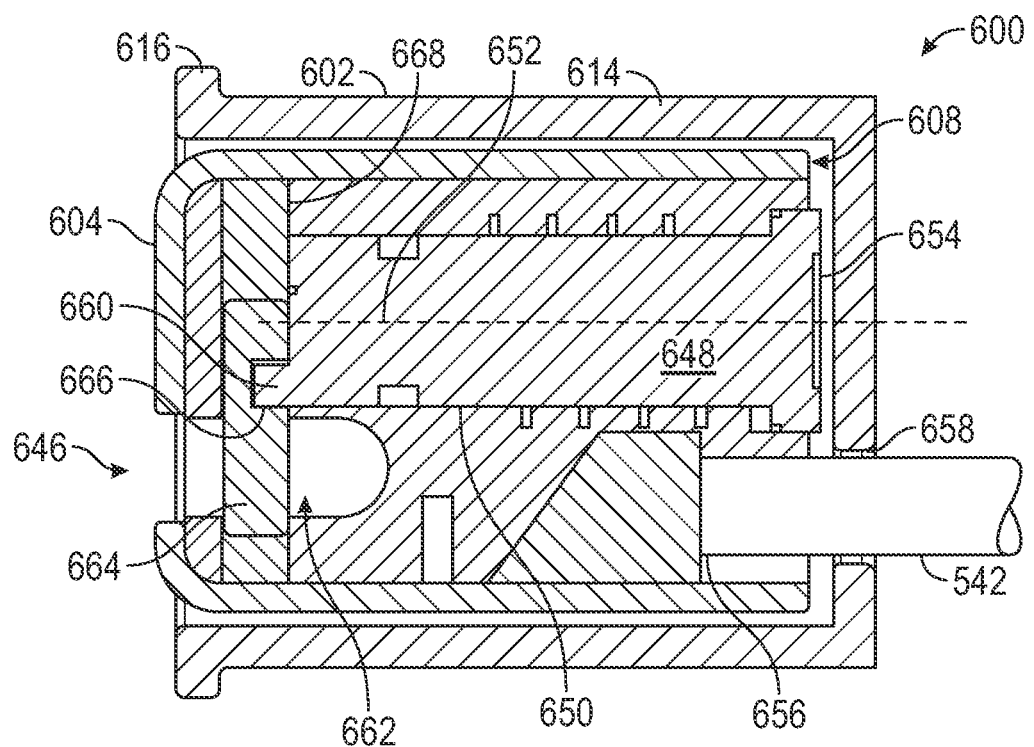
FIG. 4G is a side cross-sectional view of the lock of FIG. 4F, according to an exemplary embodiment.
Figure 4H:
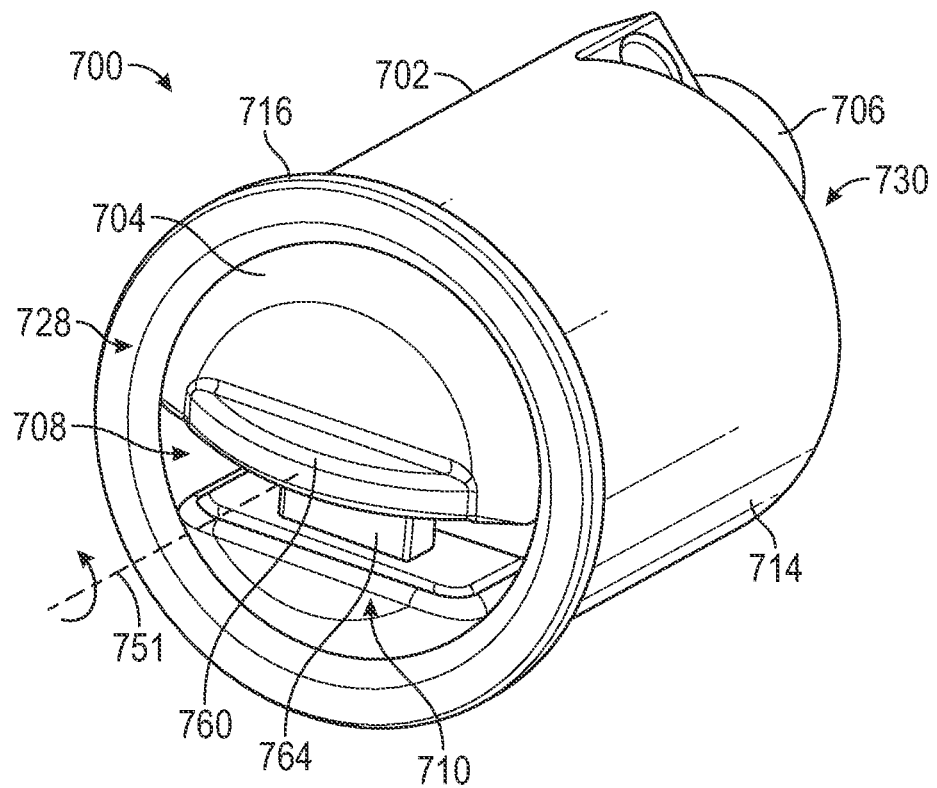
FIG. 4H is a front perspective view of a lock for the bicycle of FIGS. 1A-1F, according to still another exemplary embodiment.
Figure 4I:
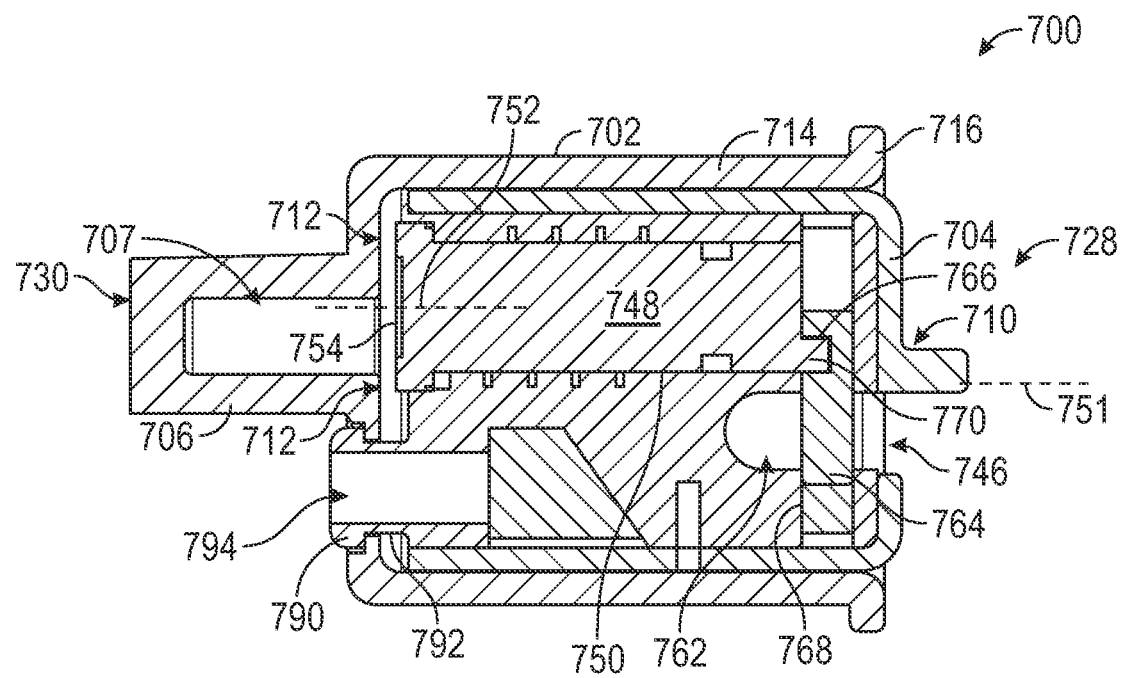
FIG. 4I is a side cross-sectional view of the lock of FIG. 4H, according to an exemplary embodiment.
Figure 4J:
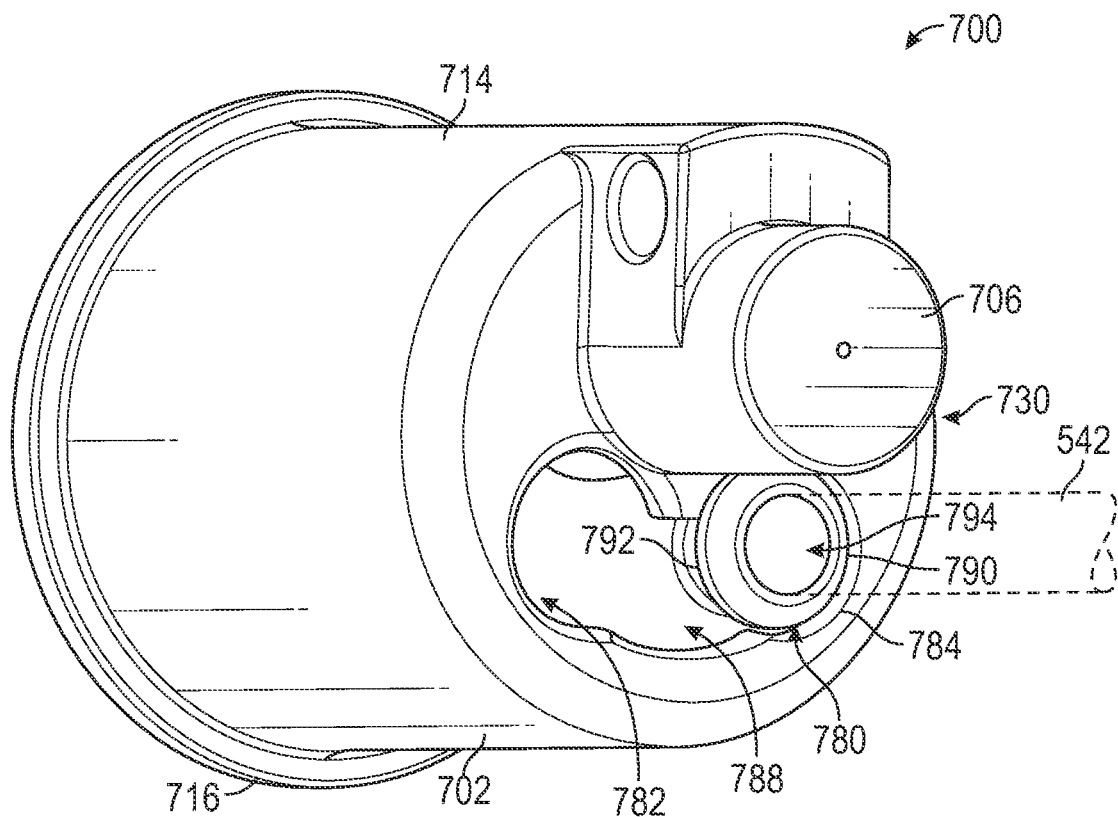
FIG. 4J is a rear perspective view of the lock of FIG. 4H, according to an exemplary embodiment.
Figure 4K:
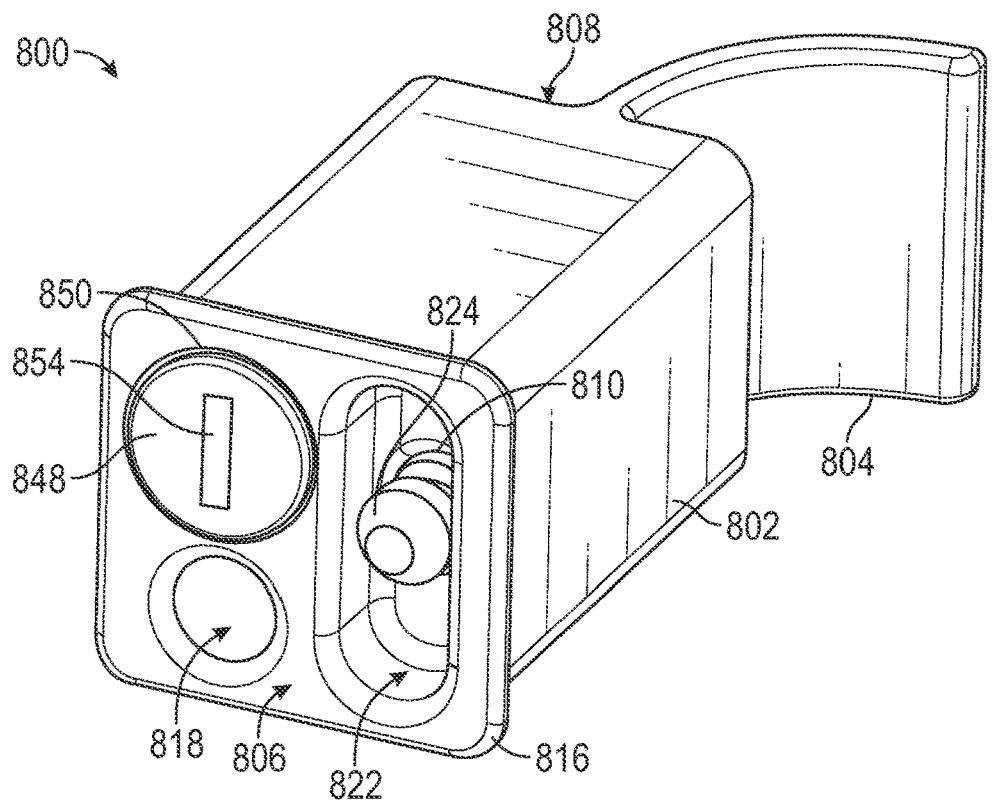
FIG. 4K is a front perspective view of a lock for the bicycle of FIGS. 1A-1F, according to yet another exemplary embodiment.
Figure 4L:
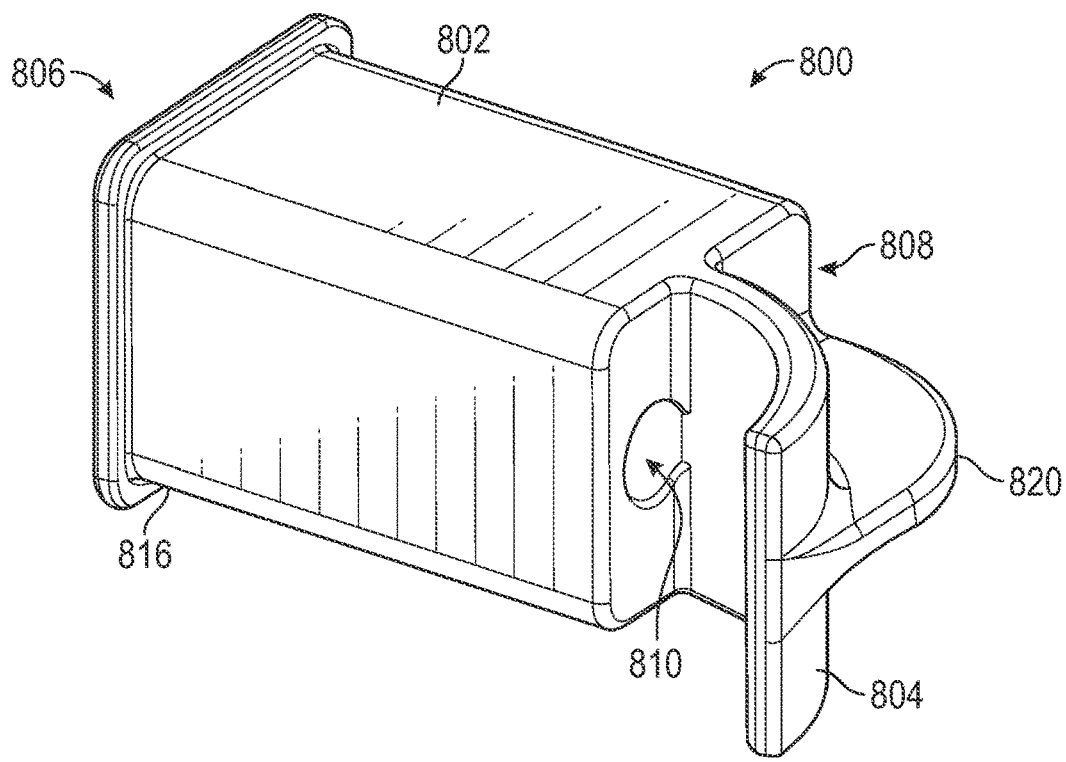
FIG. 4L is a rear perspective view of the lock of FIG. 4K, according to an exemplary embodiment.
Figure 4M:
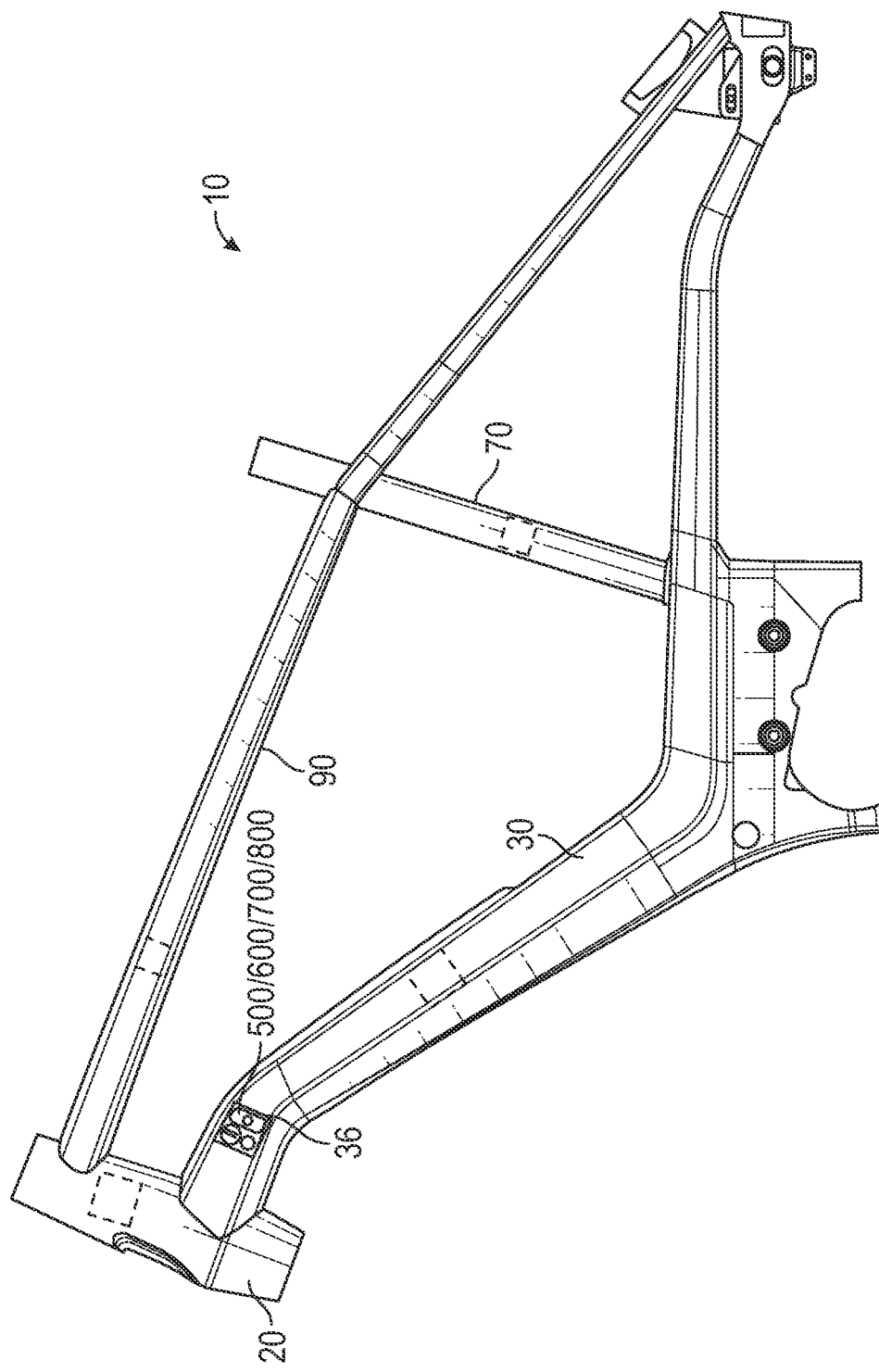
FIG. 4M is a side view of a bicycle frame of the bicycle of FIGS. 1A-1F with a respective lock of the locks of FIGS. 4A-4L integrated into a frame member thereof, according to an exemplary embodiment.
Figure 4O:
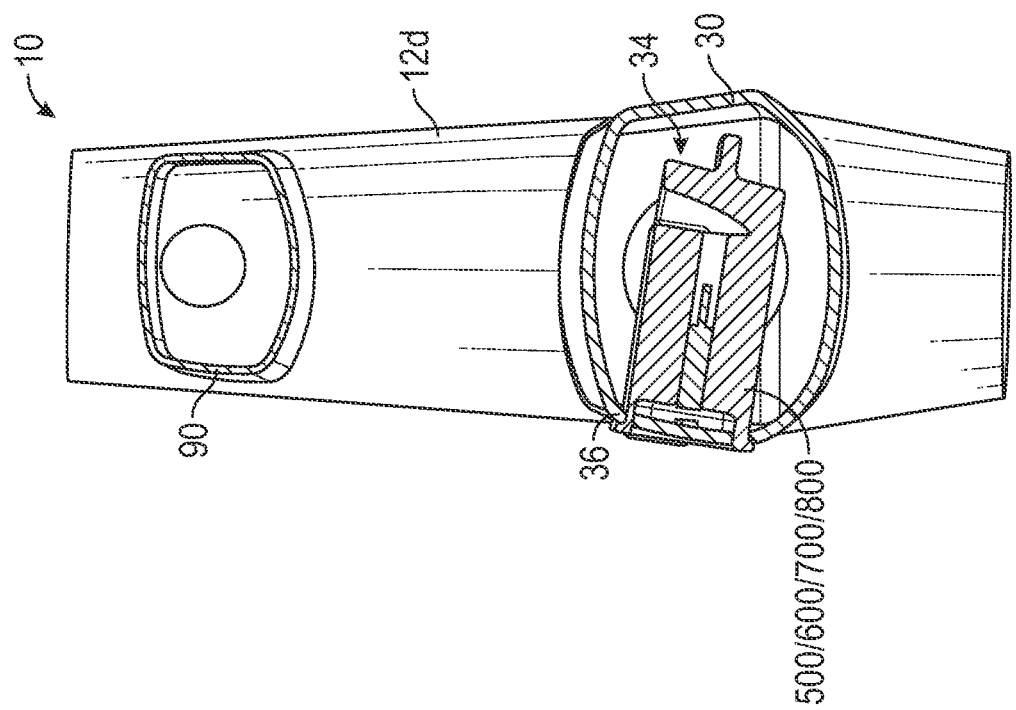
FIG. 4O is a second cross-sectional view of the bicycle frame of FIG. 4M with the respective lock, according to an exemplary embodiment.
Figure 4N:
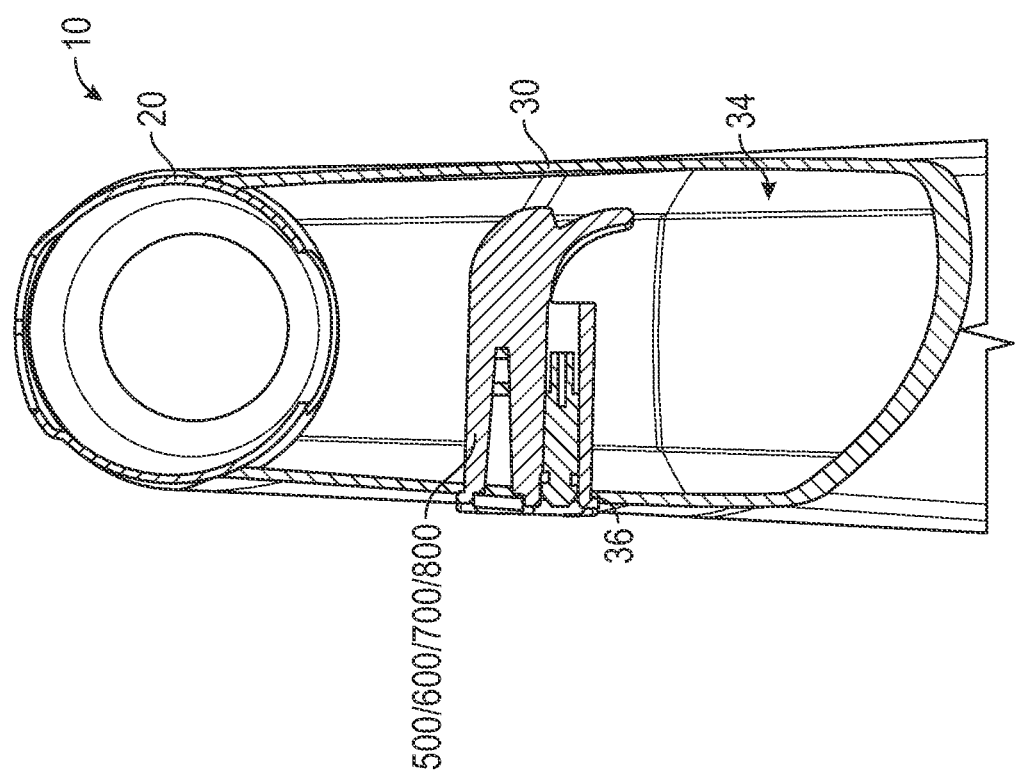
FIG. 4N is a first cross-sectional view of the bicycle frame of FIG. 4M with the respective lock, according to an exemplary embodiment.
Figure 4P:
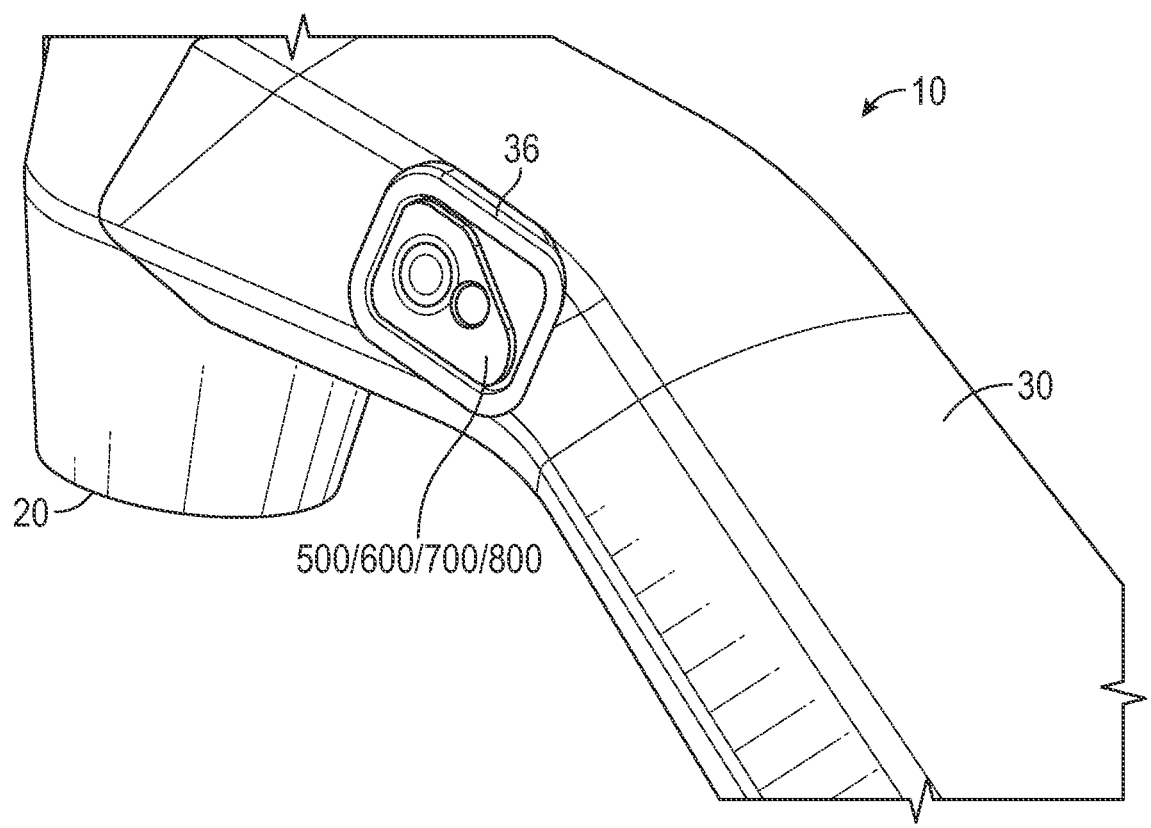
FIG. 4P is a perspective view of the bicycle frame of FIG. 4M with the respective lock, according to an exemplary embodiment.
Figure 4Q:
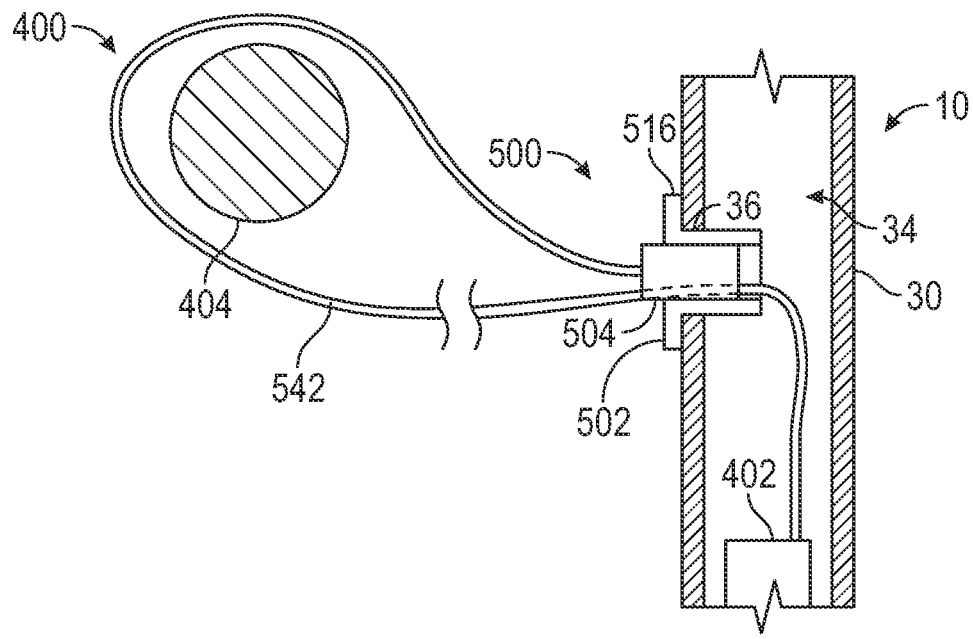
FIG. 4Q is a schematic diagram of a locking system including the lock of FIGS. 4A-4E, according to an exemplary embodiment.
Figure 4R:
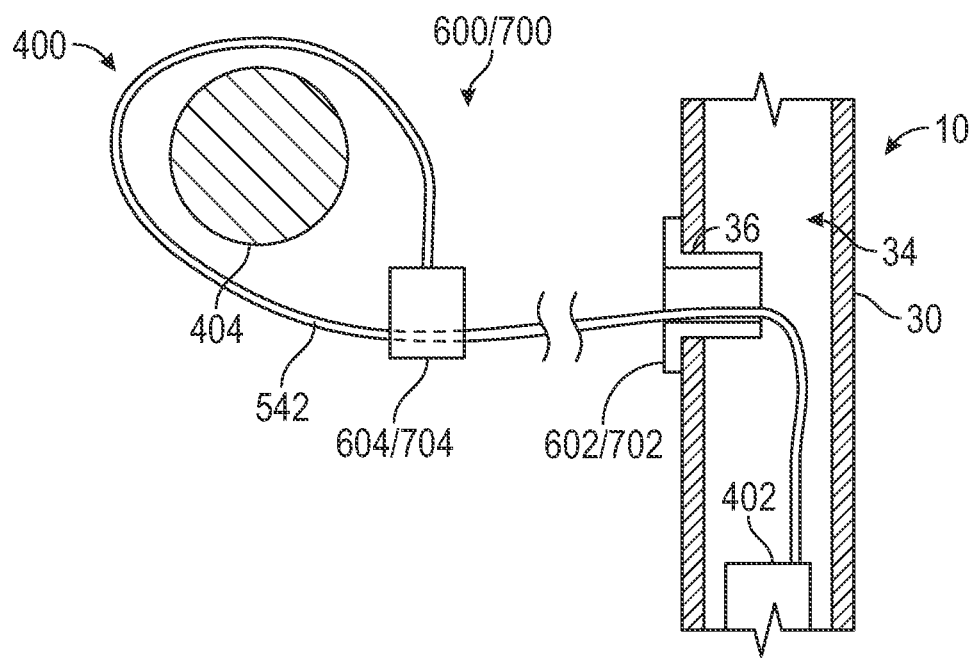
FIG. 4R is a schematic diagram of a locking system including one of the locks of FIGS. 4F-4J, according to an exemplary embodiment.
Figure 4S:
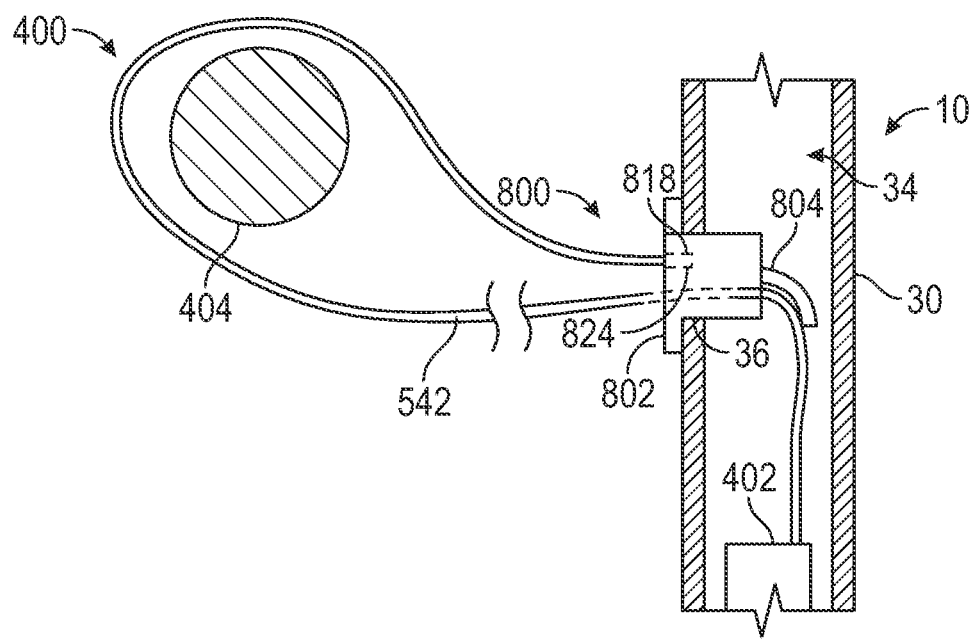
FIG. 4S is a schematic diagram of a locking system with the lock of FIGS. 4K-4L, according to an exemplary embodiment.
Figures 4T, 4U, 4V:
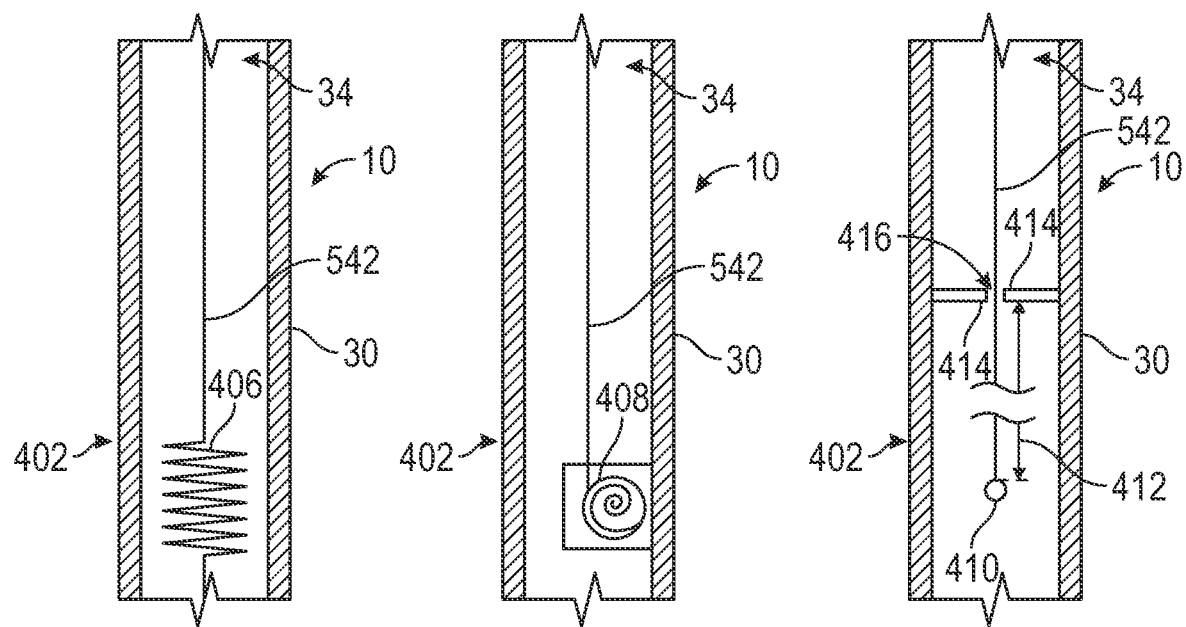
FIG. 4T is a schematic diagram of a mechanism for securing and automatically retracting a cable into the bicycle frame of FIG. 4M using a linear spring, according to an exemplary embodiment.
FIG. 4U is a schematic diagram of a mechanism for securing and automatically retracting a cable into the bicycle frame of FIG. 4M using a torsional spring, according to an exemplary embodiment.
FIG. 4V is a diagram of a mechanism for securing an end of a cable within the bicycle frame of FIG. 4M, according to an exemplary embodiment.

Referring generally to FIGS. 4A-4V, the locking system 400 for the bicycle 10, according to various exemplary embodiments. The locking system 400 includes a locking member that can be fixedly coupled with the frame 12 of the bicycle 10. The locking system 400 may include a cable, a chain, a flexible member, an elongated member, etc., for securing the bicycle 10 to a stationary object (e.g., a nearby object such as a bike rack). The cable can be stored within the frame 12 of the bicycle 10 and may be drawn out of the frame 12 to selectively lock the bicycle 10 with the stationary object. The locking system 400 may be configured to automatically retract the cable into the frame 12 after the bicycle 10 is unlocked from the stationary object.

As shown in FIGS. 4A-4E, a first lock (e.g., a lock, a locking apparatus, a locking device, a securing device, etc.), shown as lock 500, of the locking system 400 includes a body member (e.g., body portion, a main portion, a receiving portion, a frame portion, a housing, etc.), shown as body 502, and a removable member (e.g., removable portion, a lock portion, a cable extension portion, a selectively extendable portion, etc.), shown as insert 504. The insert 504 is configured to be removably received within and selectively fixedly couple with the body 502. Specifically, the insert 504 is configured to be received within a receptacle (e.g., an opening, an aperture, a hole, a recess, an inner volume, a bore, a chamber, etc.) of the body 502, shown as cavity 508. The insert 504 can have a cross-sectional shape or an outer periphery that corresponds to a cross-sectional shape of the cavity 508 to facilitate the insertion and removal of the insert 504 in the body 502.

The body 502 includes a sidewall 514 and a flange 516. The flange 516 is positioned at a first or proximate end 528 of the body 502 and circumferentially surrounds the cavity 508 into which the insert 504 is inserted. The flange 516 facilitates fixedly and securely coupling the body 502 with a bicycle frame member, a tubular member, etc. of the frame 12. The flange 516 and the sidewall 514 are integrally formed or otherwise fixedly coupled to define the body 502.

The body 502 also includes a housing member (e.g., a protrusion, a boss, an extrusion, a housing, etc.), shown as protrusion 506. The protrusion 506 extends from a second or distal end 530 of the body 502 and includes an inner or internal volume that is configured to receive and store a spring 532. In some embodiments, the spring 532 is a linear compression spring that is configured to exert a biasing force on the insert 504 to pop or translate the insert 504 out of the cavity 508.

The body 502 includes an engagement member (e.g., a post, a pin, a male locking member, an interface, etc.), shown as pin 520, that extends longitudinally through cavity 508. In some embodiments, the pin 520 extends only partially through cavity 508. The pin 520 can extend from an inner surface, a rear surface, an inner most face, etc., of the body 502 at the distal end 530 of the body 502, shown as inner surface 518. The pin 520 can be fixedly coupled with the body 502 and includes an end portion configured selectively fixedly couple with a corresponding female portion of the insert 504 such that the pin 520 is configured to selectively fixedly couple with the insert 504.

Referring particularly to FIG. 4B, the insert 504 includes a through-hole (e.g., an aperture, a bore, a blind-hole, an opening, a cavity, a channel, a groove, etc.), shown as bore 526. The bore 526 extends longitudinally through the insert 504 and is configured to receive the pin 520 to facilitate selectively fixedly coupling the insert 504 with body 502 (i.e., in a locked configuration). The insert 504 includes an interlocking member (e.g., a locking member, an interfacing member, a female member, etc.), shown as retainer 534. The retainer 534 is configured to interface with, fixedly couple with, engage, etc., an end portion 522 of the pin 520 to fixedly couple the pin 520 and the body 502 with the insert 504 to secure the insert 504 therein. The retainer 534 can be biased or driven into engagement with the end portion 522 of the pin 520 by a spring. In some embodiments, the retainer 534 is configured to engage an annular groove (e.g., a recess, a notch, a depression, etc.) of the end portion 522 of the pin 520 to selectively fixedly couple the insert 504 with the body 502.

The insert 504 includes an interface (e.g., a button, a translatable member, a slidable member, etc.), shown as button 524. When the insert 504 is stored in the body 502 (e.g., as shown in FIGS. 4A and 4B), the button 524 faces outwards and can be pressed by a user to selectively de-couple or release the insert 504 from the body 502. The button 524 is configured to be received within a corresponding recess (e.g., inner volume, bore, etc.), shown as cavity 536. The button 524 can be slidably coupled with the insert 504 and translate within the cavity 536. When the button 524 is pressed or depressed by the user, the body 502 is selectably de-coupled from the insert 504 so that the insert 504 can be drawn out of the cavity 508 of the body 502. A rear end of the button 524 includes an angled surface 538 that is configured to engage a correspondingly angled surface 540 of the retainer 534. Pressing or translating the button 524 into the cavity 536 drives the retainer 534 to translate in a direction perpendicular to the translation of the button 524, thereby driving the retainer 534 out of engagement with the end portion 522 of the pin 520. Once the retainer 534 is translated or transitioned out of engagement with the pin 520, the spring 532 drives the insert 504 to at least partially translate or pop out of the cavity 508 of the body 502.

After being de-coupled from the body 502, the insert 504 can be drawn out of the cavity 508 by the user. The insert 504 is fixedly coupled with a flexible member (e.g., a cable, a chain, a cord, etc.), shown as flexible member 542. In some embodiments, the flexible member 542 is fixedly coupled at a rear end 512 of the insert 504. In some embodiments, the flexible member 542 is received within a correspondingly shaped aperture, opening, hole, etc., shown as aperture 544. The flexible member 542 can be fixedly coupled with the insert 504 within the aperture 544. The orientation of the insert 504 can be reversed and then re-inserted into the cavity 508 in an opposite direction than the direction the insert 504 is drawn out of the cavity 508. For example, the insert 504 can be re-inserted into the cavity 508 with the front end 510 entering the cavity 508 first.

The insert 504 includes a locking aperture (e.g., a female locking portion, an opening, a cavity, a bore, etc.), shown as the locking aperture 546. In some embodiments, the locking aperture 546 extends a distance into the insert 504 through the front end 510. In some embodiments, the locking aperture 546 is an end of the bore 526. When the insert 504 is re-inserted into the cavity 508 with the front end 510 entering the cavity 508 first, the locking aperture 546 is configured to receive the pin 520 and fixedly couple with the end portion of the pin 520. In some embodiments, the pin 520 includes a tapered end such that the retainer 534 is driven to translate as the insert 504 is inserted into the cavity 508. Once the insert 504 is inserted into the cavity 508 a certain distance, the retainer 534 translates into engagement with the annular groove at the end portion 522 of the pin 520.

Referring particularly to FIGS. 4C and 4D, after the insert 504 is re-inserted into the cavity 508, the rear end 512 of the insert 504 is exposed and points outwards from the body 502. The insert 504 includes a cylinder (e.g., a lock cylinder, a keylock, etc.), shown as keylock 548. The keylock 548 is received within and is pivotally and slidably coupled with a corresponding bore 550. A longitudinal axis 552 extends centrally through the keylock 548. The keylock 548 includes a keyhole 554 configured to receive a key. After the key is inserted into the keyhole 554, the keylock 548 can be pivoted about the longitudinal axis 552. Rotation of the keylock 548 about the longitudinal axis 552 drives the retainer 534 out of engagement with the end portion 522 of the pin 520. In this way, a user can selectively un-lock and de-couple the insert 504 from the body 502 after the insert 504 is re-inserted into the cavity 508 of the body 502 in the configuration shown in FIGS. 4C and 4D. In some embodiments, the keyhole 554 is only accessible after the insert 504 has been drawn or pulled out of the cavity 508 of the body 502.

The insert 504 can include a recessed side or an angled portion that, together with the sidewall 514 defines an opening, a cavity, an inner volume, etc., shown as opening 556, through which the flexible member 542 extends. In some embodiments, the flexible member 542 extends through the opening 556 defined between the insert 504 and the sidewall 514 and fixedly couples at the rear end 512 of the insert 504.

Referring particularly to FIG. 4E, the body 502 defines an opening (e.g., an aperture, a hole, a window, a through-hole, etc.), shown as aperture 558. The flexible member 542 may pass through the aperture 558 and fixedly couple with the rear end 512 of the insert 504 or an internal retainer of the frame 12. The flexible member 542 can be stored within and extend out of an inner volume of the frame 12 of the bicycle 10 with which the body 502 is fixedly coupled. The operation and use of the lock 500 is described in greater detail herein with reference to FIG. 4Q.

As shown in FIGS. 4F and 4G, a second lock (e.g., a lock, a locking apparatus, a locking device, a securing device, etc.), shown as lock 600, of the locking system 400 includes a body member (e.g., a receiving member, a housing, a frame member, etc.), shown as body 602, and a removable member (e.g., removable portion, a lock portion, a cable extension portion, a selectively extendable portion, etc.), shown as insert 604. The insert 604 is configured to be received within an inner volume (e.g., a cavity, a recess, an opening, receptacle, etc.), shown as cavity 608, of the body 602. In some embodiments, the insert 604 is stored within the cavity 608 of the body 602 during transportation and removed from the cavity 608 when the bicycle 10 is locked. The body 602 can be the same as or similar to the body 502. For example, the body 602 can include any similar features, geometry, etc., as body 502. In some embodiments, the body 602 includes a lip (e.g., a stepped portion, a shoulder, etc.), shown as flange 616, that is configured to engage a corresponding portion of the frame 12 (e.g., down tube 30) of the bicycle 10.

Referring particularly to FIG. 4G, the insert 604 includes a cylinder (e.g., a locking cylinder, a lock, a keylock, etc.), shown as keylock 648. In some embodiments, the keylock 648 is the same as or similar to the keylock 548. The keylock 648 is received within and is pivotally and slidably coupled within a corresponding bore 650. The keylock 648 includes an interface (e.g., an end portion, an end protrusion, an engagement portion, etc.), shown as protrusion 660. The keylock 648 defines a longitudinal axis 652 that extends through a center point of the keylock 648. In some embodiments, the keylock 648 includes a keyhole 654 that is configured to receive and engage a key. After the insert 604 is removed from the cavity 608 of the body 602, the keyhole 654 can be accessed by the user. The user may insert a key into the keyhole 654 and rotate the key to pivot or rotate the keylock 648 within the bore 650. In some embodiments, the keyhole 654 is only accessible after the insert 604 has been drawn or pulled out of the cavity 608 of the body 602.

The insert 604 includes an aperture, a bore, a connecting portion, etc., shown as bore 656. The bore 656 is configured to receive and fixedly couple with the flexible member 542. In some embodiments, the bore 656 is configured to align with a corresponding aperture 658 that extends through a rear wall of the body 602. The aperture 658 can slidably couple with the flexible member 542 such that the flexible member 542 can pass through the aperture 658 as the insert 604 is drawn or pulled out of the body 602.

The insert 604 defines a passage (e.g., a lateral passageway, a channel, a groove, a slot, a recess, etc.), shown as track 668. The track 668 extends in a lateral direction that is substantially perpendicular with the longitudinal axis 652. The insert 604 includes a locking member (e.g., a slidable member, a translatable member, etc.), shown as retainer 664. The retainer 664 is configured to be received within and slide or translate within the track 668. The retainer 664 defines an interface (e.g., a slot, a channel, a groove, a recess, etc.), shown as recess 666. The recess 666 is configured to engage and receive the protrusion 660. Rotation of the keylock 648 drives the retainer 664 to translate along the track 668.

The retainer 664 is translatable between a locked configuration/position shown in FIG. 4G, and an unlocked configuration/position. The insert 604 includes a longitudinally extending channel, passageway, cavity, etc., shown as longitudinal cavity 646. In some embodiments, the longitudinal cavity 646 extends longitudinally through the track 668. The retainer 664 can translate along the track 668 between the locked configuration shown in FIG. 4G and the unlocked configuration/position. When the retainer 664 is transitioned into the locked configuration shown in FIG. 4G, a locking cavity, a locking chamber, etc., shown as inner locking volume 662, is defined between the retainer 664 and inner surfaces of the insert 604. In some embodiments, the inner locking volume 662 is an inner most portion of the longitudinal cavity 646. In some embodiments, the longitudinal cavity 646 is a groove or a track that extends a distance longitudinally into the insert 604 and extends along substantially an entire lateral width of the insert 604.

When the retainer 664 is transitioned into the unlocked configuration/position, inner locking volume 662 is accessible through the longitudinal cavity 646. The insert 604 can be drawn or pulled completely out of the body 602, wrapped around a stationary object (e.g., a bike rack, a post, a lamppost, a wall, etc.), and secured to the flexible member 542. For example, the retainer 664 may be transitioned into the unlocked configuration/position, the flexible member 542 may inserted into the inner locking volume 662 such that the flexible member 542 extends laterally through the inner locking volume 662, and the retainer 664 may then be transitioned into the locked configuration/position (shown in FIG. 4G) to secure the flexible member 542 with the body 602. In this way, the longitudinal cavity 646 can be opened or closed to receive the flexible member 542 therewithin to lock the body 602 onto the flexible member 542.

As shown in FIGS. 4H-4J, a third lock (e.g., a lock, a locking apparatus, a locking device, a securing device, etc.), shown as lock 700, of the locking system 400 includes a body member (e.g., a receiving member, a housing member, a frame member, etc., shown as body 702, and a removable member (e.g., a pivotal member, a lock member, etc.), shown as insert 704. The insert 704 is received within a cavity (e.g., an inner volume, a recess, etc.) of the body 702, shown as cavity 708. In some embodiments, the body 702 and the insert 704 have a generally cylindrical shape. The cavity 708 can have a circular cross-sectional area that is configured to receive the insert 704. In some embodiments, a cylindrical inner surface of the body 702 is configured to slidably engage or slidably couple with an outer cylindrical surface of the insert 704. The lock 700 can include any of the features or geometry of the lock 600. For example, the lock 700 can include a translatable member that is configured to be driven to translate along a track by turning a key. The translatable member can be configured to allow access to an inner locking chamber through which the flexible member 542 can be inserted. The translatable member can then be transitioned into a locked configuration by turning the key to secure and lock the flexible member 542 within the inner locking chamber.

Referring particularly to FIGS. 4H and 4I, the body 702 is a generally hollow and cylindrical member having a sidewall 714 and a flange 716 that extends circumferentially along the sidewall 714 at an open end of the body 702. The insert 704 is configured to be removed through the open end of the body 702. The open end of the body 702 is a front or proximate end 728 of the body 702. The body 702 includes a second or distal end 730.

The insert 704 includes a front or proximate end 710 and a second or distal end 712. In some embodiments, the distal end 712 of the insert 704 is at the distal end 730 of the body 702 when the insert 704 is inserted into the body 702. Likewise, the proximate end 710 of the insert 704 can be positioned at the proximate end 728 of the body 702 when the insert 704 is inserted into the body 702.

The body 702 includes a housing (e.g., a boss, a protrusion, a tab, a housing protrusion, etc.), shown as protrusion 706. The protrusion 706 extends at the distal end 730 of the body 702 from a rear or outer face of the body 702. In some embodiments, the protrusion 706 includes an inner volume 707 that extends into the cavity 708 of the body 702. A spring (e.g., the spring 532) can be positioned within the inner volume 707 and can engage the distal end 712 of the insert 704. The spring can be configured to bias or exert a force upon a back surface of the insert 704 at the distal end 712.

Referring particularly to FIG. 4J, the body 702 includes a channel (e.g., an opening, an angular opening, a slot, etc.), shown as opening 780. The opening 780 extends through a rear wall of the body 702 at the distal end 730 of the body 702. The opening 780 includes a first aperture 782, a second aperture 784, and a connecting opening 788. In some embodiments, the first aperture 782 and the second aperture 784 have circular shapes. In some embodiments, the first aperture 782 is larger (e.g., larger in area, larger in diameter, larger in radius, etc.) than the second aperture 784. The connecting opening 788 can extend along an angular path between the first aperture 782 and the second aperture 784. The first aperture 782 and the second aperture 784 can be angularly offset about the longitudinal axis 751. In some embodiments, the first aperture 782 and the second aperture 784 are angularly offset.

Referring particularly to FIGS. 4H-4J, the insert 704 includes a protrusion (e.g., an extrusion, a pin, a post, an engaging member, an interfacing member, an interlocking member, etc.), shown as engagement protrusion 790. The engagement protrusion 790 extends from the distal end 712 of the insert 704. The engagement protrusion 790 can include an annular groove (e.g., a stepped portion, a notched portion, etc.), shown as annular groove 792. In some embodiments, the engagement protrusion 790 is configured to extend through the opening 780. The engagement protrusion 790 can have an outer diameter that is greater than a corresponding diameter of the second aperture 784 and the connecting opening 788 but less than the diameter of the first aperture 782. In this way, the body 702 can be rotated or pivoted between an engaged position (shown in FIGS. 4I and 4J) where the engagement protrusion 790 and the annular groove 792 engage corresponding portions of the back sidewall at the second aperture 784, and a disengaged position where the engagement protrusion 790 aligns with the first aperture 782 and can be removed from the first aperture 782. The engagement protrusion 790 includes a channel, a passageway, an aperture, an inner volume, a bore, etc., shown as inner volume 794. In some embodiments, the flexible member 542 extends through the inner volume 794 and fixedly couples with the body 702 at a position within the inner volume 794.

Referring still to FIGS. 4H-4J, the insert 704 includes a handle (e.g., a protrusion, a tab, a flange, a grasping member, etc.), shown as tab 760. The tab 760 extends from an outer surface at the proximate end 710 of the insert 704. The user can grasp the tab 760 (e.g., with their fingers) and exert a torque on the insert 704 via the tab 760. As the user exerts the torque on the insert 704 via the tab 760, the insert 704 rotates about the longitudinal axis 751 relative to the body 702. The user can rotate the insert 704 until the engagement protrusion 790 is positioned within the first aperture 782. Once the engagement protrusion 790 is rotated to the first aperture 782, the insert 704 can be drawn or pulled out of the body 702. In some embodiments, the spring positioned within the protrusion 706 facilitates driving the insert 704 out of the body 702 once the engagement protrusion 790 is rotated to the first aperture 782.

Referring still to FIGS. 4H-4J, the insert 704 includes a cylinder (e.g., a locking cylinder, a lock, a keylock, etc.), shown as keylock 748. In some embodiments, the keylock 748 is the same as or similar to the keylock 648 or the keylock 548. The keylock 748 is configured to be received within a bore (e.g., an opening, an aperture, etc.), of the insert 704, shown as bore 750. The keylock 748 can be pivotally or rotatably coupled with the insert 704 within the bore 750 such that the keylock 748 can rotate or pivot relative to the insert 704. The keylock 748 includes a keyhole 754 configured to receive a key. In some embodiments, the user can access the keyhole 754 after the insert 704 is pulled out of the body 702. The user can insert the key into the keyhole 754 and rotate the key to pivot or rotate the keylock 748.

The keylock 748 includes an interface (e.g., a tab, a protrusion, an end protrusion, etc.), shown as protrusion 770. The protrusion 770 is configured to be received within or interface with a corresponding interface (e.g., a groove, recess, etc.), shown as recess 766, of a locking member, shown as retainer 764. In some embodiments, the retainer 764 is the same as or similar to the retainer 664. Likewise, the keylock 748 can be the same as or similar to the keylock 648.

The insert 704 includes a track 768 that extends laterally through the insert 704. In some embodiments, the track 768 is the same as or similar to the track 668. The track 768 is configured to receive the retainer 764 such that the retainer 764 can translate or slide along the track 786. The retainer 764 is driven to translate or slide along the track 786 by rotation of the key inserted into the keyhole 754 of the keylock 748 through the engagement between the protrusion 770 and the recess 766.

The retainer 764 can transition between a locked position/configuration (shown in FIGS. 4H and 4I), and an unlocked configuration/position. In some embodiments, the retainer 764 translates to the unlocked configuration/position to allow access to the inner locking volume 762 through the longitudinal cavity 746. The longitudinal cavity 746 and the inner locking volume 762 can extend laterally through an entire width of the body 702. The longitudinal cavity 746 and the inner locking volume 762 can receive the flexible member 542 similarly to the longitudinal cavity 646 and the inner locking volume 662. The operation and use of the lock 600 and the lock 700 is described in greater detail herein with reference to FIG. 4R.

As shown in FIGS. 4K and 4L, a fourth lock (e.g., a lock, a locking apparatus, a locking device, a securing device, etc.), shown as lock 800, of the locking system 400 includes a body member, shown as body 802. The body 802 includes a first, proximate end, shown as front end 806, and a second, distal end, shown as rear end 808. In some embodiments, the body 802 has a square cross-sectional shape. In other embodiments, the body 802 has a circular cross-sectional shape, a rectangular cross-sectional shape, an irregular cross-sectional shape, or any other suitable cross-sectional shape. The body 802 can be fixedly coupled with the frame 12 (e.g., the down tube 30) of the bicycle 10. In some embodiments, the body 802 is fastened, frictionally coupled, welded, integrally formed, etc., with the frame 12.

The body 802 defines an aperture (e.g., a channel, a groove, a passage, etc.), shown as channel 810, that extends longitudinally through the body 802. The channel 810 is configured to receive the flexible member 542. The channel 810 extends from the rear end 808 of the body 802 to the front end 806 of the body 802. In some embodiments, the body 802 includes a stepped portion at the front end 806 of the body 802 near the channel 810 that is configured to engage a corresponding stepped portion of the flexible member 542 to facilitate preventing an end of the flexible member 542 from being completely retracted into the body 802 and the frame 12 of the bicycle 10.

The flexible member 542 includes an end (e.g., a male end, a male locking portion, a post, a pin, etc.), shown as male locking portion 824. In some embodiments, the male locking portion 824 is fixedly coupled with an end of the flexible member 542. The male locking portion 824 can include an annular groove that is configured to interlock with a corresponding female portion or interface.

The body 802 includes a flange 816 that extends outwards from the body 802 at the front end 806 thereof. In some embodiments, the flange 816 is configured to engage a corresponding portion of the frame 12 of the bicycle 10. The flange 816 can be configured to engage a surface of the frame 12 (e.g., the down tube 30) of the bicycle 10 that is recessed relative to or sub-flush with an exterior surface of the frame 12. In this way, an exterior surface of the flange 816 may be flush or sub-flush with the exterior surface of the frame 12. The flange 816 can be the same as or similar to any of the flanges 716, 616, and 516, and provides additional contact area to secure and fixedly couple the lock 800 with the frame 12 (e.g., the down tube 30) of the bicycle 10.

In some embodiments, the lock 800 includes a curved portion (e.g., a guide portion, a sweep, etc.), shown as guide portion 804, that extends from the rear end 808 of the body 802. The guide portion 804 can be a curved member that guides the flexible member 542 from within the frame 12 of the bicycle 10 to the channel 810. In some embodiments, the guide portion 804 is reinforced with a structural member 820 that extends in a direction substantially perpendicular with the guide portion 804 between the guide portion 804 and the body 802. In some embodiments, the structural member 820 is a rib or a reinforcing member. The guide portion 804 and the structural member 820 can be integrally formed with body 802. The guide portion 804 is configured to slidably interface with the flexible member 542 and facilitates guiding the flexible member 542 into the channel 810. The guide portion 804 can be a 90 degree elbow or arcuate portion.

The body 802 includes a recess (e.g., a groove, a channel, a slot, etc.), shown as groove 822, that extends along an outer face of the body 802 at the front end 806 of the body 802. The channel 810 extends into the groove 822. The groove 822 facilitates positioning the male locking portion 824 of the flexible member 542 sub-flush or flush with the exterior face of the body 802.

The body 802 includes a cylinder (e.g., a lock, a locking device, a locking apparatus, a keylock, a locking cylinder, etc.), shown as keylock 848. In some embodiments, the keylock 848 is received within a corresponding opening (e.g., channel, groove, bore, aperture, etc.), of the body 802, shown as bore 850. The bore 850 extends longitudinally through the body 802. In some embodiments, the bore 850 extends only partially through an entire longitudinal length of the body 802 (e.g., the bore 850 is a blind-hole). In other embodiments, the bore 850 extends completely through the entire longitudinal length of the body 802 (e.g., the bore 850 is a through-hole).

The keylock 848 is rotatably or pivotally and/or slidably coupled with the body 802 within the bore 850. In some embodiments, an exterior cylindrical surface of the keylock 848 slidably engages a corresponding cylindrical inner surface of the body 802 defined by the bore 850. The keylock 848 includes a keyhole 854 that is configured to receive an engage a key therewithin. In some embodiments, after the key is inserted into the keyhole 854, the keylock 848 can be rotated or pivoted about its longitudinal axis.

The body 802 defines an aperture (e.g., a receiving aperture, a hole, a blind hole, a bore, etc.), shown as locking aperture 818. In some embodiments, the locking aperture 818 includes a female locking portion positioned therein that is configured to engage and lock with (e.g., selectably fixedly couple with) the male locking portion 824. In some embodiments, the locking aperture 818 has a shape that corresponds to an outer periphery of the male locking portion 824. For example, the locking aperture 818 can have a circular-cross sectional shape that is sized to receive male locking portion 824. By way of example, the lock 800 may include an interlocking member that is the same as or similar to the retainer 534. In some embodiments, rotation of the key that is inserted into the keyhole 854 transitions the female locking portion between an engaged or locked position/configuration and a disengaged or unlocked position/configuration. In some embodiments, rotation of the keylock 848 (e.g., by rotating the key inserted into the keyhole 854) transitions the female locking portion between the engaged and the disengaged positions. In some embodiments, rotation of the keylock 848 translates or pivots the interlocking member to engage or disengage the male locking portion 824.

The flexible member 542 and the male locking portion 824 can be drawn out of the body 802, wrapped around an object, and inserted into the locking aperture 818. In some embodiments, once the male locking portion 824 is inserted into the locking aperture 818, the keylock 848 can be transitioned from the disengaged or unlocked configuration/position to the engaged or locked configuration/position to fixedly couple the male locking portion 824 with the body 802 (e.g., by rotating the key that is inserted into the keyhole 854). In this way, the flexible member 542 can extend or be extended from the body 802 of the lock 800, wrapped around an object, and locked to the body 802 at the locking aperture 818. The operation and use of the lock 800 is described in greater detail below with reference to FIG. 4S.

Referring particularly to FIGS. 4M-4P, any one of the lock 500, the lock 600, the lock 700, or the lock 800 can be integrated into the frame 12 of the bicycle 10. In some embodiments, the lock 500/600/700/800 is fixedly coupled with and/or integrated with the down tube 30 (as shown in FIGS. 4M-4P). In other embodiments, the lock 500/600/700/800 is fixedly coupled with and/or integrated with the top tube 90, the seat tube 70, the head tube 20, etc. The lock 500/600/700/800 can extend into an inner volume, shown as interior 34, of the down tube 30 (or other portion of the frame 12). The lock 500/600/700/800 can be received within a correspondingly shaped and sized aperture or opening, shown as opening 36, of the down tube 30 and is fixedly coupled with the down tube 30. The lock 500/600/700/800 can be fixedly coupled with the down tube 30 using a weld, fasteners, a frictional engagement, etc., or may be integrally formed with the down tube 30.

Referring particularly to FIGS. 4Q-4S, the locking system 400 (e.g., an integrated locking apparatus, an integrated locking system, etc.) can be used to selectively secure the bicycle 10 with an object 404. The object 404 may be a stationary object that is adequately anchored (e.g., a light post, a fence post, a bicycle rack, etc.). The flexible member 542 can be stored within and extendable from down tube 30. In some embodiments, the flexible member 542 is secured with the down tube 30 by a securing mechanism 402. In some embodiments, the securing mechanism 402 is also a retraction mechanism such that the flexible member 542 is automatically retracted into the down tube 30.

As shown in FIG. 4Q, the locking system 400 includes the lock 500. The body 502 of the lock 500 is fixedly coupled (e.g., fastened, welded, integrally formed, etc.) with the down tube 30 of the bicycle 10. In some embodiments, the down tube 30 is a tubular frame member that has the interior 34 in which the flexible member 542 can be stored, and out of which the flexible member 542 can be extended or extracted. The body 502 of the lock 500 can be positioned and fixedly coupled with the down tube 30 such that an exterior surface of the flange 516 is flush or sub-flush with an exterior surface of the down tube 30. For example, the flange 516 can be received within a recess, a groove, a depression, etc. in a wall of the down tube 30.

The insert 504 can be removed from the body 502 (e.g., selectively de-coupled from the body 502 by pressing the button 524) and extended or pulled from the down tube 30. As the insert 504 is extended from the down tube 30, the flexible member 542 is extended from inside of the down tube 30. The insert 504 and the flexible member 542 can then be wrapped around the object 404. The insert 504 can then be re-inserted into the cavity 508 of the body 502 (e.g., in the configuration shown in FIGS. 4C and 4D) and locked with the body 502. Advantageously, this secures the bicycle 10 with the object 404 and facilitates deterring theft of the bicycle 10.

As shown in FIG. 4R, the locking system 400 includes the lock 600 or the lock 700. The body 602/702 of the lock 600/700 is fixedly coupled with the down tube 30. In some embodiments, the body 602/702 is fixedly coupled with the down tube 30 similarly or the same as the body 502 of the lock 500 is fixedly coupled with the down tube 30 (e.g., fixedly coupled, fastened, welded, integrally formed, etc.).

The insert 604/704 can be removed from the body 602/702 and wrapped around the object 404. In some embodiments, the insert 704 is first rotated a predetermined angular amount so that the engagement protrusion 790 can pass through the second aperture 784. The insert 604/704 can then be secured with the flexible member 542. In some embodiments, the insert 604/704 is transitioned into the disengaged or unlocked position by inserting the key into the keyhole 654/754 and rotating the key. Rotating the key drives the keylock 648/748 to rotate, thereby driving the retainer 664/764 to translate and allowing the flexible member 542 to be inserted into the inner locking volume 662/762. After the flexible member 542 is inserted into the inner locking volume 662/762 of the insert 604/704, the user can rotate or pivot the key to transition the keylock 648/748 and the retainer 664/764 into the locked or engaged configuration to secure the bicycle 10 with object 404. To release the bicycle 10 from the object 404, the key can be re-inserted into the keylock 648/748, rotated in the opposite direction to allow the flexible member 542 to be released from the insert 604/704, and the flexible member 542 can be retracted into the down tube 30.

As shown in FIG. 4S, the locking system 400 includes the lock 800. The body 802 of the lock 800 is fixedly coupled with the down tube 30 of the bicycle 10. The flexible member 542 is extendable from the interior 34 of the down tube 30 and can be drawn out of the down tube 30 through the body 802. The flexible member 542 can be wrapped around the object 404 and inserted into the locking aperture 818. The male locking portion 824 can be inserted into the locking aperture 818 to secure and fixedly couple the free end of the flexible member 542 with the body 802. The male locking portion 824 can interlock within the locking aperture 818 by simply being inserted into the locking aperture 818, or by being inserted into the locking aperture 818 and then engaged by inserting a key into the keyhole 854 and rotating the keylock 848. The male locking portion 824 can be disengaged or selectively de-coupled from the body 802 by insertion and rotation of the key into the keyhole 854 in an opposite direction to disengage the male locking portion 824.

In some embodiments, the locking system 400 does not include the lock 500, the lock 600, the lock 700, or the lock 800. In such embodiments, the locking system 400 may rather include a retaining element (e.g., a bar, a U-bar, etc.) extending across the opening 36. Therefore, an independent lock (e.g. a U-lock, a cable lock, etc.) can be looped around the retaining element to secure the bicycle 10 to the object 404.

Referring now to FIGS. 4T-4V, various embodiments of the securing mechanism 402 are shown. It should be understood that any combination of the securing mechanism 402 shown in FIGS. 4T-4V are within the scope of the present disclosure, and that the flexible member 542 can be secured with the down tube 30 or automatically retracted into the down tube 30 by the securing mechanism 402. Further, any of the embodiments of the securing mechanism 402 shown in FIGS. 4T-4V and described in detail with reference to FIGS. 4T-4V can be used with any of the lock 500, the lock 600, the lock 700, or the lock 800.

Referring particularly to FIG. 4T, the securing mechanism 402 includes a linear biasing element, shown as spring 406, that is anchored to or fixedly coupled with an end of the flexible member 542. In some embodiments, the spring 406 is fixedly coupled with the down tube 30. The spring 406 can be positioned within the interior 34 of the down tube 30. The spring 406 can be extended a predetermined length to facilitate extension of the flexible member 542. As the flexible member 542 is drawn out of the down tube 30, the spring 406 exerts a recoil force or a return force to the flexible member 542 to draw the flexible member 542 back into the down tube 30. Advantageously, the spring 406 facilitates an automatic retraction of the flexible member 542 into the down tube 30.

Referring particularly to FIG. 4U, the securing mechanism 402 includes a retraction mechanism, shown as torsional spring 408. The torsional spring 408 is configured to retract the flexible member 542 into the down tube 30. Drawing or pulling the flexible member 542 out of the down tube 30 may load the torsional spring 408 such that when the flexible member 542 is released, the torsional spring 408 draws the flexible member 542 into the down tube 30. The flexible member 542 can be wound onto a spool and stored within the down tube 30 until it is extended from the down tube 30 for securing the bicycle 10. The torsional spring 408 can drive the spool to wind the flexible member 542 onto the spool. The spool can be pivotally coupled within the interior 34 of the down tube 30.

Referring particularly to FIG. 4V, the down tube 30 includes an orifice plate, structural members, laterally extending members, etc., shown as engagement members 414. The engagement members 414 can be fixedly coupled with the down tube 30 and may extend inwards to define an opening, a window, an aperture, an orifice, etc., shown as opening 416. In some embodiments, the opening 416 is a circular opening, a square opening, an irregularly shaped opening, etc., or any other shape. The flexible member 542 includes a stopper, a ball-shaped member, etc., shown as stopper 410. The stopper 410 is fixedly coupled with an end of the flexible member 542 and can have a cross-sectional area or size that is greater than the cross-sectional area or size of the opening 416. The flexible member 542 can be extended or drawn a length 412 out of the down tube 30 until the stopper 410 contacts the engagement members 414. In this way, the stopper 410 and the engagement members 414 facilitate preventing the flexible member 542 from being completely drawn out of the down tube 30.

Storage Compartment

As shown in FIGS. 5A-5F, the storage compartment 900 is integrated into the down tube 30 of the frame 12. In other embodiments, the storage compartment 900 is integrated into another portion of the frame 12 (e.g., the top tube 90, the seat stays 80, the seat tube 70, etc.). As shown in FIGS. 5A-5F, the storage compartment 900 includes a panel, lid or cover, shown as door 910; an insert, receptacle, vessel, or container, shown as tub 920; an adapter, shown as bracket 940; and a locking system, shown as locking assembly 950. As shown in FIGS. 5B-5F, the door 910, the tub 920, and the interior 34 of the down tube 30 cooperatively define a cavity, shown as interior cavity 902, of the storage compartment 900.

As shown in FIGS. 5C-5F, the door 910 is configured as a plate, shown as panel 912, having (i) an interface, shown as door retainer 914, extending from an inner side of the panel 912 at a first end thereof and (ii) a coupler, shown as arm 916, extending from an inner side of the panel 912 at an opposing second end thereof and having a "U-shaped" profile. The arm 916 is positioned to engage with an interface, shown as hinge 38, disposed within the interior 34 of the down tube 30 (e.g., along an interior wall of the down tube 30, etc.) to pivotally couple the door 910 to an interior surface of the down tube 30. The door retainer 914 is positioned to (i) selectively engage a component (e.g., a latch, etc.) of the locking assembly 950 to selectively secure the door 910 in a closed positioned (see, e.g., FIGS. 5A and 5D-5F) such that the door 910 encloses an opening, shown as down tube opening 32, defined by the down tube 30 and (ii) selectively disengage the component of the locking assembly 950 such that the door 910 is selectively openable (see, e.g., FIGS. 5B and 5C) to facilitate selectively accessing the interior cavity 902 through the down tube opening 32. As shown in FIGS. 5D-5F, the tub 920 is longer than the door 910 such that the interior cavity 902 extends beyond the interface between the hinge 38 and the arm 916 into the interior 34 of the down tube 30 (i.e., the interior cavity 902 is longer than the down tube opening 32).

As shown in FIGS. 5B-5F, the tub 920 is disposed within the interior 34 of the down tube 30. According to the exemplary embodiment shown in FIGS. 5B-5F, the tub 920 is releasably secured to an interior wall of the down tube 30 by the bracket 940. According to an exemplary embodiment, the tub 920 is installed within the down tube 30 by (i)

removing the battery pack 204 from the center recess 44 of the central hub 40 (if already installed), (ii) inserting the bracket 940 through the center opening 42 into the center recess 44 of the central hub 40, (iii) pushing the bracket 940 through the central hub 40 into the interior 34 of the down tube 30, (iv) securing the bracket 940 to the interior wall of the down tube 30 beneath the down tube opening 32, (v) inserting the tub 920 through the center opening 42 into the center recess 44 of the central hub 40, (vi) pushing the tub 920 through the central hub 40 into the interior 34 of the down tube 30, and (vii) securing the tub 920 to the bracket 940. In other embodiments, the tub 920 is fixedly secured to or integrally formed with the interior wall of the down tube 30 (e.g., adhesively secured, welded, bonded, etc.).

Figure 5B:
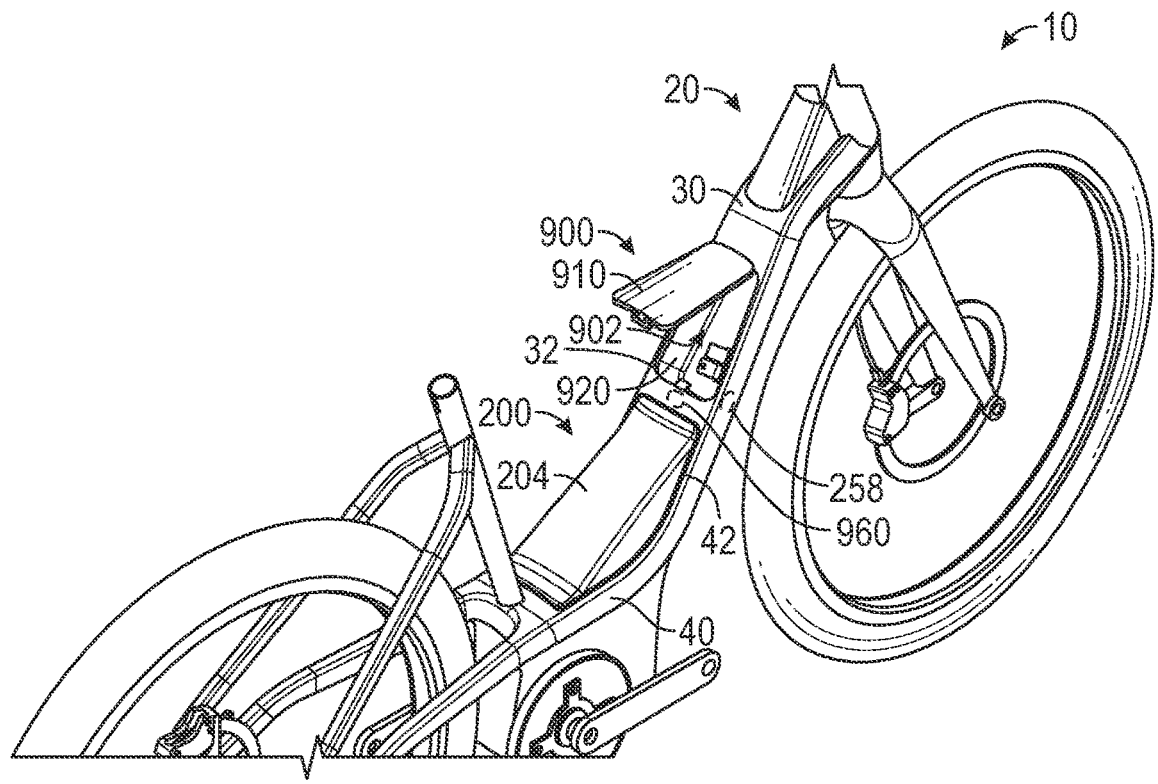
FIG. 5B is a perspective view of the bicycle of FIG. 5A having the integrated storage compartment in a second orientation, according to an exemplary embodiment.
Figure 5C:
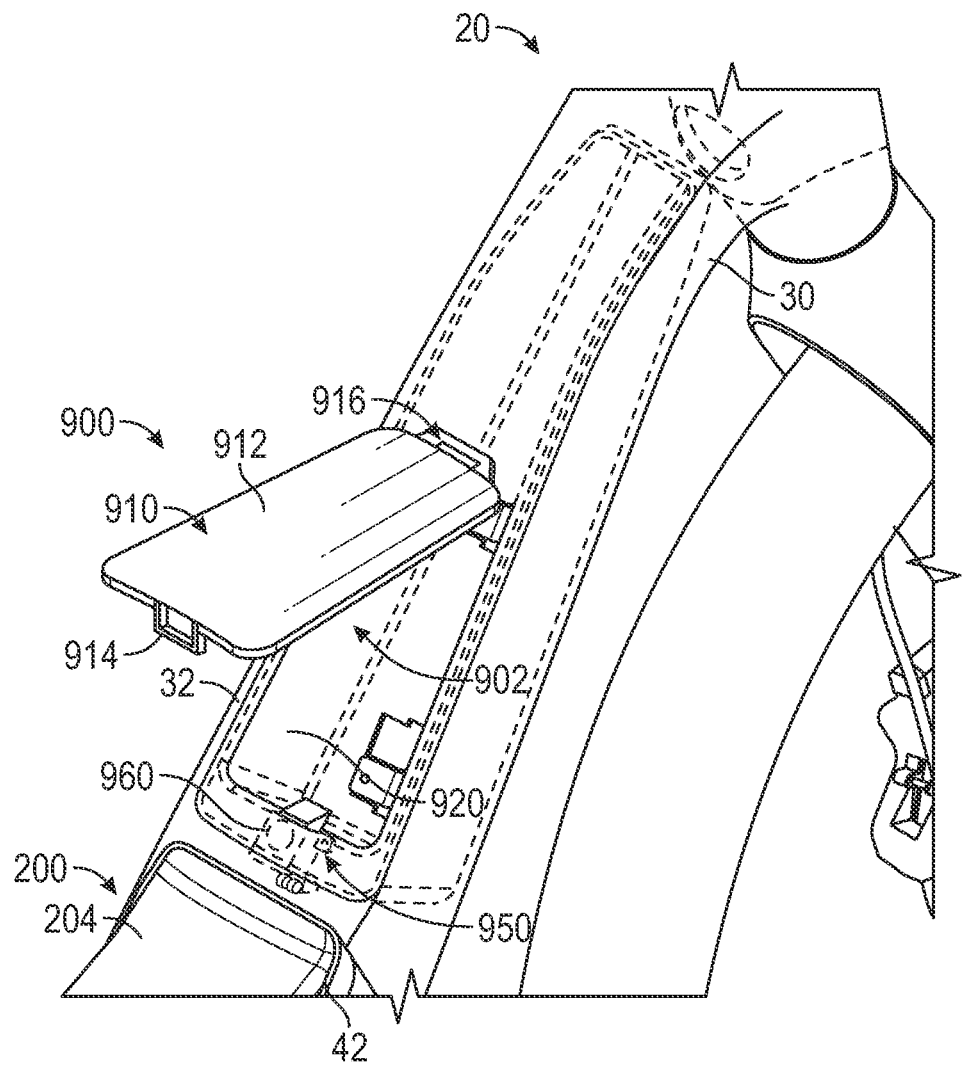
FIG. 5C is a detailed perspective view of the integrated storage compartment of FIG. 5B in the second orientation, according to an exemplary embodiment.
Figure 5G:
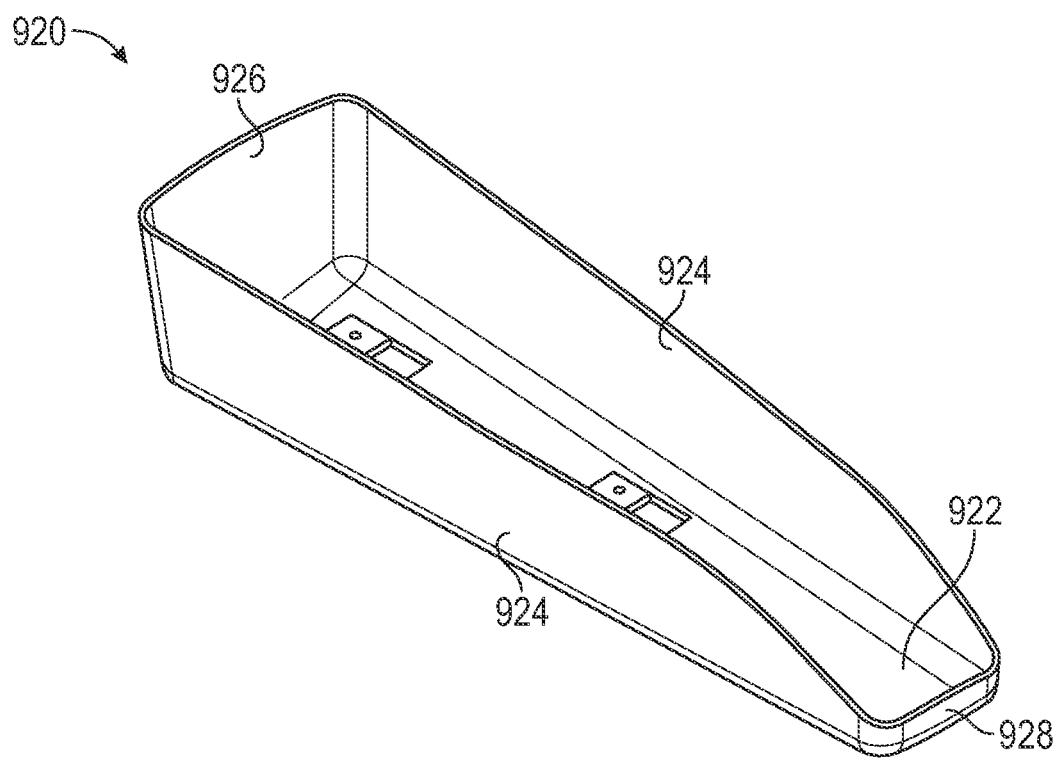
FIGS. 5G-5I are various perspective views of an insert of the integrated storage compartment of FIGS. 5A-5F, according to an exemplary embodiment.
Figure 5H:
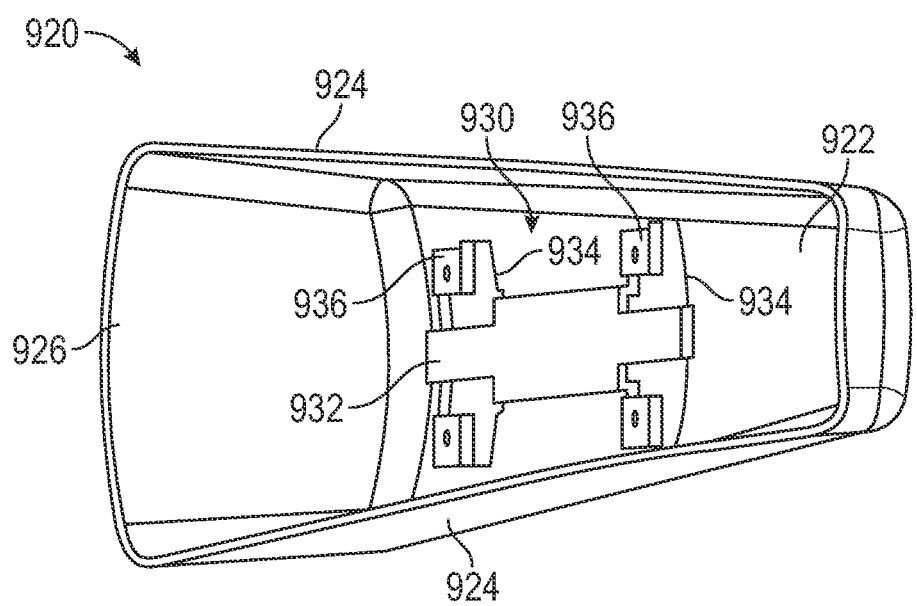
Figure 5I:
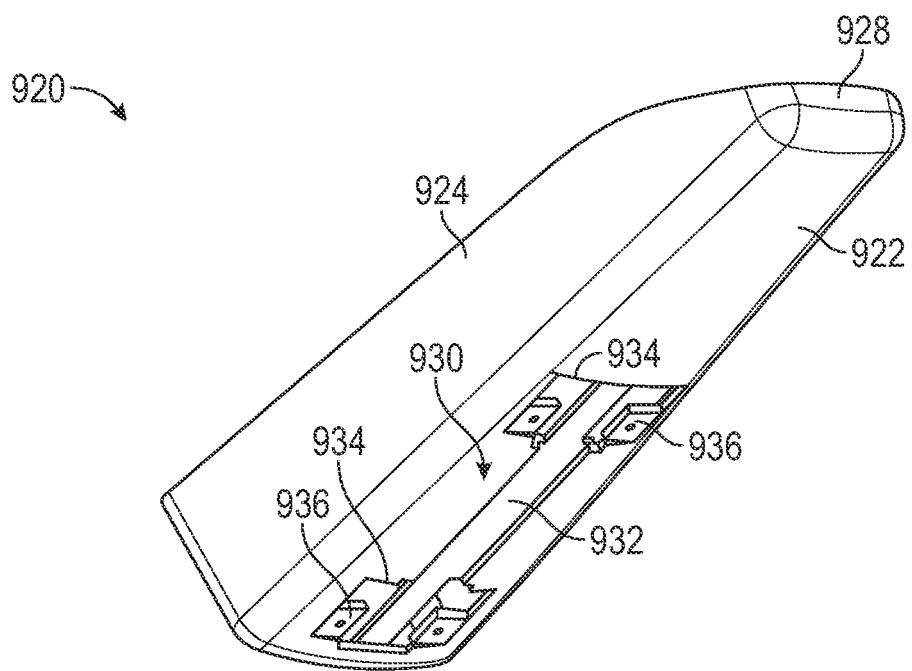

As shown in FIGS. 5G-5I, the tub 920 has a body formed by a bottom wall, shown as bottom 922; a pair of longitudinal sidewalls, shown as sidewalls 924, extending along and from opposing longitudinal edges of the bottom 922; a first lateral wall, shown as rear wall 926, extending along and from a rear edge of the bottom 922 and connecting first ends of the sidewalls 924 together; and an opposing second lateral wall, shown as front wall 928, extending along and from a front edge of the bottom 922 and connecting opposing second ends of the sidewalls 924 together. As shown in FIGS. 5G and 5I, the rear wall 926 is taller than the front wall 928 such that the sidewalls 924 have a non-uniform or tapered profile (e.g., to accommodate a bend in the down tube 30, etc.). In other embodiments, the sidewalls 924 have a uniform or substantially uniform profile.

Figure 5J:
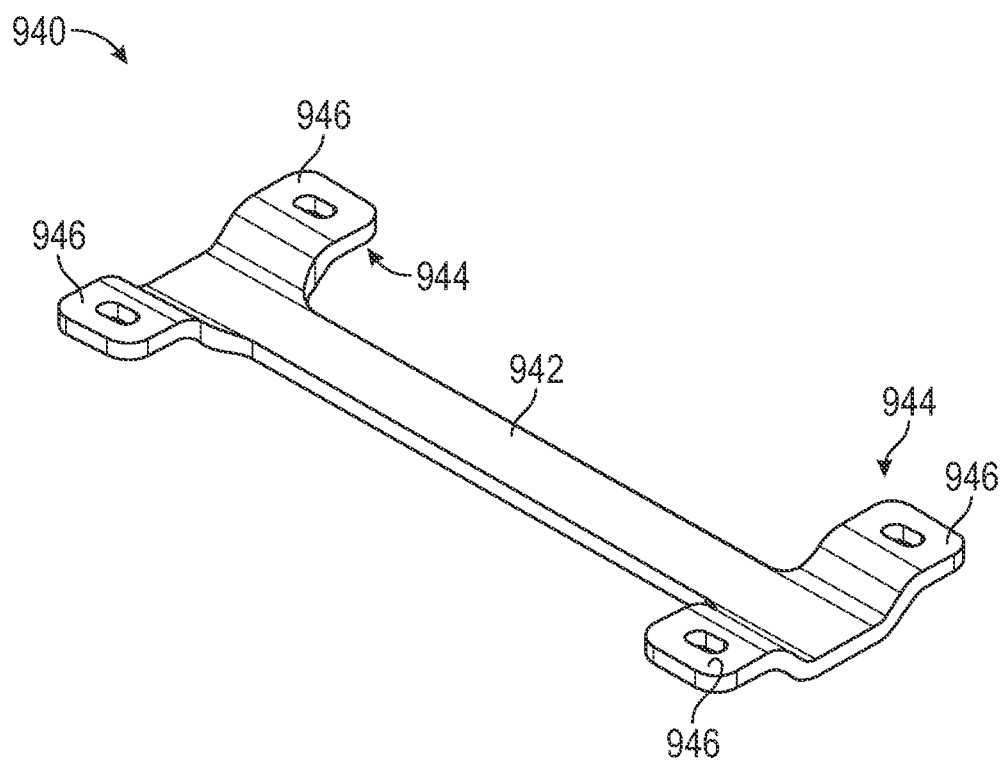
FIG. 5J is a perspective view of a bracket of the integrated storage compartment of FIGS. 5A-5F, according to an exemplary embodiment.

As shown in FIGS. 5H and 5I, the bottom 922 defines an interface, shown as bracket interface 930, that facilitates releasably coupling the tub 920 to the bracket 940. The bracket interface 930 includes a central portion, shown as detent 932; defines a plurality of apertures, shown as apertures 934, positioned at the corners of the detent 932; and includes a plurality of pads, shown as pads 936, positioned proximate the apertures 934. As shown in FIG. 5J, the bracket 940 includes a longitudinal, central portion, shown as base 942, having a pair of interfaces, shown as interfaces 944, positioned at opposing ends of the base 942 with each Of the interfaces 944 having opposing flanges, shown as flanges 946, extending laterally outward from the base 942. According to an exemplary embodiment, the detent 932 of the tub 920 is configured to interface with the base 942 of the bracket 940 and the flanges 946 are positioned to extend through the apertures 934 and engage the pads 936. A plurality of fasteners may then be used to secure the pads 936 to the flanges 946 to secure the tub 920 to the bracket 940 and the down tube 30. In some embodiments, the pads 936 of the tub 920 define threaded apertures or include threaded inserts.

In some embodiments, the interior surface of the bottom 922 has a coating or includes an additional layer or mat disposed thereon to provide increased friction between the bottom 922 and items within the interior cavity 902 to prevent the items from shifting during use of the bicycle 10. In some embodiments, the bottom 922 defines a hole (e.g., a drain hole, etc.) to allow rain or other liquid to drain from the storage compartment 900 in the event that water enters the interior cavity 902. In some embodiments, the door 910 includes a seal that provides a substantially water-tight seal between the door 910 and the down tube opening 32.

In some embodiments, as shown in FIGS. 5A-5D, the locking assembly 950 is or includes as second locking mechanism, shown as locking mechanism 960, positioned between the down tube opening 32 and the center opening 42. As shown in FIG. 5D, the locking mechanism 960 includes (i) a cylinder, shown as lock cylinder 962, configured to interface with a key and (ii) a latching mechanism, shown as latch 964, positioned to selectively engage with the door retainer 914 of the door 910 to selectively lock the storage compartment 900. According to an exemplary embodiment, engagement of a key with the lock cylinder 962 releases the latch 964 from the door retainer 914 of the door 910.

In some embodiments, as shown in FIGS. 5A, 5B, and 5E, the locking assembly 950 is or includes a third locking mechanism, shown as locking mechanism 970, connected to the lock 258. In such an embodiment, the lock 258 may function as a dual-actuating locking mechanism. By way of example, (i) turning a key in the lock cylinder 280 of the lock 258 in a first direction (e.g., counterclockwise, clockwise, etc.) may release the battery pack 204 from the center recess 44 and (ii) turning the key in the lock cylinder 280 in an opposing second direction (e.g., clockwise, counterclockwise, etc.) may release a latch of the locking mechanism 970 from the door retainer 914 and facilitate opening the door 910.

As shown in FIG. 5E, the locking mechanism 970 includes a latching mechanism, shown as latch 972, and a pivotal member, shown as flap 980. The latch 972 has a body, shown as latch body 974, that defines a first recess, shown as front recess 976, and a second recess, shown as rear recess 978. The flap 980 has a base, shown as pivot 982, and an extension, shown as arm 984, extending from the pivot 982. The arm 984 is positioned to interface with the rear recess 978 such that actuation of the flap 980 rotates the arm 984 about the pivot 982 and pulls the latch 972 out of engagement with the door retainer 914 of the door 910. The front recess 976 engages with a retainer, shown as latch retainer 979, positioned to prevent over-retracting the latch 972.

As shown in FIG. 5E, the locking mechanism 970 includes a cable, shown as door cable 990, that extends between the flap 980 and the lock 258 such that engagement of a key with the lock cylinder 280 of the lock 258 facilitates pulling on the door cable 990, thereby actuating the flap 980 to retract the latch 972. In some embodiments, the pivot 982 and/or the latch 972 are biased via a resilient element (e.g., a torsion spring, a linear spring, etc.) such that the latch 972 returns to an engaged position and interfaces with the door retainer 914 to lock the door 910.

As shown in FIG. 5F, the door cable 990 of the locking mechanism 970 is replaced with an actuator (e.g., a latch motor, etc.), shown as electric actuator 992, coupled to the pivot 982 of the flap 980 such that the electric actuator 992 is a rotational actuator. In other embodiments, the electric actuator 992 is coupled to the arm 984 of the flap 980 or directly to the latch 972. In some embodiments, gearing or other transmission elements are positioned between the electric actuator 992 and the flap 980 and/or the latch 972. The electric actuator 992 may thereby be a linear actuator or a rotational actuator. The electric actuator 992 may be powered by the battery pack 204. In some embodiments, the electric actuator 992 is activated in response to a key engaging the lock cylinder 280 of the lock 258. In other embodiments, the electric actuator 992 is activated in response to a signal from an external device (e.g., a user's portable device, a key fob, etc.). All such variations are explained in greater detail with reference to FIG. 6.

Control System

Figure 6:
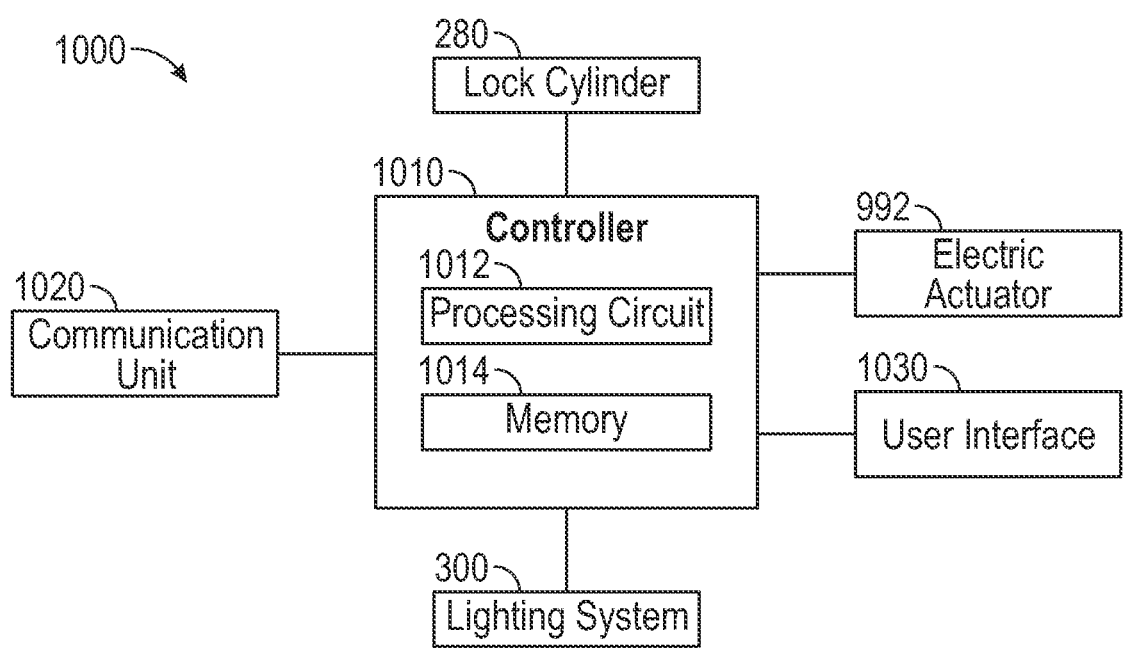
FIG. 6 is a schematic block diagram of a control system of the bicycle of FIGS. 1A-1F, according to an exemplary embodiment.

As shown in FIG. 6, the bicycle control system 1000 includes a controller, shown as bicycle controller 1010. In one embodiment, the bicycle controller 1010 is configured to selectively engage, selectively disengage, control, and/or otherwise communicate with components of the bicycle 10. As shown in FIG. 6, the bicycle controller 1010 is coupled to the lock cylinder 280, the lighting system 300, the electric actuator 992, a communication system, shown as communication unit 1020, and an input, shown as user interface 1030. In other embodiments, the bicycle controller 1010 is coupled to more or fewer components. By way of example, the locking assembly 950 may not include the electric actuator 992. In such an embodiment, the bicycle controller 1010 may not be connected to the lock cylinder 280 or the electric actuator 992. By way of another example, the electric actuator 992 may be activated independently of the lock cylinder 280. In such an embodiment, the bicycle controller 1010 may not be connected to the lock cylinder 280. By way of still another example, the bicycle control system 1000 may include a GPS chip to facilitate monitoring and tracking the current location of the bicycle 10.

The bicycle controller 1010 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 6, the bicycle controller 1010 includes a processing circuit 1012 and a memory 1014. The processing circuit 1012 may include an ASIC, one or more FPGAs, a DSP, circuits containing one or more processing components, circuitry for supporting a microprocessor, a group of processing components, or other suitable electronic processing components. In some embodiments, the processing circuit 1012 is configured to execute computer code stored in the memory 1014 to facilitate the activities described herein. The memory 1014 may be any volatile or non-volatile computer-readable storage medium capable of storing data or computer code relating to the activities described herein. According to an exemplary embodiment, the memory 1014 includes computer code modules (e.g., executable code, object code, source code, script code, machine code, etc.) configured for execution by the processing circuit 1012.

The communication unit 1020 may be configured to facilitate wireless communication with an external device. By way of example, the communication unit 1020 may facilitate short-range wireless communication using a variety of communication protocols such as Bluetooth, Bluetooth low energy (BLE), radio frequency identification (RFID), Zigbee, near-field communication (NFC), and/or other suitable short-range communication protocols. By way of another example, the communication unit 1020 may facilitate long-range wireless communication using a variety of communication protocols such as cellular and/or other suitable long-range communication protocols. By way of example, the communication unit 1020 may facilitate connecting the bicycle control system 1000 to a user's personal device (e.g., smartphone, etc.) to allow the user to control various functions from their personal device (e.g., activate the lighting system 300, activate the electric actuator 992, engage/disengage the locking system 400, etc.). By way of another example, the communication unit 1020 may facilitate detecting a key fob or similar passive key-like device that allows the user to activate various functions of the bicycle 10 (e.g., active the electric actuator 992, activate the lighting system 300, engage/disengage the locking system 400, etc.). The user interface 1030 may be or include various buttons, switches, dials, displays, brake levers, an accelerator, and/or the like.

In some embodiments (e.g., embodiments where the locking assembly 950 includes the electric actuator 992 and is controlled by engagement of the lock cylinder 280, etc.), the bicycle controller 1010 is configured to receive a signal from the lock cylinder 280 in response to a key engaging therewith and activate the electric actuator 992 to unlock the door 910 based on the signal. In some embodiments (e.g., embodiments where the locking assembly 950 includes the electric actuator 992 and is not controlled by engagement of the lock cylinder 280, etc.), the bicycle controller 1010 is configured to receive a signal from the communication unit 1020 based on communication with an external device and activate the electric actuator 992 to unlock the door 910 based on the signal.

In some embodiments, the bicycle controller 1010 is configured to activate the lighting system 300 based on a user input via the user interface 1030 and/or the external device. By way of example, the bicycle controller 1010 may (i) activate the taillights 302 or cause the intensity of the taillights 302 to increase in response to the user engaging the brake lever and (ii) disengage the taillights 302 or cause the intensity of the taillights 302 to decrease in response to the user disengaging the brake lever. By way of another example, the bicycle controller 1010 may be configured to activate/deactivate the taillights 302 and/or the headlight 304 in response to receiving a user command via the user interface 1030 and/or the external device. By way of another example, the bicycle controller 1010 may be configured to flash one or both of the taillights in response to receiving a user command via the user interface 1030 to activate a turning signal or hazard lighting. In some embodiments, the bicycle controller 1010 is configured to automatically activate the lighting system 300 based on the time of day and/or the intensity of ambient light (e.g., determined based on a signal from a clock/timer, based on a signal from a light sensor, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the bicycle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A bicycle comprising:
   a frame including:
      a head tube;
      a stem pivotally coupled to the head tube;
      a down tube having a first end coupled to the head tube and an opposing second end, the down tube extending rearward from the head tube at a downward angle;
      a central portion positioned at the opposing second end of the down tube and extending substantially horizontally therefrom, the central portion defining a cavity and including a mount; and
      chain stays extending rearward from the central portion, the chain stays defining recesses at rear ends thereof;
      wherein an upper surface of the central portion and the down tube defines an opening that provides access to the cavity;
   a motor coupled to the mount;
   a battery releasably received within at least a portion of the frame, the battery configured to power the motor;
   a crank set coupled to the motor, the crank set including crank arms;
   a cover extending over the opening to enclose the cavity; and
   a lighting system connected to the battery with wires extending internally through the frame, the lighting system including:

a conspicuity lamp integrated into the head tube;

a headlight coupled to the stem such that a direction of illumination of the headlight is variable relative to the head tube and the conspicuity lamp; and taillights disposed within the recesses of the chain stays, wherein the taillights are positioned along a rear surface and a side surface of the chain stays.

2. The bicycle of claim 1, wherein the cover has an exterior surface with a first portion extending along the down tube and a second portion extending along the central portion such that the first portion is angled relative to the second portion and substantially matches a curved profile of a transition of the frame between the down tube and the central portion.

3. The bicycle of claim 1, further comprising a key interface supported by the mount and facing laterally outward therefrom, wherein turning a key in the key interface releases the battery to facilitate removing the battery from the portion of the frame.

4. The bicycle of claim 1, wherein the battery extends at least partially into the cavity of the central portion.

5. The bicycle of claim 1, wherein the cover is a top portion or shell of the battery such that the battery is disposed within the cavity, and wherein the cover extends at an angle between the downtube and the central portion such that the cover does not match a profile of a transition of the frame between the down tube and the central portion.

6. The bicycle of claim 1, wherein the mount supports the motor and the battery.

7. The bicycle of claim 1, wherein the frame includes a seat tube positioned proximate a rear end of the opening.

8. The bicycle of claim 1, wherein the mount is positioned at least partially directly underneath the cavity and, therefore, the motor is positioned at least partially underneath the cavity.

9. The bicycle of claim 1, wherein the battery is positioned at least partially directly above the motor.

10. The bicycle of claim 1, wherein the opening is a first opening, and wherein the upper surface of the down tube defines a second opening, further comprising a storage compartment including:

a door pivotally coupled to the down tube and positioned to selectively enclose the second opening; and a receptacle disposed within an interior of the downtube and positioned beneath the second opening.

11. The bicycle of claim 10, further comprising:

a hinge positioned within the interior of the downtube proximate an end of the second opening, wherein the door includes (a) a u-shaped arm extending from a first end of the door into the interior of the downtube and pivotally coupled to the hinge, and (b) a retainer extending from an opposing second end of the door into the interior of the downtube;

a locking mechanism including a latch positioned within the interior of the downtube, the latch configured to selectively engage the retainer of the door to lock the door in a closed position;

a bracket positioned beneath the second opening and coupled to an interior wall of the down tube;

wherein the receptacle is releasably coupled to the bracket;

wherein the receptacle, the door, and the interior of the downtube cooperatively define an interior chamber; and wherein the interior chamber is longer than the door such that the interior chamber extends into the interior of the downtube beyond the second opening.

12. An electric bicycle comprising:

a frame defining a cavity, a first opening providing access to the cavity, an interior compartment, and a second opening providing access to the interior compartment, the frame including a mount extending at least partially directly underneath the cavity;

a motor coupled to the mount and, therefore, positioned at least partially underneath the cavity;

a battery extending at least partially into the frame, the battery configured to power the motor;

a first key interface supported by the mount and facing laterally outward therefrom, wherein turning a key in the first key interface releases the battery to facilitate removing the battery from the frame;

a crank set coupled to the motor, the crank set including crank arms;

a shell extending at least partially over the first opening;

a door pivotally coupled to the frame and extending across the second opening; and a second key interface positioned along the frame proximate the door, wherein turning a key in the second key interface unlocks the door to facilitate accessing the interior compartment.

13. The electric bicycle of claim 12, wherein the battery is positioned at least partially directly above the motor.

14. The electric bicycle of claim 12, further comprising a lighting system connected to the battery with wires extending internally through the frame, the lighting system including:

a conspicuity lamp integrated into the frame; and a headlight coupled to the frame such that a direction of illumination of the headlight is variable relative to the conspicuity lamp.

15. The electric bicycle of claim 12, wherein the battery extends at least partially into the cavity, and wherein the shell is a top portion, housing, or cover of the battery.

16. An electric bicycle comprising:

a frame including:

a head tube;

a stem pivotally coupled to the head tube;

a down tube having a first end coupled to the head tube and an opposing second end, the down tube extending rearward from the head tube at a downward angle;

a central portion positioned at the opposing second end of the down tube and extending substantially horizontally therefrom, the central portion defining a cavity and including a mount positioned at least partially directly underneath the cavity, an upper surface of the central portion and the down tube defining a first opening that provides access to the cavity, the upper surface of the downtube defining a second opening;

chain stays extending rearward from the central portion; and a seat tube extending upward from and proximate an interface between the central portion and the chain stays;

a motor coupled to the mount and, therefore, the motor is positioned at least partially underneath the cavity;

a battery extending at least partially into the cavity and positioned directly above the motor, the battery configured to power the motor, wherein the mount supports the motor and the battery;

a key interface supported by the mount and facing laterally outward therefrom, wherein turning a key in the key interface releases the battery to facilitate removing the battery from the frame;

a crank set coupled to the motor, the crank set including crank arms;

a cover extending over the first opening to at least partially enclose the cavity, the cover having an exterior surface with a first portion extending along the down tube and a second portion extending along the central portion such that the first portion is angled relative to the second portion and substantially matches a curved profile of a transition of the frame between the down tube and the central portion along the upper surface; and a storage compartment including:
  a door pivotally coupled to the down tube and positioned to selectively enclose the second opening; and
  a receptacle disposed within an interior of the downtube and positioned beneath the second opening.

17. The electric bicycle of claim 16, further comprising taillights integrated into the chain stays, the taillights connected to the battery with wires extending internally through the frame, the taillights positioned along a rear surface and a side surface of the chain stays.

18. The electric bicycle of claim 16, wherein the cover is a top portion of the battery such that the battery is disposed within the cavity.

19. The electric bicycle of claim 16, further comprising a lighting system connected to the battery with wires extending internally through the frame, the lighting system including:
  a conspicuity lamp integrated into the head tube; and
  a headlight coupled to the stem such that a direction of illumination of the headlight is variable relative to the conspicuity lamp and the head tube.

20. The electric bicycle of claim 16, wherein the key interface is a first key interface, further comprising a second key interface positioned along the downtube proximate the door, wherein turning a key in the second key interface unlocks the door to facilitate accessing the receptacle.

* * * * *